(12) United States Patent
Gausebeck et al.

(10) Patent No.: US 12,513,404 B2
(45) Date of Patent: *Dec. 30, 2025

(54) SYSTEMS AND METHODS FOR CAPTURING AND GENERATING PANORAMIC THREE-DIMENSIONAL MODELS AND IMAGES

(71) Applicant: CoStar Realty Information Inc., Arlington, VA (US)

(72) Inventors: David Alan Gausebeck, Sunnyvale, CA (US); Kirk Stromberg, Sunnyvale, CA (US); Louis D. Marzano, Sunnyvale, CA (US); David Proctor, Sunnyvale, CA (US); Naoto Sakakibara, Sunnyvale, CA (US); Simeon Trieu, Sunnyvale, CA (US); Kevin Kane, Sunnyvale, CA (US); Simon Wynn, Mountain View, CA (US)

(73) Assignee: CoStar Realty Information, Inc., Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/435,954

(22) Filed: Feb. 7, 2024

(65) Prior Publication Data

US 2024/0179416 A1    May 30, 2024

Related U.S. Application Data

(63) Continuation of application No. 17/744,539, filed on May 13, 2022, now Pat. No. 11,943,539, which is a
(Continued)

(51) Int. Cl.
*H04N 23/698* (2023.01)
*H04N 5/222* (2006.01)
(Continued)

(52) U.S. Cl.
CPC ......... *H04N 23/698* (2023.01); *H04N 5/2226* (2013.01); *H04N 5/265* (2013.01); *H04N 23/90* (2023.01)

(58) Field of Classification Search
None
See application file for complete search history.

(56) References Cited

U.S. PATENT DOCUMENTS 6,192,196 B1   2/2001  Keller
8,705,012 B2   4/2014  Greiner et al.
(Continued)

FOREIGN PATENT DOCUMENTS

CN   107431800 A   12/2017
CN   108345006 A    7/2018
(Continued)

OTHER PUBLICATIONS

Chinese Patent Application No. 202310017851.6, Examination Report dated Aug. 14, 2024, 6 pages.
(Continued)

*Primary Examiner* — Eileen M Adams
(74) *Attorney, Agent, or Firm* — Ahmann Kloke LLP

(57) ABSTRACT

An environmental capture system (ECS) captures image data and depth information in a 360-degree scene. The captured image data and depth information can be used to generate a 360-degree scene. The ECS comprises a frame, a drive train mounted to the frame, and an image capture device coupled to the drive train to capture, while pointed in a first direction, a plurality of images at different exposures in a first field of view (FOV) of the 360-degree scene. The ECS further comprises a depth information capture device coupled to the drive train. The depth information capture device and the image capture device are rotated by the drive train about a first, substantially vertical, axis from the first
(Continued)

direction to a second direction. The depth information capture device, while being rotated from the first direction to the second direction, captures depth information for a first portion of the 360-degree scene. The image capture device captures, while pointed in the second direction, a plurality of images at different exposures in a second FOV that overlaps the first FOV of the 360-degree scene. The depth information capture device and the image capture device are rotated by the drive train about the first axis from the second direction to a third direction. The depth information capture device, while being rotated from the second direction to the third direction, captures depth information for a second portion of the 360-degree scene. The image capture device, while pointed in the third direction, captures a plurality of images at different exposures in a third FOV that overlaps the second FOV of the 360-degree scene.

25 Claims, 33 Drawing Sheets

Related U.S. Application Data continuation-in-part of application No. 17/137,958, filed on Dec. 30, 2020.

(60) Provisional application No. 62/955,414, filed on Dec. 30, 2019.

(51) Int. Cl.
*H04N 5/265* (2006.01)
*H04N 23/90* (2023.01)

(56) References Cited

U.S. PATENT DOCUMENTS

| | | | | |
|---|---|---|---|---|
| 10,506,217 | B2* | 12/2019 | Linde | G03B 37/04 |
| 11,630,214 | B2* | 4/2023 | Gausebeck | G01S 7/4817 |
| | | | | 356/5.01 |
| 11,640,000 | B2 | 5/2023 | Gausebeck et al. | |
| 11,852,732 | B2* | 12/2023 | Gausebeck | G01S 7/4813 |
| 11,943,529 | B2 | 3/2024 | Otsuka et al. | |
| 11,943,539 | B2* | 3/2024 | Gausebeck | H04N 23/90 |
| 12,140,680 | B1* | 11/2024 | Gausebeck | G01S 7/4815 |
| 12,192,641 | B2* | 1/2025 | Gausebeck | H04N 23/698 |
| 2003/0179361 | A1 | 9/2003 | Ohtomo et al. | |
| 2005/0141052 | A1 | 6/2005 | Becker et al. | |
| 2008/0151264 | A1 | 6/2008 | Spencer | |
| 2010/0134596 | A1 | 6/2010 | Becker | |
| 2014/0063489 | A1 | 3/2014 | Steffey et al. | |
| 2014/0078519 | A1 | 3/2014 | Steffey et al. | |
| 2014/0267596 | A1 | 9/2014 | Geerds et al. | |
| 2015/0116691 | A1 | 4/2015 | Likholyot | |
| 2016/0198087 | A1 | 7/2016 | Georgiev et al. | |
| 2016/0291160 | A1 | 10/2016 | Zweigle et al. | |
| 2017/0198747 | A1 | 7/2017 | Chen et al. | |
| 2019/0025428 | A1 | 1/2019 | Li et al. | |
| 2019/0137627 | A1 | 5/2019 | Zweigle et al. | |
| 2019/0154816 | A1* | 5/2019 | Hughes | G01D 5/34 |
| 2019/0327413 | A1 | 10/2019 | Lorenzo | |
| 2019/0394441 | A1 | 12/2019 | Simek et al. | |
| 2020/0054295 | A1* | 2/2020 | Joskowicz | G06T 7/30 |
| 2021/0199809 | A1 | 7/2021 | Wynn | |
| 2021/0227133 | A1* | 7/2021 | Mizoguchi | A61B 1/042 |

FOREIGN PATENT DOCUMENTS

| | | |
|---|---|---|
| CN | 109416399 A | 3/2019 |
| WO | 2014043461 A1 | 3/2014 |
| WO | 2021138427 A1 | 7/2021 |

OTHER PUBLICATIONS

Chinese Patent application No. 202080084506.9, First Office Action dated Apr. 10, 2024, 9 pages.
Chinese Patent Application No. 202310017851.6, Second Examination Report dated Apr. 8, 2024, 7 pages.
Chinese Patent application No. 202080084506.9, Second Office Action dated Sep. 13, 2024, 3 pages.
Australian Patent Application No. 2023282280, Examination Report dated Jan. 11, 2024, 3 pages.
Australian Patent Application No. 2020417796, Examiner's First Report dated Jul. 7, 2023, 3 pages.
Canadian Patent Application No. 3,165,230 Examination Report dated Aug. 24, 2023, 4 pages.
Chinese Patent Application No. 202310017851.6, Examination Report dated Aug. 23, 2023, 6 pages.
European Patent Application No. 20909333.5, Supplementary Search Report dated Nov. 29, 2023, 10 pages.
International Search Report and Written Opinion for International Patent Application Serial No. PCT/US2020/067474 dated Apr. 22, 2021, 15 pages.
Korean Patent application No. 10-2022-7026261, Examination Report dated Feb. 22, 2024, 6 pages.
Korean Patent application No. 10-2024-7038060, Korean Examination Report and translation dated Feb. 27, 2025, 6 pages.
Japanese Patent Application No. JP2022-540653, Office Action dated Dec. 3, 2024 and translation, 8 pages.
Chinese Patent Application No. 2024119591986, Examination Report and translation dated Aug. 23, 2025, 19 pages.
Chinese Patent application No. 2024119610027, First Office Action and translation dated May 9, 2025, 12 pages.
Chinese Patent application No. 2024119610027, Second Office Action and translation dated Sep. 27, 2025, 12 pages.

* cited by examiner

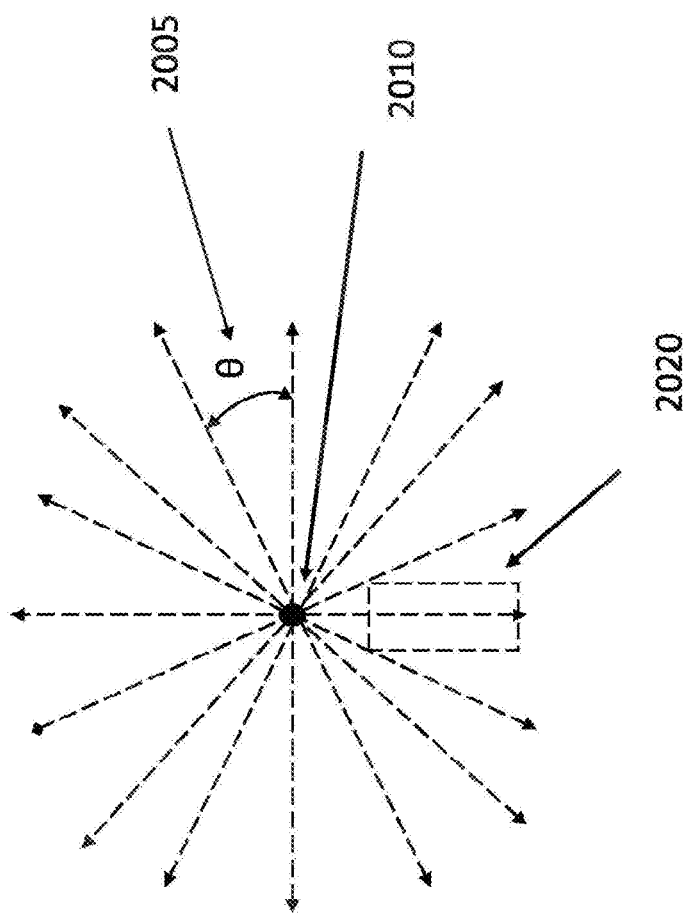

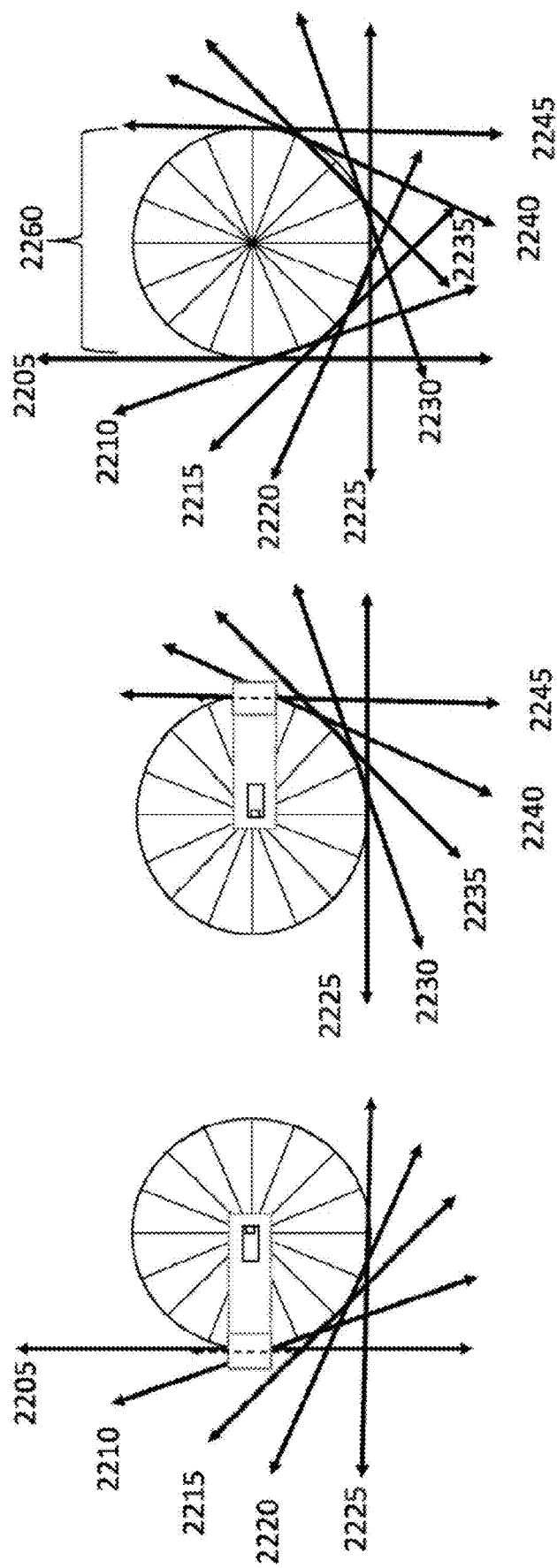

SYSTEMS AND METHODS FOR CAPTURING AND GENERATING PANORAMIC THREE-DIMENSIONAL MODELS AND IMAGES

CROSS-REFERENCE TO RELATED APPLICATIONS

This application is a continuation of, and seeks the benefit of U.S. application Ser. No. 17/744,539, filed May 13, 2022, entitled "Systems And Methods For Capturing And Generating Panoramic Three-Dimensional Models And Images," which is a continuation-in-part of, and seeks the benefit of U.S. application Ser. No. 17/137,958 filed Dec. 30, 2020, entitled "System and Method of Capturing and Generating Panoramic Three-Dimensional Images," which claims the benefit of U.S. Provisional Application No. 62/955,414, filed Dec. 30, 2019, entitled "System and Method of Capturing and Stitching Panoramic Images," all of which are incorporated in their entireties herein by reference.

FIELD OF THE INVENTION

Environment optical sensor data acquisition and processing of associated data for the purpose of creating a 3D model of that environment.

BACKGROUND

The popularity of providing three-dimensional (3D) panoramic images of the physical world has created many solutions that have the capability of creating a 3D models and associated image renderings based on captured 2D images and captured depth information.

The prior art includes a multitude of apparatuses that create 3D models of the surfaces of their environment using a variety of image capture devices (e.g., various types of cameras) in combination with depth information capture devices (e.g., lidar, structured light projection, etc.). For the purposes of this application, these apparatuses are called Environmental Capture Systems (ECS).

Existing ECS solutions take a prohibitively long time to capture image data and depth data, and are unable to produce high quality panoramic images in part because of anomalies introduced in the stitching process and inability to capture and process image and depth information, or depth data, over wide dynamic range of lighting conditions.

SUMMARY OF INVENTION

According to embodiments of the invention, an ECS captures image data and depth information of a 360-degree scene. In some embodiments, the captured image data can be used to generate a panoramic image of the 360-degree scene. In some embodiments, the panoramic image can be combined with the depth information to generate a three-dimensional (3D) panoramic image of a 360-degree scene. The ECS comprises a frame, a drive train mounted to the frame, and an image capture device coupled to the drive train to capture, while pointed in a first direction, a plurality of images at different exposures in a first field of view (FOV) of the 360-degree scene. The ECS further comprises a depth information capture device coupled to the drive train. The depth information capture device and the image capture device are rotated by the drive train about a first, substantially vertical, axis from the first direction to a second direction. The depth information capture device, while being rotated from the first direction to the second direction, captures depth information for a first portion of the 360-degree scene. The image capture device captures, while pointed in the second direction, a plurality of images at different exposures in a second FOV that overlaps the first FOV of the 360-degree scene. The depth information capture device and the image capture device are rotated by the drive train about the first axis from the second direction to a third direction. The depth information capture device, while being rotated from the second direction to the third direction, captures depth information for a second portion of the 360-degree scene. The image capture device, while pointed in the third direction, captures a plurality of images at different exposures in a third FOV that overlaps the second FOV of the 360-degree scene.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 20 is a representation of the distribution of laser beams for a lidar scanning plane in accordance with embodiments of the invention.

FIGS. 21A, 21B, 22C, 21D are operating state diagrams of the image capture system in accordance with embodiments of the invention.

FIGS. 22A, 22B, and 22C are an operating state diagrams of the lidar system in accordance with embodiments of the invention.

DETAILED DESCRIPTION

Many of the innovations described herein are made with reference to the drawings. In the following description, for purposes of explanation, numerous specific details are set forth to provide a thorough understanding. It may be evident, however, that different innovations can be practiced without these specific details. In other instances, well-known structures and components are shown in block diagram form to facilitate describing the innovations.

Figure 1A:
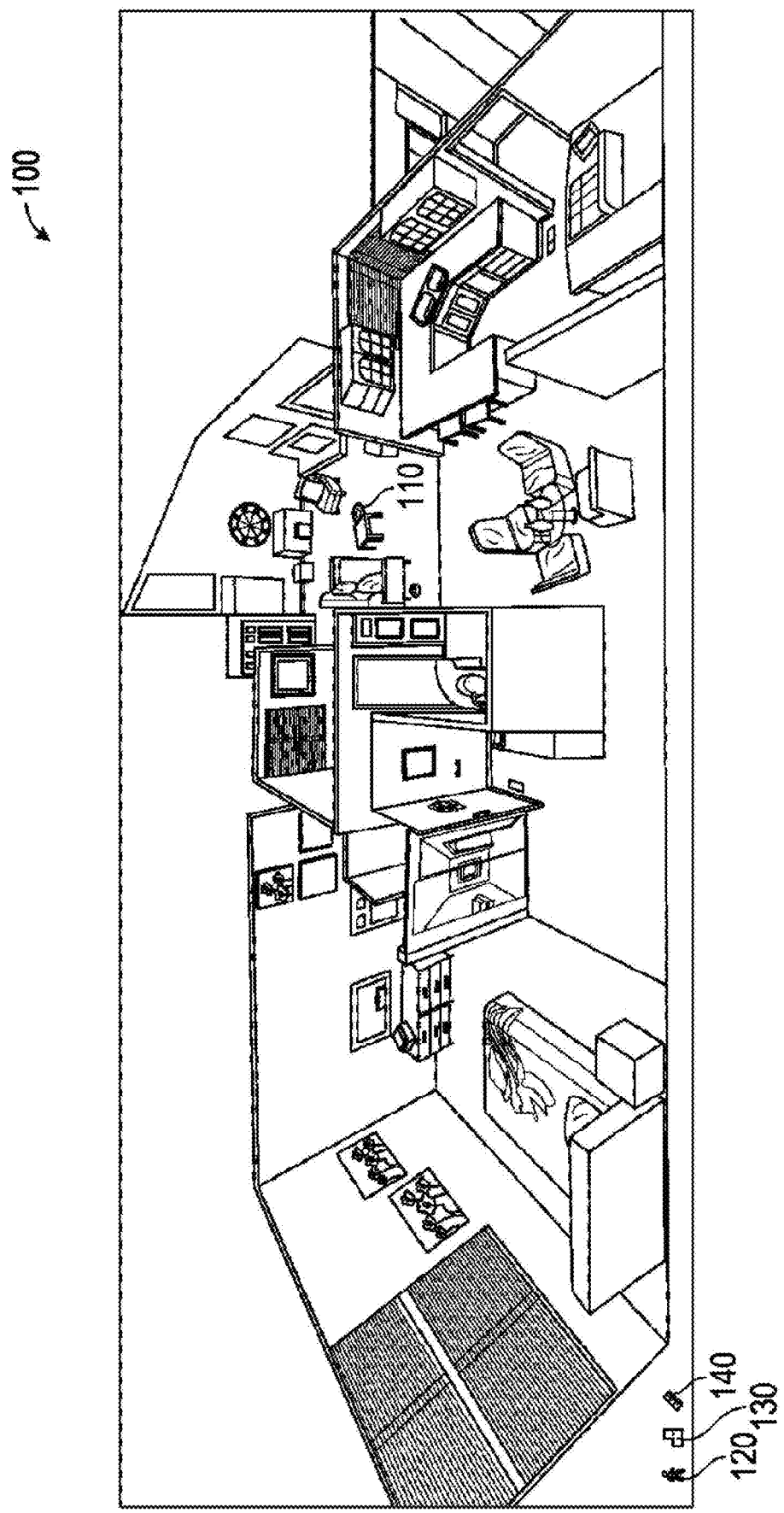
FIG. 1A depicts a dollhouse view of an example environment, such as a house, according to some embodiments.
Figure 1B:
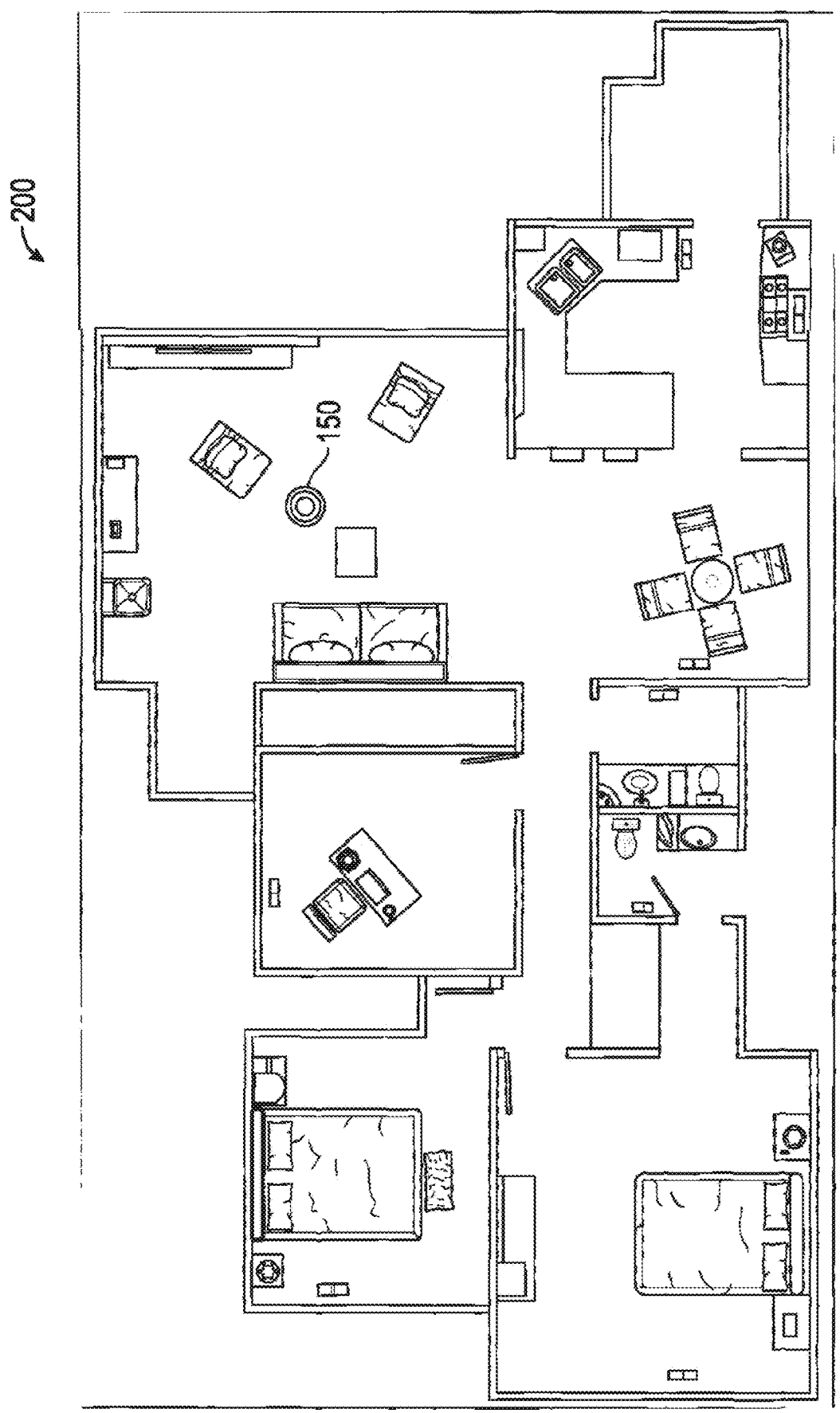
FIG. 1B depicts a floorplan view of the first floor of the house according to some embodiments.

FIG. 1A depicts a dollhouse view 100 of an example environment, such as a house, according to some embodiments. The dollhouse view 100 gives an overall view of the example environment captured by an environmental capture system (discussed herein). A user may interact with the dollhouse view 100 on a user system by toggling between different views of the example environment. For example, the user may interact with area 110 to trigger a floorplan view of the first floor of the house, as seen in FIG. 1B. In some embodiments, the user may interact with icons in the dollhouse view 100, such as icons 120, 130, and 140, to provide a walkthrough view (e.g., for a 3D walkthrough), a floorplan view, or a measurement view, respectively.

Figure 2:
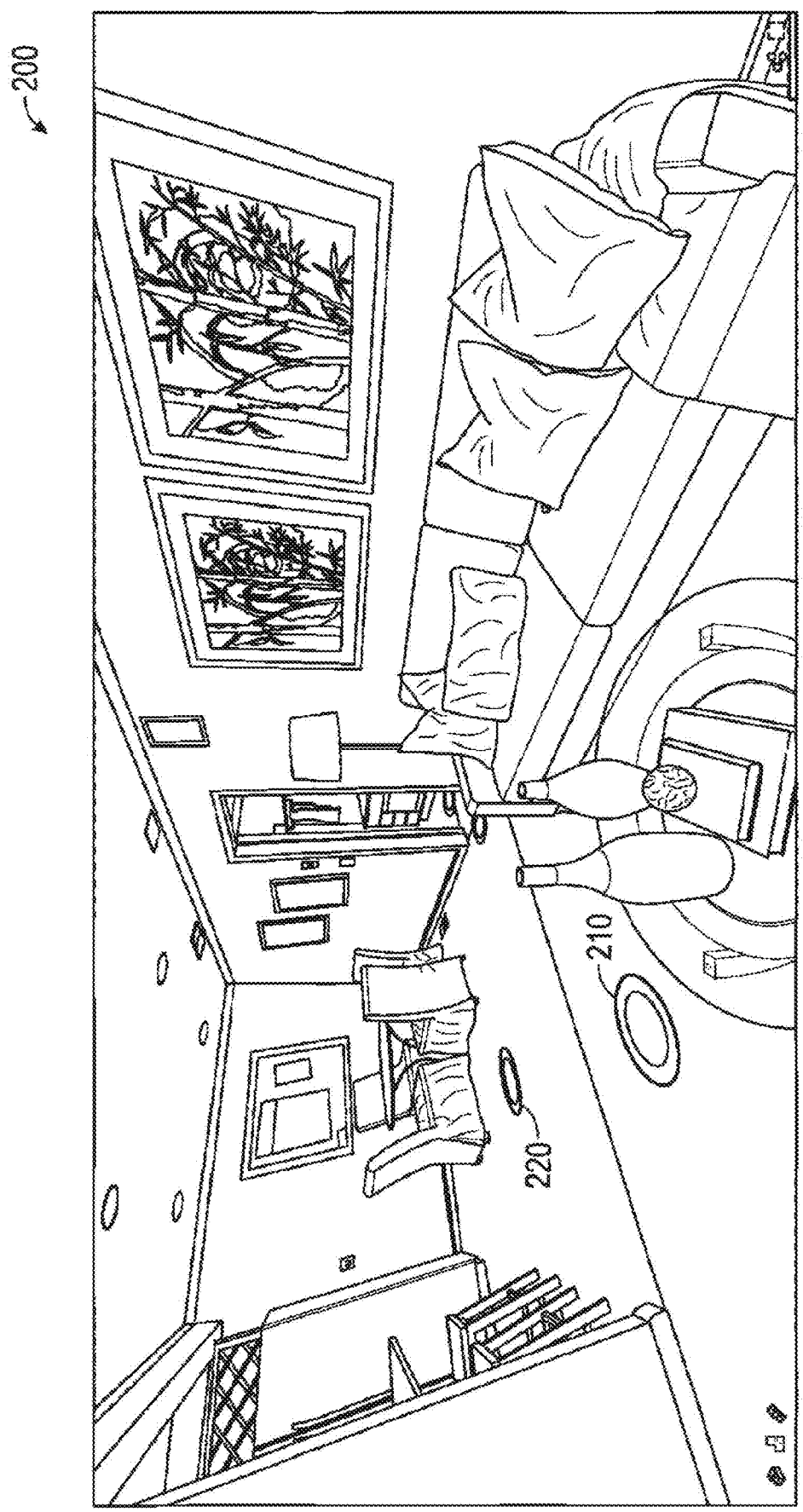
FIG. 2 depicts an example eye-level view of the living room which may be part of a virtual walkthrough.

FIG. 1B depicts a floorplan view 200 of the first floor of the house according to some embodiments. The floorplan view is a top-down view of the first floor of the house. The user may interact with areas of the floorplan view, such as the area 150, to trigger an eye-level view of a particular portion of the floorplan, such as a living room. An example of the eye-level view of the living room can be found in FIG. 2 which may be part of a virtual walkthrough.

The user may interact with a portion of the floorplan 200 corresponding to the area 150 of FIG. 1B. The user may move a view around the room as if the user was actually in the living room. In addition to a horizontal 360° view of the living room, the user may also view or navigate the floor or ceiling of the living room. Furthermore, the user may traverse the living room to other parts of the house by interacting with particular areas of the portion of the floorplan 200, such as areas 210 and 220. When the user interacts with the area 220, the ECS may provide a walking-style transition between the area of the house substantially corresponding to the region of the house depicted by area 150 to an area of the house substantially corresponding to the region of the house depicted by the area 220.

Figure 3:
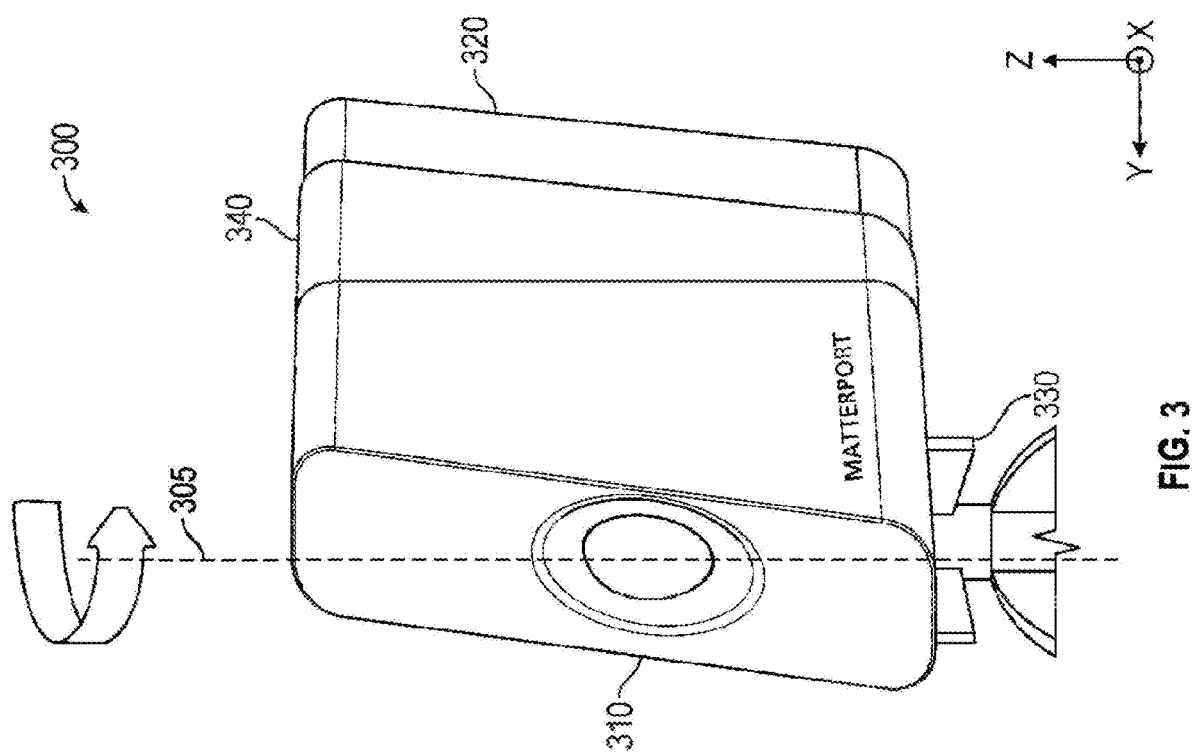
FIG. 3 depicts one example of an environmental capture system according to some embodiments.

FIG. 3 depicts one example of an environmental capture system 300 according to some embodiments. The environmental capture system 300 includes lens 310, a housing 320, a mount attachment 330, and a moveable cover 340.

When in use, the environmental capture system 300 may be positioned in an environment such as a room. The environmental capture system 300 may be positioned on a support (e.g., tripod). The moveable cover 340 may be moved to reveal a lidar and mirror that is capable of spinning. Once activated, the environmental capture system 300 may take a burst of images and then turn using a motor. The environmental capture system 300 may turn on the mount attachment 330. While turning, the lidar may take measurements (while turning, the environmental capture system may not take images). Once directed to a new direction, the environmental capture system may take another burst of images before turning to the next direction.

For example, once positioned, a user may command the environmental capture system 300 to start a sweep. The sweep may be as follows:

(1) Exposure estimation and then take HOR RGB images
Rotate 90 degrees capturing depth information, also referred to herein interchangeably as depth data
(2) Exposure estimation and then take HDR RGB images
Rotate 90 degrees capturing depth data
(3) Exposure estimation and then take HDR RGB images
Rotate 90 degrees capturing depth data
(4) Exposure estimation and then take HDR RGB images
Rotate 90 Degrees (Total 360) Capturing Depth Data For each burst, there may be any number of images at different exposures. The environmental capture system may blend any number of the images of a burst together while waiting for another frame and/or waiting for the next burst.

The lens 310 may be a part of a lens assembly. Further details of the lens assembly is provided in connection with the description of FIG. 7. The lens 310 is strategically placed at a center of an axis of rotation 305 of the environmental capture system 300. In this example, the axis of rotation 305 is on the x-y plane. By placing the lens 310 at the center of the axis of rotation 305, a parallax effect may be eliminated or reduced. Parallax is an error that arises due to the rotation of the image capture device about a point that is not a non-parallax point (NPP). In this example, the NPP can be found in the center of the lens's entrance pupil.

In some embodiments, the environmental capture system 300 may include a motor for turning the environmental capture system 300 about the mount attachment 330.

In some embodiments, a motorized mount may move the environmental capture system 300 along a horizontal axis, vertical axis, or both. In some embodiments, the motorized mount may rotate or move in the x-y plane. The use of a mount attachment 330 may allow for the environmental capture system 300 to be coupled to a motorized mount, tripod, or the like to stabilize the environmental capture system 300 to reduce or minimize shaking. In another example, the mount attachment 330 may be coupled to a motorized mount that allows the 3D, and environmental capture system 300 to rotate at a steady, known speed, which aids the lidar in determining the (x, y, z) coordinates of each laser pulse of the lidar.

Figure 4:
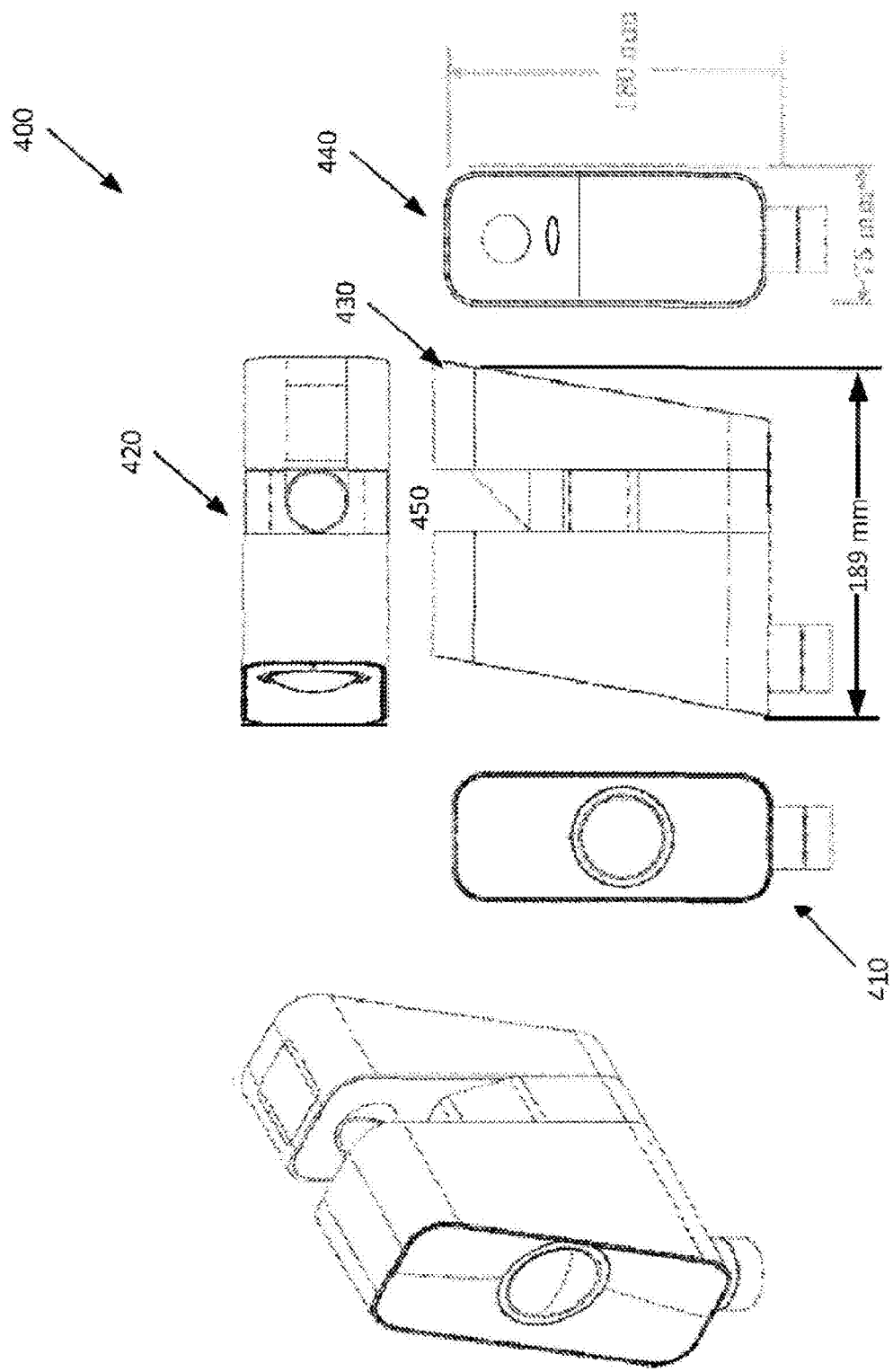
FIG. 4 depicts a rendering of an environmental capture system in some embodiments.

FIG. 4 depicts a rendering of an environmental capture system 400 in some embodiments. The rendering shows the environmental capture system 400 (which may be an example of the environmental capture system 300 of FIG. 3) from a variety of views, such as a front view 410, a top view 420, a side view 430, and a back view 440. In these renderings, the environmental capture system 400 may include an optional hollow portion depicted in the side view 430.

The lens depicted on the front view 410 may be a part of a lens assembly. Like the environmental capture system 300, the lens of the environmental capture system 400 is strategically placed at a center of an axis of rotation. The lens may include a large field of view. In various embodiments, the lens depicted on the front view 410 is recessed and the housing is flared such that the wide-angel lens is directly at the no-parallax point (e.g., directly above a mid-point of the mount and/or motor) but still may take images without interference from the housing.

In view 430, a mirror 450 is revealed. A lidar may emit a laser pulse to the mirror (for example, in a direction that is opposite or orthogonal about a substantially vertical axis to the lens view). The laser pulse may hit the mirror 450 which may be angled (e.g., at a 90 degree angle) The mirror 450 may be coupled to an internal motor that turns the mirror such at the laser pulses of the lidar may be emitted and/or received at many different angles around the environmental capture system 400.

Figure 5:
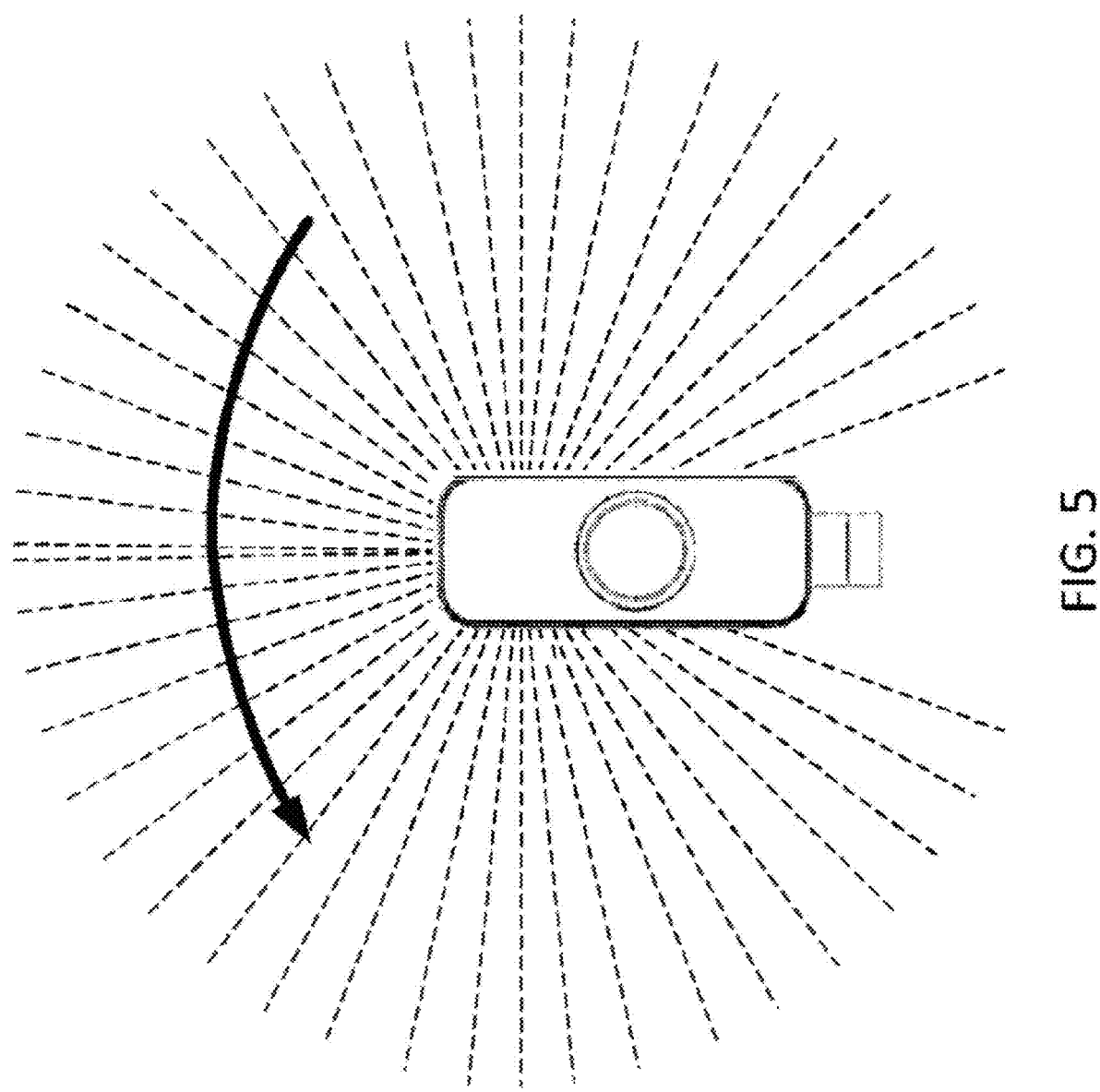
FIG. 5 is a depiction of the laser pulses from the lidar about the environmental capture system in some embodiments.

FIG. 5 is a depiction of the laser pulses from the lidar about the environmental capture system 400 in some embodiments. In this example, the laser pulses are emitted at the spinning mirror 450. The laser pulses may be emitted and received perpendicular to a horizontal axis 602 (see FIG. 6A) of the environmental capture system 400. The mirror 450 may be angled such that laser pulses from the lidar are directed away from the environmental capture system 400. In some examples, the angle of the angled surface of the mirror may be 90 degrees or be at or between 60 degree to 120 degrees.

In some embodiments, while the environmental capture system 400 is stationary and in operation, the environmental capture system 400 may take a burst of images through the lens. The environmental capture system 400 may turn on a horizontal motor between bursts of images. While turning along the mount, the lidar of the environmental capture system 400 may emit and/or receive laser pulses which hit the spinning mirror 450. The lidar may generate depth signals from the received laser pulse reflections and/or generate depth data.

In some embodiments, the depth data may be associated with coordinates about the environmental capture system 400. Similarly, pixels or parts of images may be associated with the coordinates about the environmental capture system 400 to enable the creation of the 3D visualization (e.g., an image from different directions, a 3D walkthrough, or the like) to be generated using the images and the depth data.

As shown in FIG. 5, the lidar pulses may be blocked by the bottom portion of the environmental capture system 400. It will be appreciated that the mirror 450 may spin consistently while the environmental capture system 400 moves about the mount or the mirror 450 may spin more slowly when the environmental capture system 400 starts to move and again when the environmental capture system 400 slows to stop (e.g., maintaining a constant speed between the starting and stopping of the mount motor).

The lidar may receive depth data from the pulses. Due to movement of the environmental capture system 400 and/or the increase or decrease of the speed of the mirror 450, the density of depth data about the environmental capture system 400 may be inconsistent (e.g., more dense in some areas and less dense in others).

Figure 6A:
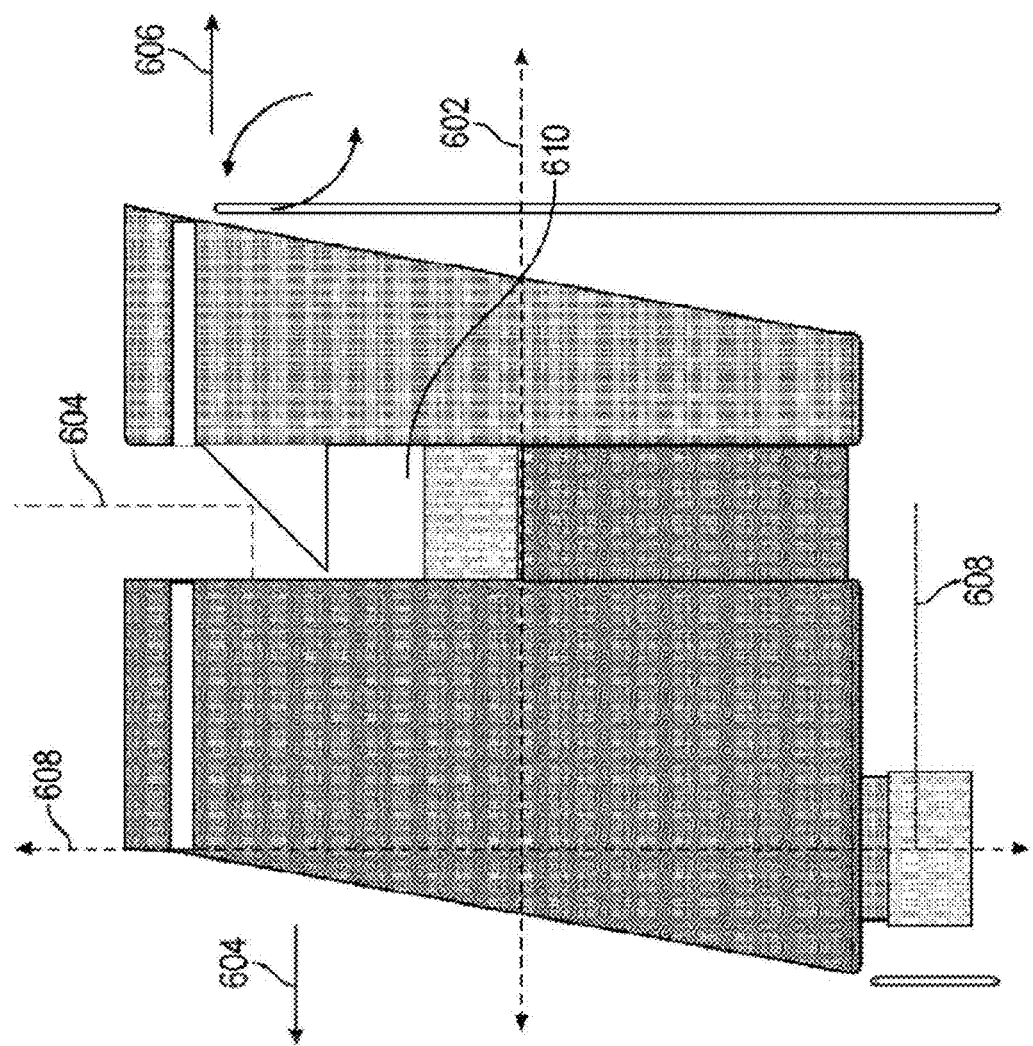
FIG. 6A depicts a side view of the environmental capture system.

FIG. 6A depicts a side view of the environmental capture system 400. In this view, the mirror 450 is depicted and may spin about a horizontal axis. The pulse 604 may be emitted by the lidar at the spinning mirror 450 and may be emitted perpendicular to the horizontal axis 602. Similarly, the pulse 604 may be received by the lidar in a similar manner.

Although the lidar pulses are discussed as being perpendicular to the horizontal axis 602, it will be appreciated that the lidar pulses may be at any angle relative to the horizontal axis 602 (e.g., the mirror angle may be at any angle including between 60 to 120 degrees). In various embodiments, the lidar emits pulses opposite a front side (e.g., front side 604) of the environmental capture system 400 (e.g., in a direction opposite of the center of the field of view of the lens or towards the back side 606).

As discussed herein, the environmental capture system 400 may turn about vertical axis 608. In various embodiments, the environmental capture system 400 takes images and then turns 90 degrees, thereby taking a fourth set of images when the environmental capture system 400 completes turning 270 degrees from the original starting position where the first set of images was taken. As such, the environmental capture system 400 may generate four sets of images between turns totaling 270 degrees (e.g., assuming that the first set of images was taken before the initial turning of the environmental capture system 400). In various embodiments, the images from a single sweep (e.g., the four sets of images) of the environmental capture system 400 (e.g., taken in a single full rotation or a rotation of 270 degrees about the vertical axis) is sufficient along with the depth data acquired during the same sweep to generate the 3D visualization without any additional sweeps or turns of the environmental capture system 400.

It will be appreciated that, in this example, lidar pulses are emitted and directed by the spinning mirror in a position that is distant from the point of rotation of the environmental capture system 400 (e.g., the lens may be at the no-parallax point while the mirror may be in a position behind the lens relative to the front of the environmental capture system 400. Since the lidar pulses are directed by the mirror 450 at a position that is off the point of rotation, the lidar may not receive depth data from a cylinder running from above the environmental capture system 400 to below the environmental capture system 400. In this example, the radius of the cylinder (e.g., the cylinder being a lack of depth information) may be measured from the center of the point of rotation of the motor mount to the point where the mirror 450 directs the lidar pulses.

Figure 6B:
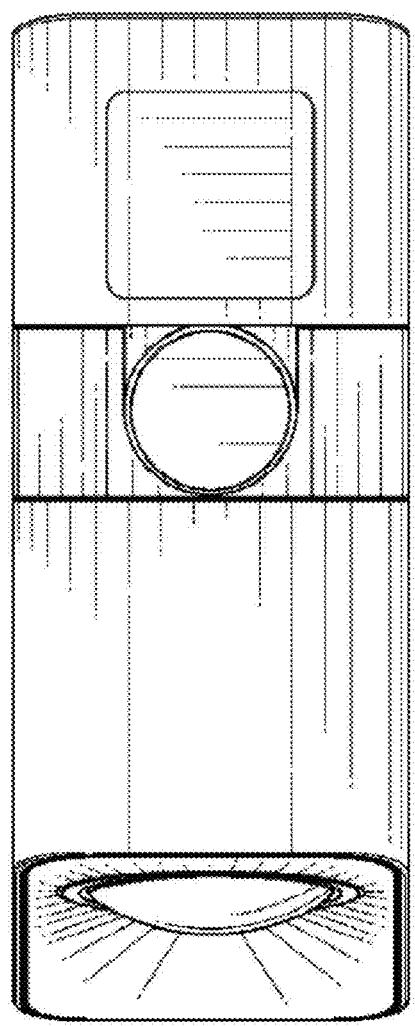
FIG. 6B depicts a view from above the environmental capture system in some embodiments.

Further, in FIG. 6B, cavity 610 is depicted. In this example, the environmental capture system 400 includes the spinning mirror within the body of the housing of the environmental capture system 400. There is a cut-out section from the housing. The laser pulses may be reflected by the mirror out of the housing and then reflections may be received by the mirror and directed back to the lidar to enable the lidar to create depth signals and/or depth data.

The base of the body of the environmental capture system 400 below the cavity 610 may block some of the laser pulses. The cavity 610 may be defined by the base of the environmental capture system 400 and the rotating mirror. As depicted in FIG. 6B, there may still be a space between an edge of the angled mirror and the housing of the environmental capture system 400 containing the lidar.

In various embodiments, the lidar is configured to stop emitting laser pulses if the speed of rotation of the mirror drops below a rotating safety threshold (e.g., if there is a failure of the motor spinning the mirror or the mirror is held in place). In this way, the lidar may be configured for safety and reduce the possibility that a laser pulse will continue to be emitted in the same direction (e.g., at a user's eyes).

FIG. 6B depicts a view from above the environmental capture system 400 in some embodiments. In this example, the front of the environmental capture system 400 is depicted with the lens recessed and directly above the center of the point of rotation (e.g., above the center of the mount). The front of the camera is recessed for the lens and the front of the housing is flared to allow the field of view of the image sensor to be unobstructed by the housing. The mirror 450 is depicted as pointing upwards.

Figure 7:
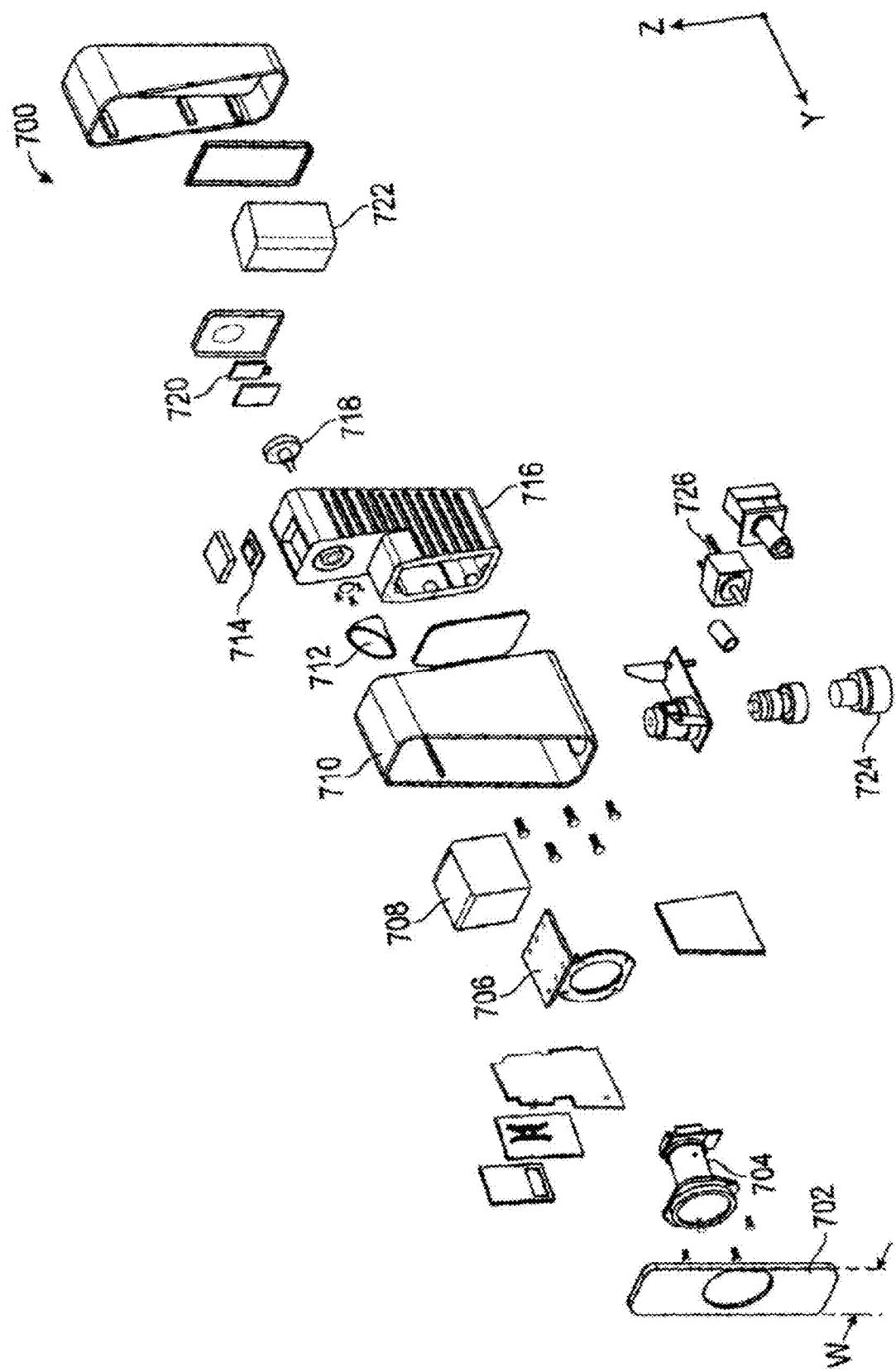
FIG. 7 depicts a rendering of the components of one example of the environmental capture system according to some embodiments.

FIG. 7 depicts a rendering of the components of one example of the environmental capture system 300 according to some embodiments. The environmental capture system 700 includes a front cover 702, a lens assembly 704, a structural frame 706, a lidar 708, a front housing 710, a mirror assembly 712, a GPS antenna 714, a rear housing 716, a vertical motor 718, a display 720, a battery pack 722, a mount 724, and a horizontal motor 726.

In various embodiments, the environmental capture system 700 may be configured to scan, align, and create 3D mesh outdoors in full sun as well as indoors. This removes a barrier to the adoption of other systems which are an indoor-only tool.

The front cover 702, the front housing 710, and the rear housing 716 make up a part of the housing. In one example, the front cover may have a width, w, of 75 mm.

Figure 8A:
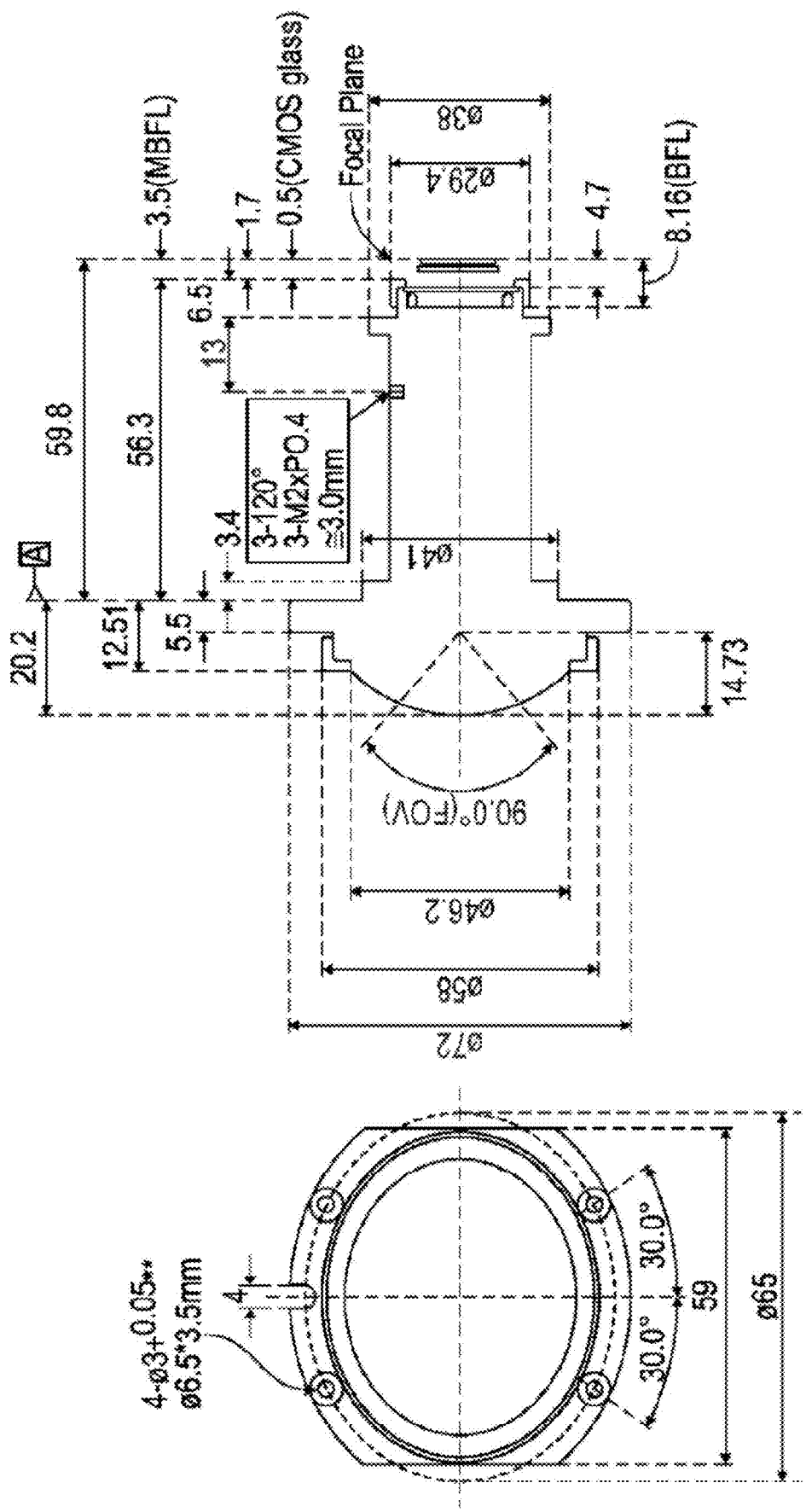
FIG. 8A depicts example lens dimensions in some embodiments.
Figure 8B:
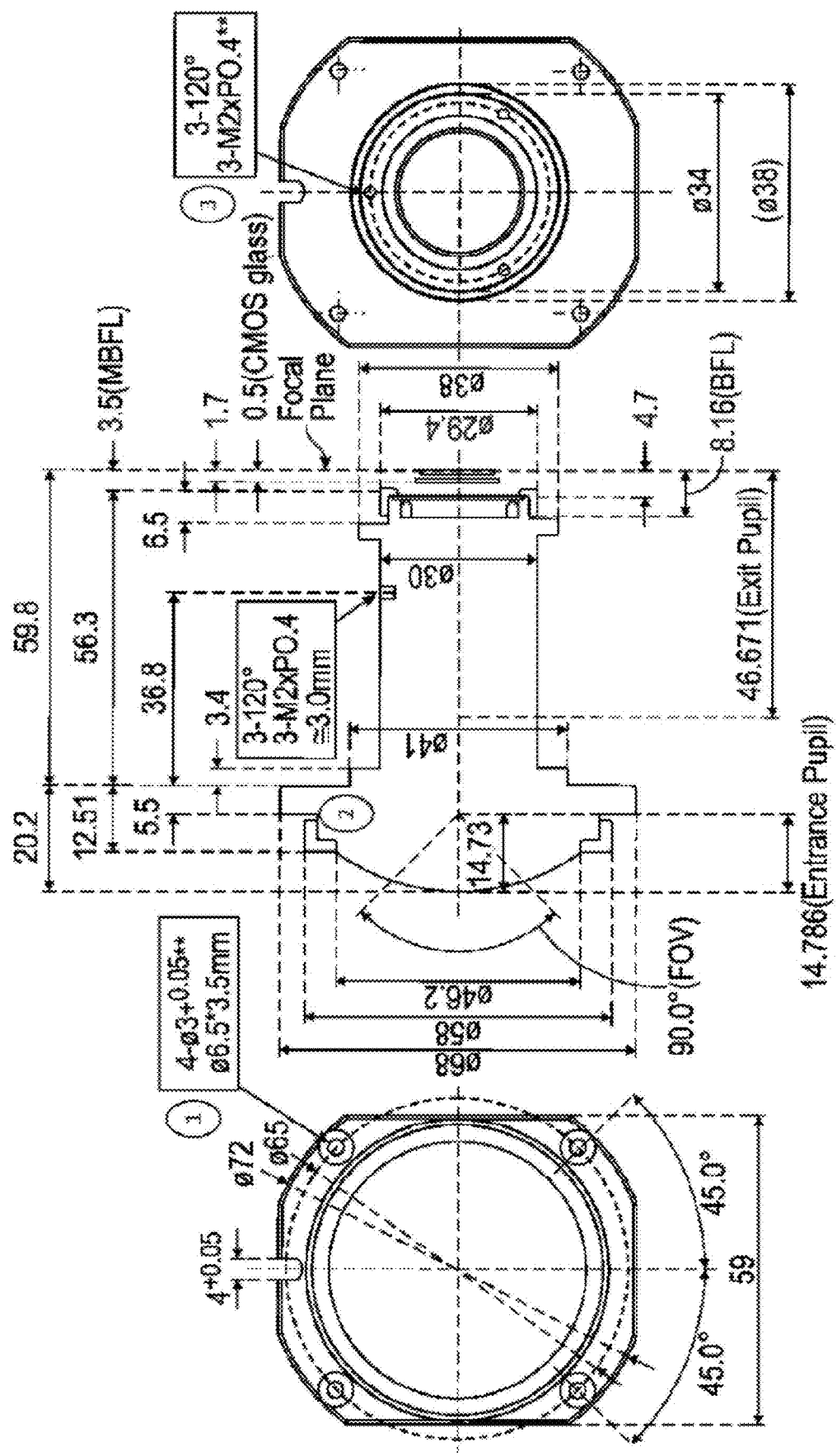
FIG. 8B depicts an example lens design specification in some embodiments.

The lens assembly 704 may include a camera lens that focuses light onto an image capture device. The image capture device may capture an image of a physical environment. The user may place the environmental capture system 700 to capture one portion of a floor of a building, to obtain a panoramic image of the one portion of the floor. The environmental capture system 700 may be moved to another portion of the floor of the building to obtain a panoramic image of another portion of the floor. In one example, the depth of field of the image capture device is 0.5 meters to infinity. FIG. 8A depicts example lens dimensions in some embodiments and FIG. 8B depicts an example lens design specification in some embodiments.

In some embodiments, the image capture device is a complementary metal-oxide-semiconductor (CMOS) image sensor. In various embodiments, the image capture device is a charged coupled device (CCD). In one example, the image capture device is a red-green-blue (RGB) sensor. In one embodiment, the image capture device is an infrared (IR) sensor. The lens assembly 704 may give the image capture device a wide field of view.

In some examples, the lens assembly 704 has an HFOV of at least 148 degrees and a VFOV of at least 94 degrees. In one example, the lens assembly 704 has a field of view of 150°, 180°, or be within a range of 145° to 180°. Image capture of a 360° view around the environmental capture system 700 may be obtained, in one example, with three or four separate image captures from the image capture device of environmental capture system 700. The output of the lens assembly 704 may be a digital image of one area of the physical environment. The images captured by the lens assembly 704 may be stitched together to form a 2D panoramic image of the physical environment. A 3D panoramic may be generated by combining the depth data captured by the lidar 708 with the 2D panoramic image generated by stitching together multiple images from the lens assembly 704. In some embodiments, the images captured by the environmental capture system 400 are stitched together by an image processing system, such as image stitching and processor system 1105, user system 1110, and/or performed by environmental capture system 400. In various embodiments, the environmental capture system 400 generates a "preview" or "thumbnail" version of a 2D panoramic image. The preview or thumbnail version of the 2D panoramic image may be presented on a user system 1110 such as an iPad, personal computer, smartphone, or the like. In some embodiments, the environmental capture system 400 may generate a mini-map of a physical environment representing an area of the physical environment. In various embodiments, the image processing system generates the mini-map representing the area of the physical environment.

The images captured by the lens assembly 704 may include capture device location data that identifies or indicates a capture location of a 2D image. For example, in some implementations, the capture device location data can include a global positioning system (GPS) coordinates associated with a 2D image. In other implementations, the capture device location data can include position information indicating a relative position of the capture device (e.g., the camera and/or a 3D sensor) to its environment, such as a relative or calibrated position of the capture device to an object in the environment, another camera in the environment, another device in the environment, or the like. In some implementations, this type of location data can be determined by the capture device (e.g., the camera and/or a device operatively coupled to the camera comprising positioning hardware and/or software) in association with the capture of an image and received with the image. The placement of the lens assembly 704 is not solely by design. By placing the lens assembly 704 at the center, or substantially at the center, of the axis of rotation, the parallax effect may be reduced.

In some embodiments, the structural frame 706 holds the lens assembly 704 and the lidar 708 in a particular position and may help protect the components of the example of the environmental capture system. The structural frame 706 may serve to aid in rigidly mounting the lidar 708 and place the lidar 708 in a fixed position. Furthermore, the fixed position of the lens assembly 704 and the lidar 708 enable a fixed relationship to align the depth data with the image information to assist with creating the 3D images. The 2D image data and depth data captured in the physical environment can be aligned relative to a common 3D coordinate space to generate a 3D model of the physical environment.

In various embodiments, the lidar 708 captures depth information of a physical environment. When the user places the environmental capture system 700 in one portion of a floor of a building, the lidar 708 may obtain depth information of objects. The lidar 708 may include an optical sensing module that can measure the distance to a target or objects in a scene by utilizing pulses from a laser to irradiate a target or scene and measure the time it takes photons to travel to the target and return to the lidar 708. The measurement may then be transformed into a grid coordinate system by using information derived from a horizontal drive train of the environmental capture system 700.

In some embodiments, the lidar 708 may return depth data points every 10 microseconds (usec) with a timestamp (of an internal clock). The lidar 708 may sample a partial sphere (small holes at top and bottom) every 0.25 degrees. In some embodiments, with a data point every 10 usec and 0.25 degrees, there may be a 14.40 milliseconds per "disk" of points and 1440 disks to make a sphere that is nominally 20.7 seconds.

One advantage of utilizing lidar is that with a lidar at the lower wavelength (e.g., 905 nm, 900-940 nm, or the like) it allows the environmental capture system 700 to determine depth information for an outdoor environment or an indoor environment with bright light.

The placement of the lens assembly 704 and the lidar 708 may allow the environmental capture system 700 or a digital device in communication with the environmental capture system 700 to generate a 3D panoramic image using the depth data from the lidar 708 and the lens assembly 704. In some embodiments, the 2D and 3D panoramic images are not generated on the environmental capture system 400.

The output of the lidar 708 may include attributes associated with each laser pulse sent by the lidar 708. The attributes include the intensity of the laser pulse, number of returns, the current return number, classification point, RGC values, GPS time, scan angle, the scan direction, or any combination therein. The depth of field may be (0.5 m; infinity), (1 m; infinity), or the like. In some embodiments, the depth of field is 0.2 m to 1 m and infinity.

In some embodiments, the environmental capture system 700 captures four separate RBG images using the lens assembly 704 while the environmental capture system 700 is stationary. In various embodiments, the lidar 708 captures depth data in four different instances while the environmental capture system 700 is in motion, moving from one RBG image capture position to another RBG image capture position. In one example, the 3D panoramic image is captured with a 360° rotation of the environmental capture system 700, which may be called a sweep. In various embodiments, the 3D panoramic image is captured with a less than 360° rotation of the environmental capture system 700. The output of the sweep may be a sweep list (SWL), which includes image data from the lens assembly 704 and depth data from the lidar 708 and properties of the sweep, including the GPS location and a timestamp of when the sweep took place. In various embodiments, a single sweep (e.g., a single 360 degree turn of the environmental capture system 700) captures sufficient image and depth information to generate a 3D visualization (e.g., by the digital device in communication with the environmental capture system 700 that receives the imagery and depth data from the environmental capture system 700 and creates the 3D visualization using only the imagery and depth data from the environmental capture system 700 captured in the single sweep).

In some embodiments, the images captured by the environmental capture system 400 may be blended, stitched together, and combined with the depth data from the lidar 708 by an image stitching and processing system discussed herein.

In various embodiments, the environmental capture system 400 and/or an application on the user system 1110 may generate a preview or thumbnail version of a 3D panoramic image. The preview or thumbnail version of the 3D panoramic image may be presented on the user system 1110 and may have a lower image resolution than the 3D panoramic image generated by the image processing system. After the lens assembly 704 and the lidar 708 captures the images and depth data of the physical environment, the environmental capture system 400 may generate a mini-map representing an area of the physical environment that has been captured by the environmental capture system 400. In some embodiments, the image processing system generates the mini-map representing the area of the physical environment. After capturing images and depth data of a living room of a home using the environmental capture system 400, the environmental capture system 400 may generate a top-down view of the physical environment. A user may use this information to determine areas of the physical environment in which the user has not captured or generated 3D panoramic images.

In one embodiment, the environmental capture system 700 may interleave image capture with the image capture device of the lens assembly 704 with depth information capture with the lidar 708. For example, the image capture device may capture an image from the physical environment with the image capture device, and then lidar 708 obtains depth information from the physical environment. Once the lidar 708 obtains depth information, the image capture device may move on to capture an image at another location in the physical environment, and then lidar 708 obtains depth information from another portion, thereby interleaving image capture and depth information capture.

In some embodiments, the lidar 708 may have a field of view of at least 145°, depth information of all objects in a 360° view of the environmental capture system 700 may be obtained by the environmental capture system 700 in three or four scans. In another example, the lidar 708 may have a field of view of at least 150°, 180°, or between 145° to 180°.

An increase in the field of view of the lens reduces the amount of time required to obtain visual and depth information of the physical environment around the environmental capture system 700.

The lidar 708 may utilize the mirror assembly 712 to direct the laser in different scan angles. In one embodiment. In some embodiments, the mirror assembly 712 may be a dielectric mirror with a hydrophobic coating or layer. The mirror assembly 712 may be coupled to the vertical motor 718 that rotates the mirror assembly 712 when in use.

By capturing images with multiple levels of exposures and using a 900 nm based lidar system 708, the environmental capture system 700 may capture images outside in bright sunlight or inside with bright lights or sunlight glare from windows.

In some embodiments, the mount 724 provides a connector for the environmental capture system 700 to connect to a platform such as a tripod or mount. The horizontal motor 726 may rotate the environmental capture system 700 around an x-y plane. In some embodiments, the horizontal motor 726 may provide information to a grid coordinate system to determine (x, y, z) coordinates associated with each laser pulse. In various embodiments, due to the broad field of view of the lens, the positioning of the lens around the axis of rotation, and the lidar device, the horizontal motor 726 may enable the environmental capture system 700 to scan quickly.

In various embodiments, the mount 724 may include a quick release adapter. The holding torque may be, for example, >2.0 Nm and the durability of the capture operation may be up to or beyond 70,000 cycles.

For example, the environmental capture system 700 may enable construction of a 3D mesh of a standard home with a distance between sweeps greater than 8☐. A time to capture, process, and align an indoor sweep may be under 45 seconds. In one example, a time frame from the start of a sweep capture to when the user can move the environmental capture system 700 may be less than 15 seconds.

In various embodiments, these components provide the environmental capture system 700 the ability to align scan positions outdoor as well as indoor and therefore create seamless walk-through experiences between indoor and outdoor (this may be a high priority for hotels, vacation rentals, real estate, construction documentation, CRE, and as-built modeling and verification. The environmental capture system 700 may also create an "outdoor dollhouse" or outdoor mini-map. The environmental capture system 700, as shown herein, may also improve the accuracy of the 3D reconstruction, mainly from a measurement perspective. For scan density, the ability for the user to tune it may also be a plus. These components may also enable the environmental capture system 700 the ability to capture wide empty spaces (e.g., longer range). In order to generate a 3D model of wide empty spaces may require the environmental capture system to scan and capture 3D data and depth data from a greater distance range than generating a 3D model of smaller spaces.

In various embodiments, these components enable the environmental capture system 700 to align SWLs and reconstruct the 3D model in a similar way for indoor as well as outdoor use. These components may also enable the environmental capture system 700 to perform gee-localization of 3D models (which may case integration to Google street view and help align outdoor panoramas if needed).

In some embodiments, the image and depth data may then be sent to a capture application (e.g., a device in communication with the environmental c capture system 700, such as a smart device or an image capture system on a network). In some embodiments, the environmental capture system 700 may send the image and depth data to the image processing system for processing and generating the 2D panoramic image or the 3D panoramic image. In various embodiments, the environmental capture system 700 may generate a sweep list of the captured RGB image and the depth data from a 360-degree revolution of the environmental capture system 700. The sweep list may be sent to the image processing system for stitching and aligning. The output of the sweep may be a SWL, which includes image data from the lens assembly 704 and depth data from the lidar 708 and properties of the sweep, including the GPS location and a timestamp of when the sweep took place.

Figure 9A:
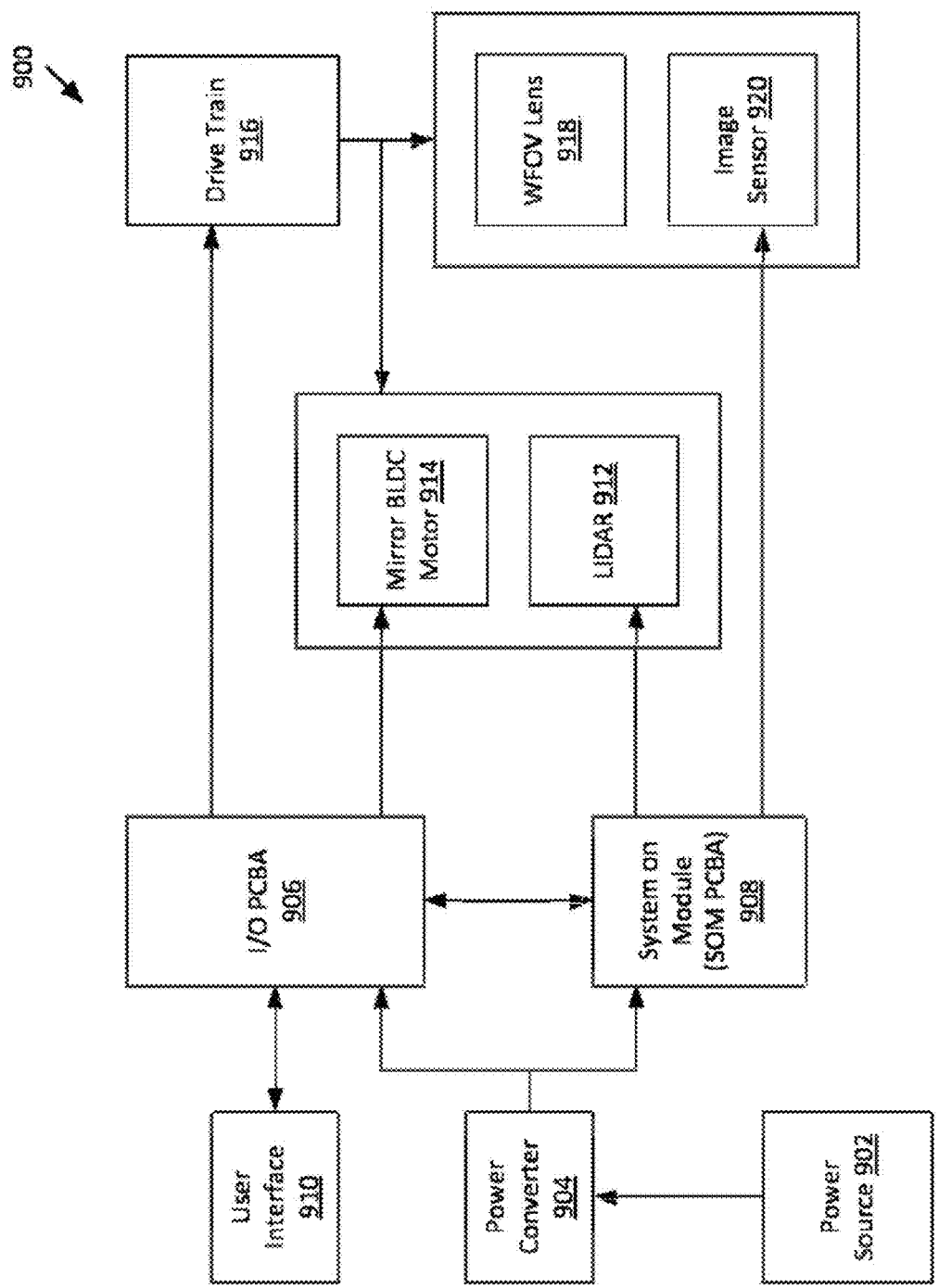
FIG. 9A depicts a block diagram of an example of an environmental capture system according to some embodiments.

FIG. 9A depicts a block diagram 900 of an example of an environmental capture system according to some embodiments. The block diagram 900 includes a power source 902, a power converter 904, an input/output (I/O) printed circuit board assembly (PCBA), a system on module (SOM) PCBA, a user interface 910, a lidar 912, a mirror brushless direct current (BLCD) motor 914, a drive train 916, wide FOV (WFOV) lens 918, and an image sensor 920.

The power converter 904 may change the voltage level from the power source 902 to a lower or higher voltage level so that it may be utilized by the electronic components of the environmental capture system. The environmental capture system may utilize 4×18650 Li-Ion cells in 4S1P configuration, or four series connections and one parallel connection configuration.

In some embodiments, the I/O PCBA 906 may include elements that provide IMU, Wi-Fi, GPS, Bluetooth, inertial measurement unit (IMU), motor drivers, and microcontrollers. In some embodiments, the I/O PCBA 906 includes a microcontroller for controlling the horizontal motor and encoding horizontal motor controls as well as controlling the vertical motor and encoding vertical motor controls.

The SOM PCBA 908 may include a central processing unit (CPU) and/or graphics processing unit (GPU), memory, and mobile interface. The SOM PCBA 908 may control the lidar 912, the image sensor 920, and the I/O PCBA 906. The SOM PCBA 908 may determine the (x, y, z) coordinates associated with each laser pulse of the lidar 912 and store the coordinates in a memory component of the SOM PCBA 908. In some embodiments, the SOM PCBA 908 may store the coordinates in the image processing system of the environmental capture system 400. In addition to the coordinates associated with each laser pulse, the SOM PCBA 908 may determine additional attributes associated with each laser pulse, including the intensity of the laser pulse, number of returns, the current return number, classification point, RGC values, GPS time, scan angle, and the scan direction.

The user interface 910 may include physical buttons or switches with which the user may interact with. The buttons or switches may provide functions such as turn the environmental capture system on and off, scan a physical environment, and others. In some embodiments, the user interface 910 may include a display such as the display 720 of FIG. 7.

The SOM PCBA 908 may determine the coordinates based on the location of the drive train 916. In various embodiments, the lidar 912 may include one or more lidar devices. Multiple lidar devices may be utilized to increase the lidar resolution.

In some embodiments, the drive train 916 includes a vertical monogon mirror and motor. In this example, the drive train 916 may include a BLDC motor, an external hall effect sensor, a magnet (paired with Hall effect sensor), a mirror bracket, and a mirror.

The placement of the components of the environmental capture system is such that the lens assembly and the lidar are substantially placed at a center of an axis of rotation. This may reduce the image parallax that occurs when an image capture system is not placed at the center of the axis of rotation.

An image capture device may include the WFOV lens 918 and the image sensor 920. The image sensor 920 may be a CMOS image sensor. In one embodiment, the image sensor 920 is a charged coupled device (CCD). In some embodiments, the image sensor 920 is a red-green-blue (RGB) sensor. In one embodiment, the image sensor 920 is an IR sensor.

Figure 9B:
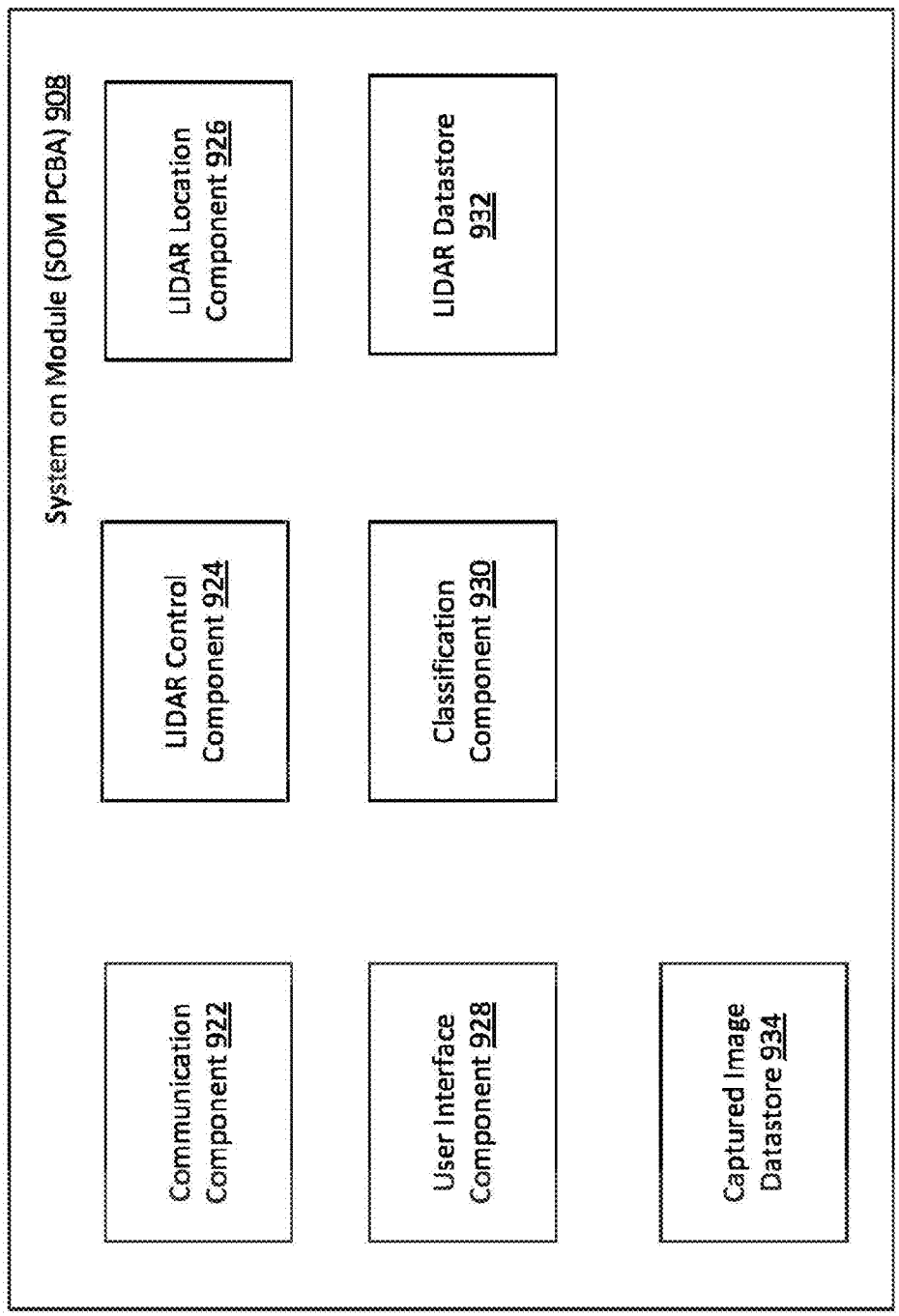
FIG. 9B depicts a block diagram of an example SOM PCBA of the environmental capture system according to some embodiments.

FIG. 9B depicts a block diagram of an example SOM PCBA 908 of the environmental capture system according to some embodiments. The SOM PCBA 908 may include a communication component 922, a lidar control component 924, a lidar location component 926, a user interface component 928, a classification component 930, a lidar datastore 932, and a captured image datastore 934.

In some embodiments, the communication component 922 may send and receive requests or data between any of the components of the SOM PCBA 1008 and components of the environmental capture system of FIG. 9A.

In various embodiments, the lidar control component 924 may control various aspects of the lidar. For example, the lidar control component 924 may send a control signal to the lidar 912 to start sending out a laser pulse. The control signal sent by the lidar control component 924 may include instructions on the frequency of the laser pulses.

In some embodiments, the lidar location component 926 may utilize GPS data to determine the location of the environmental capture system. In various embodiments, the lidar location component 926 utilizes the position of the mirror assembly to determine the scan angle and (x, y, z)

coordinates associated with each laser pulse. The lidar location component 926 may also utilize the IMU to determine the orientation of the environmental capture system.

The user interface component 928 may facilitate user interaction with the environmental capture system. In some embodiments, the user interface component 928 may provide one or more user interface elements with which a user may interact. The user interface provided by the user interface component 928 may be sent to the user system 1110. For example, the user interface component 928 may provide to the user system (e.g., a digital device) a visual representation of an area of a floorplan of a building. As the user places the environmental capture system in different parts of the story of the building to capture and generate 3D panoramic images, the environmental capture system may generate the visual representation of the floorplan. The user may place the environmental capture system in an area of the physical environment to capture and generate 3D panoramic images in that region of the house. Once the 3D panoramic image of the area has been generated by the image processing system, the user interface component may update the floorplan view with a top-down view of the living room area depicted in FIG. 1B. In some embodiments, the floorplan view 200 may be generated by the user system 1110 after a second sweep of the same home, or floor of a building has been captured.

The lidar datastore 932 may be any structure and/or structures suitable for captured lidar data (e.g., an active database, a relational database, a self-referential database, a table, a matrix, an array, a flat file, a documented-oriented storage system, a non-relational No-SQL system, an FTS-management system such as Lucene/Solar, and/or the like). The image datastore 408 may store the captured lidar data. However, the lidar datastore 932 may be utilized to cache the captured lidar data in cases where the communication network 404 is nonfunctional. For example, in cases where the environmental capture system 400 and the user system 1110 are in a remote location with no cellular network or in a region with no Wi-Fi, the lidar datastore 932 may store the captured lidar data until they can be transferred to the image datastore 934.

Figure 10A:
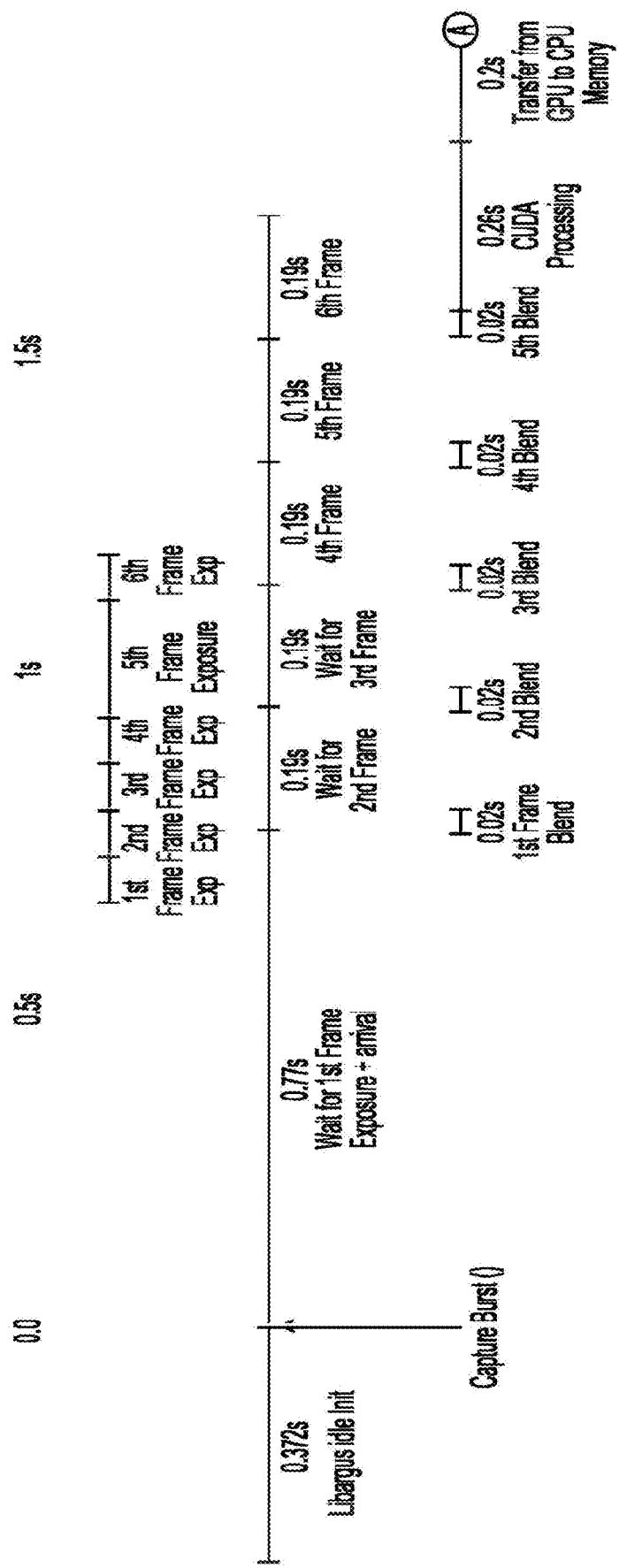
FIG. 10A-10C depicts a process for the environmental capture system for taking images in some embodiments.
Figure 10B:
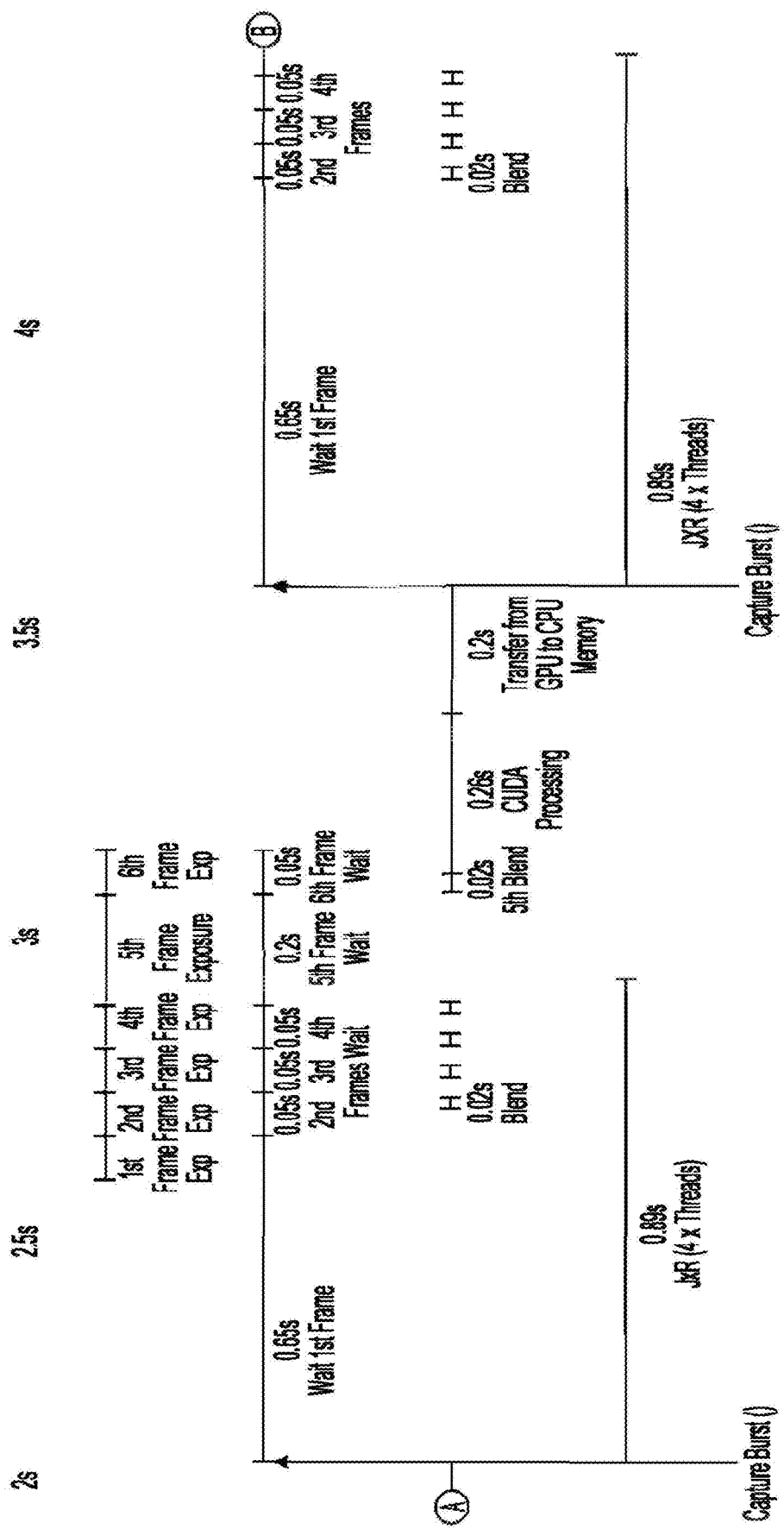
Figure 10C:
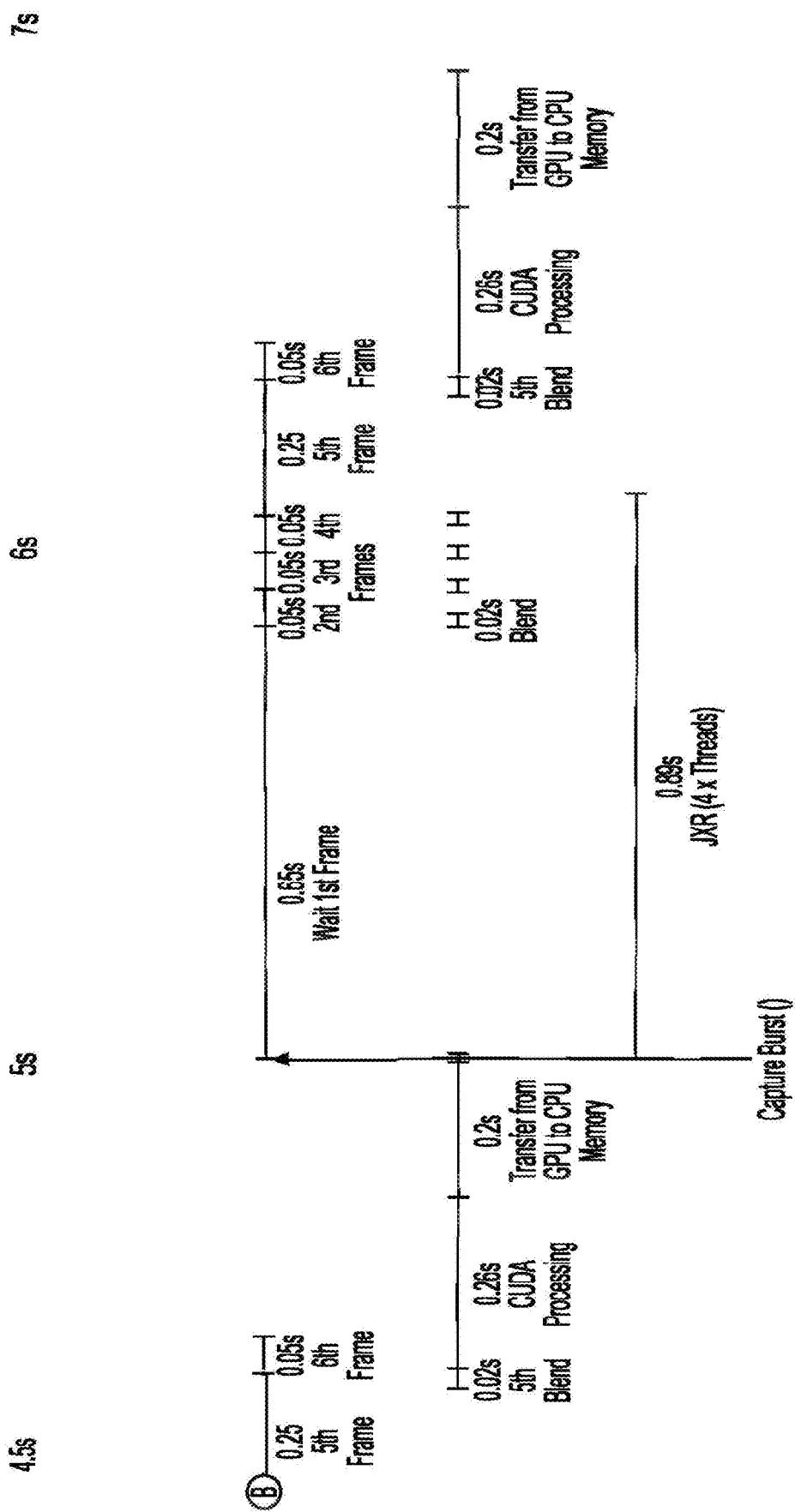

FIG. 10A-10C depicts a process for the environmental capture system 400 for taking images in some embodiments. As depicted in FIG. 10A-10C, the environmental capture system 400 may take a burst of images at different exposures. A burst of images may be a set of images, each with different exposures. The first image burst happens at time 0.0. The environmental capture system 400 may receive the first frame and then assess the frame while waiting for the second frame. FIG. 10A indicates that the first frame is blended before the second frame arrives. In some embodiments, the environmental capture system 400 may process each frame to identify pixels, color, and the like. Once the next frame arrives, the environmental capture system 400 may process the recently received frame and then blend the two frames together.

In various embodiments, the environmental capture system 400 performs image processing to blend the sixth frame and further assess the pixels in the blended frame (e.g., the frame that may include elements from any number of the frames of the image burst). During the last step prior to or during movement (e.g., turning) of the environmental capture system 400, the environmental capture system 400 may optionally transfer the blended image from the graphic processing unit to CPU memory.

The process continues in FIG. 10B. At the beginning of FIG. 10B, the environmental capture system 400 conducts another burst. The environmental capture system 400 may compress the blended frames and/or all or parts of the captured frames using JxR). Like FIG. 10A, a burst of images may be a set of images, each with different exposures (the length of exposure for each frame in the set may the same and in the same order as other bursts covered in FIGS. 10A and 10C). The second image burst happens at time 2 second. The environmental capture system 400 may receive the first frame and then assess the frame while waiting for the second frame. FIG. 10B indicates that the first frame is blended before the second frame arrives. In some embodiments, the environmental capture system 400 may process each frame to identify pixels, color, and the like. Once the next frame arrives, the environmental capture system 400 may process the recently received frame and then blend the two frames together.

In various embodiments, the environmental capture system 400 performs image processing to blend the sixth frame and further assess the pixels in the blended frame (e.g., the frame that may include elements from any number of the frames of the image burst). During the last step prior to or during movement (e.g., turning) of the environmental capture system 400, the environmental capture system 400 may optionally transfer the blended image from the graphic processing unit to CPU memory.

After turning, the environmental capture system 400 may continue the process by conducting another color burst (e.g., after turning 180 degrees) at about time 3.5 seconds. The environmental capture system 400 may compress the blended frames and/or all or parts of the captured frames using JxR). The burst of images may be a set of images, each with different exposures (the length of exposure for each frame in the set may the same and in the same order as other bursts covered in FIGS. 10A and 10C). The environmental capture system 400 may receive the first frame and then assess the frame while waiting for the second frame. FIG. 10B indicates that the first frame is blended before the second frame arrives. In some embodiments, the environmental capture system 400 may process each frame to identify pixels, color, and the like. Once the next frame arrives, the environmental capture system 400 may process the recently received frame and then blend the two frames together.

In various embodiments, the environmental capture system 400 performs image processing to blend the sixth frame and further assess the pixels in the blended frame (e.g., the frame that may include elements from any number of the frames of the image burst). During the last step prior to or during movement (e.g., turning) of the environmental capture system 400, the environmental capture system 400 may optionally transfer the blended image from the graphic processing unit to CPU memory.

The last burst happens at time 5 seconds in FIG. 10C. The environmental capture system 400 may compress the blended frames and/or all or parts of the captured frames using JxR). The burst of images may be a set of images, each with different exposures (the length of exposure for each frame in the set may the same and in the same order as other bursts covered in FIGS. 10A and 10B). The environmental capture system 400 may receive the first frame and then assess the frame while waiting for the second frame. FIG. 10C indicates that the first frame is blended before the second frame arrives. In some embodiments, the environmental capture system 400 may process each frame to identify pixels, color, and the like. Once the next frame arrives, the environmental capture system 400 may process the recently received frame and then blend the two frames together.

In various embodiments, the environmental capture system 400 performs image processing to blend the sixth frame and further assess the pixels in the blended frame (e.g., the frame that may include elements from any number of the frames of the image burst). During the last step prior to or during movement (e.g., turning) of the environmental capture system 400, the environmental capture system 400 may optionally transfer the blended image from the graphic processing unit to CPU memory.

The dynamic range of an image capture device is a measure of how much light an image sensor can capture. The dynamic range is the difference between the darkest area to the brightest area of an image. There are many ways to increase the dynamic range of the image capture device, one of which is to capture multiple images of the same physical environment using different exposures. An image captured with a short exposure will capture brighter areas of the physical environment, while a long exposure will capture darker physical environment areas. In some embodiments, the environmental capture system may capture multiple images with six different exposure times. Some or all of the images captured by the environmental capture system are used to generate 2D images with high dynamic range (HDR). One or more of the captured images may be used for other functions such as ambient light detection, flicker detection, and the like.

A 3D panoramic image of the physical environment may be generated based on four separate image captures of the image capture device and four separate depth data capture of the lidar device of the environmental capture system. Each of the four separate image captures may include a series of image captures of different exposure times. A blending algorithm may be used to blend the series of image captures with the different exposure times to generate one of four RGB image captures, which may be utilized to generate a 2D panoramic image. For example, the environmental capture system may be used to capture a 3D panoramic image of a kitchen. Images of one wall of the kitchen may include a window, an image with an image captured with a shorter exposure may provide the view out the window but may leave the rest of the kitchen underexposed. In contrast, another image captured with a longer exposure may provide the view of the interior of the kitchen. The blending algorithm may generate a blended RGB image by blending the view out the window of the kitchen from one image with the rest of the kitchen's view from another image.

In various embodiments, the 3D panoramic image may be generated based on three separate image captures of the image capture device and four separate depth data captures of the lidar device of the environmental capture environmental capture system. In some embodiments, the number of image captures, and the number of depth data captures may be the same. In one embodiment, the number of image captures, and the number of depth data captures may be different.

After capturing a first of a series of images with one exposure time, a blending algorithm receives the first of the series of images, calculate initial intensity weights for that image, and set that image as a baseline image for combining the subsequently received images. In some embodiments, the blending algorithm may utilize a graphic processing unit (GPU) image processing routine such as a "blend_kernel" routine. The blending algorithm may receive subsequent images that may be blended with previously received images. In some embodiments, the blending algorithm may utilize a variation of the blend_kernel GPU image processing routine.

In one embodiment, the blending algorithm utilizes other methods of blending multiple images, such as determining the difference between the darkest and brightest part, or contrast, of the baseline image to determine if the baseline image may be overexposed or underexposed. For example, a contrast value less than a predetermine contrast threshold means that the baseline image is overexposed or underexposed. In one embodiment, the contrast of the baseline image may be calculated by taking an average of the image's light intensity or a subset of the image. In some embodiments, the blending algorithm calculates an average light intensity for each row or column of the image. In some embodiments, the blending algorithm may determine a histogram of each of the images received from the image capture device and analyze the histogram to determine light intensities of the pixels which make up each of the images.

In various embodiments, the blending may involve sampling colors within two or more images of the same scene, including along objects and seems. If there is a significant difference in color between the two images (e.g., within a predetermined threshold of color, hue, brightness, saturation, and/or the like), a blending module (e.g., on the environmental capture system 400 or the user device 1110) may blend a predetermined size of both images along the position where there is the difference. In some embodiments, the greater the difference in color or image at a position in the image, the greater the amount of space around or near the position may be blended.

In some embodiments, after blending, the blending module (e.g., on the environmental capture system 400 or the user device 1110) may re-scan and sample colors along the image(s) to determine if there are other differences in image or color that exceed the predetermined threshold of color, hue, brightness, saturation, and/or the like. If so, the blending module may identify the portions within the image(s) and continue to blend that portion of the image. The blending module may continue to resample the images along the seam until there are no further portions of the images to blend (e.g., any differences in color are below the predetermined threshold(s).)

Figure 11:
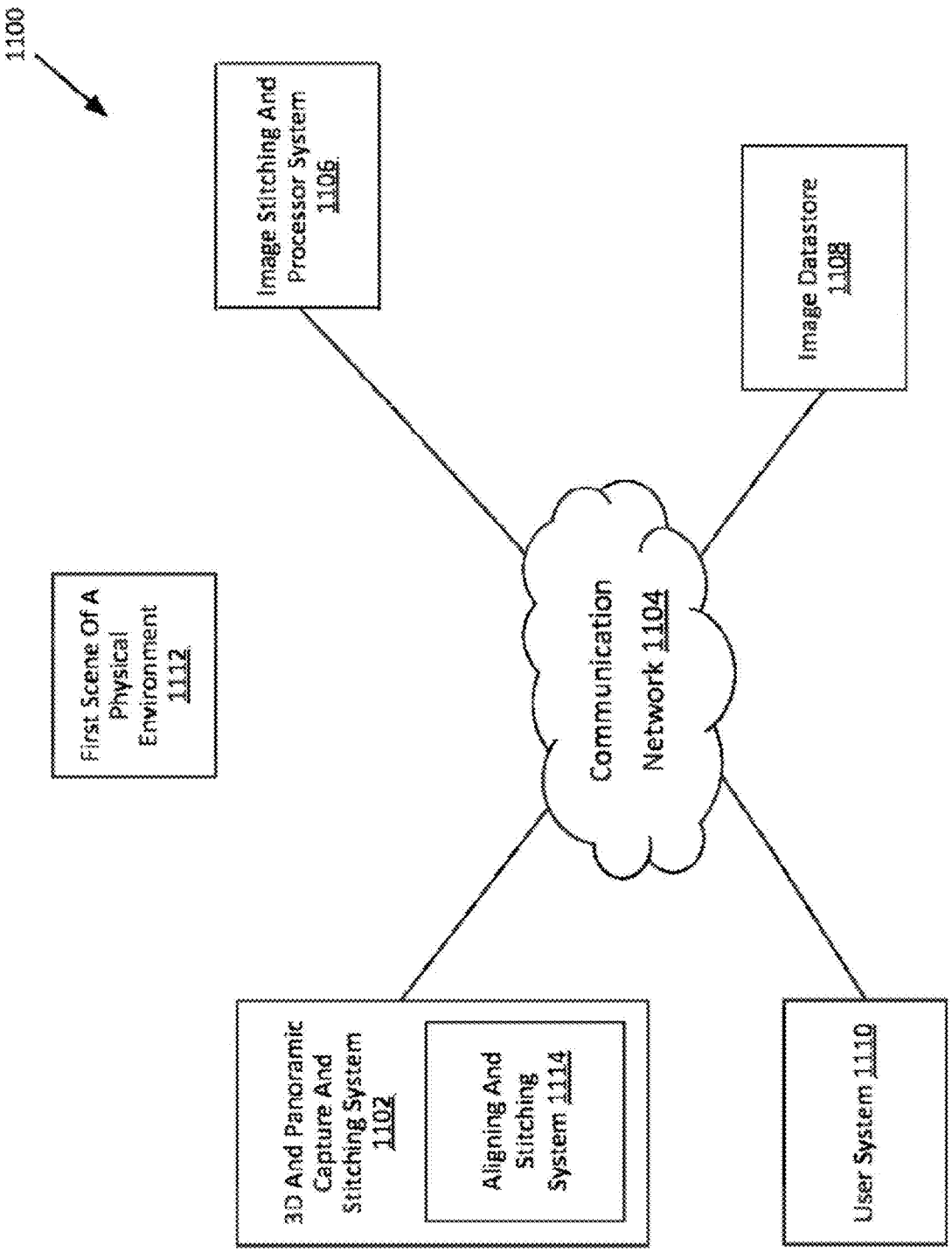
FIG. 11 depicts a block diagram of an example environment capable of capturing and stitching images to form 3D visualizations according to some embodiments.

FIG. 11 depicts a block diagram of an example environment 1100 capable of capturing and stitching images to form 3D visualizations according to some embodiments. The example environment 1100 includes 3D and panoramic capture and stitching system 1102, a communication network 1104, an image stitching and processor system 1106, an image datastore 1108, a user system 1110, and a first scene of a physical environment 1112. The 3D and panoramic capture and stitching system 1102 and/or the user system 1110 may include an image capture device (e.g., environmental capture system 400) that may be used to capture images of an environment (e.g., the physical environment 1112).

The 3D and panoramic capture and stitching system 1102 and the image stitching and processor system 1106 may be a part of the same system (e.g., part of one or more digital devices) that are communicatively coupled to the environmental capture system 400. In some embodiments, one or more of the functionality of the components of the 3D and panoramic capture and stitching system 1102 and the image stitching and processor system 1106 may be performed by the environmental capture system 400. Similarly, or alternatively, 3D and panoramic capture and stitching system 1102 and the image stitching and processor system 1106 may be performed by the user system 1110 and/or the image stitching and processor system 1106.

The 3D panoramic capture and stitching system 1102 may be utilized by a user to capture multiple 2D images of an environment, such as the inside of a building and/or and outside of the building. For example, the user may utilize the 3D and panoramic capture and stitching system 1102 to capture multiple 2D images of the first scene of the physical environment 1112 provided by the environmental capture system 400. The 3D and panoramic capture and stitching system 1102 may include an aligning and stitching system 1114. Alternately, the user system 1110 may include the aligning and stitching system 1114.

The aligning and stitching system 1114 may be software, hardware, or a combination of both configured to provide guidance to the user of an image capture system (e.g., on the 3D and panoramic capture and stitching system 1102 or the user system 1110) and/or process images to enable improved panoramic pictures to be made (e.g., through stitching, aligning, cropping, and/or the like). The aligning and stitching system 1114 may be on a computer-readable media (described herein). In some embodiments, the aligning and stitching system 1114 may include a processor for performing functions.

An example of the first scene of the physical environment 1112 may be any room, real estate, or the like (e.g., a representation of a living room). In some embodiments, the 3D and panoramic capture and stitching system 1102 is utilized to generate 3D panoramic images of indoor environments. The 3D panoramic capture and stitching system 1102 may, in some embodiments, be the environmental capture system 400 discussed with regard to FIG. 4.

In some embodiments, the 3D panoramic capture and stitching system 1102 may in communication with a device for capturing images and depth data as well as software (e.g., the environmental capture system 400). All or part of the software may be installed on the 3D panoramic capture and stitching system 1102, the user system 1110, the environmental capture system 400, or both. In some embodiments, the user may interact with the 3D and panoramic capture and stitching system 1102 via the user system 1110.

The 3D and panoramic capture and stitching system 1102 or the user system 1110 may obtain multiple 2D images. The 3D and panoramic capture and stitching system 1102 or the user system 1110 may obtain depth data (e.g., from a lidar device or the like).

In various embodiments, an application on the user system 1110 (e.g., a smart device of the user such as a smartphone or tablet computer) or an application on the environmental capture system 400 may provide visual or auditory guidance to the user for taking images with the environmental capture system 400. Graphical guidance may include, for example, a floating arrow on a display of the environmental capture system 400 (e.g., on a viewfinder or LED screen on the back of the environmental capture system 400) to guide the user on where to position and/or point an image capture device. In another example, the application may provide audio guidance on where to position and/or point the image capture device.

In some embodiments, the guidance may allow the user to capture multiple images of the physical environment without the help of a stabilizing platform such as a tripod. In one example, the image capture device may be a personal device such as a smartphone, tablet, media tablet, laptop, and the like. The application may provide direction on position for each sweep, to approximate the no-parallax point based on position of the image capture device, location information from the image capture device, and/or previous image of the image capture device.

In some embodiments, the visual and/or auditory guidance enables the capture of images that can be stitched together to form panoramas without a tripod and without camera positioning information (e.g., indicating a location, position, and/or orientation of the camera from a sensor, GPS device, or the like).

The aligning and stitching system 1114 may align or stitch 2D images (e.g., captured by the user system 1110 or the 3D panoramic capture and stitching system 1102) to obtain a 2D panoramic image.

In some embodiments, the aligning and stitching system 1114 utilizes a machine learning algorithm to align or stitch multiple 2D images into a 2D panoramic image. The parameters of the machine learning algorithm may be managed by the aligning and stitching system 1114. For example, the 3D and panoramic capture and stitching system 1102 and/or the aligning and stitching system 1114 may recognize objects within the 2D images to aid in aligning the images into a 2D panoramic image.

In some embodiments, the aligning and stitching system 1114 may utilize depth data and the 2D panoramic image to obtain a 3D panoramic image. The 3D panoramic image may be provided to the 3D and panoramic stitching system 1102 or the user system 1110. In some embodiments, the aligning and stitching system 1114 determines 3D/depth measurements associated with recognized objects within a 3D panoramic image and/or sends one or more 2D images, depth data, 2D panoramic image(s), 3D panoramic image(s) to the image stitching and processor system 106 to obtain a 2D panoramic image or a 3D panoramic image with pixel resolution that is greater than the 2D panoramic image or the 3D panoramic image provided by the 3D and panoramic capture and stitching system 1102.

The image stitching and processor system 1106 may process 2D images captured by the image capture device (e.g., the environmental capture system 400 or a user device such as a smartphone, personal computer, media tablet, or the like) and stitch them into a 2D panoramic image. The 2D panoramic image processed by the image stitching and processor system 106 may have a higher pixel resolution than the panoramic image obtained by the 3D and panoramic capture and stitching system 1102.

In some embodiments, the image stitching and processor system 1106 receives and processes the 3D panoramic image to create a 3D panoramic image with pixel resolution that is higher than that of the received 3D panoramic image. The higher pixel resolution panoramic images may be provided to an output device with a higher screen resolution than the user system 1110, such as a computer screen, projector screen, and the like. In some embodiments, the higher pixel resolution panoramic images may provide to the output device a panoramic image in greater detail and may be magnified.

The user system 1110 may communicate between users and other associated systems. In some embodiments, the user system 1110 may be or include one or more mobile devices (e.g., smartphones, cell phones, smartwatches, or the like).

The user system 1110 may include one or more image capture devices. The one or more image capture devices can include, for example, RGB cameras, HDR cameras, video cameras, IR cameras, and the like.

The 3D and panoramic capture and stitching system 1102 and/or the user system 1110 may include two or more capture devices may be arranged in relative positions to one another on or within the same mobile housing such that their collective fields of view span up to 360°. In some embodiments, pairs of image capture devices can be used capable of generating stereo-image pairs (e.g., with slightly offset yet partially overlapping fields of view). The user system 1110 may include two image capture devices with vertical stereo offset fields-of-view capable of capturing vertical stereo image pairs. In another example, the user system 1110 can comprise two image capture devices with vertical stereo offset fields-of-view capable of capturing vertical stereo image pairs.

In some embodiments, the user system 1110, environmental capture system 400, or the 3D and panoramic capture and stitching system 1102 may generate and/or provide image capture position and location information. For example, the user system 1110 or the 3D and panoramic capture and stitching system 1102 may include an inertial measurement unit (IMU) to assist in determining position data in association with one or more image capture devices that capture the multiple 2D images. The user system 1110 may include a global positioning sensor (GPS) to provide GPS coordinate information in association with the multiple 2D images captured by one or more image capture devices.

In some embodiments, users may interact with the aligning and stitching system 1114 using a mobile application installed in the user system 1110. The 3D and panoramic capture and stitching system 1102 may provide images to the user system 1110. A user may utilize the aligning and stitching system 1114 on the user system 1110 to view images and previews.

In various embodiments, the aligning and stitching system 1114 may be configured to provide or receive one or more 3D panoramic images from the 3D and panoramic capture and stitching system 1102 and/or the image stitching and processor system 1106. In some embodiments, the 3D and panoramic capture and stitching system 1102 may provide a visual representation of a portion of a floorplan of a building, which has been captured by the 3D and panoramic capture and stitching system 1102 to the user system 1110.

The user of the system 1110 may navigate the space around the area and view different rooms of the house. In some embodiments, the user of the user system 1110 may display the 3D panoramic images, such as the example 3D panoramic image, as the image stitching and processor system 1106 completes the generation of the 3D panoramic image. In various embodiments, the user system 1110 generates a preview or thumbnail of the 3D panoramic image. The preview 3D panoramic image may have an image resolution that is lower than a 3D panoramic image generated by the 3D and panoramic capture and stitching system 1102.

Figure 12:
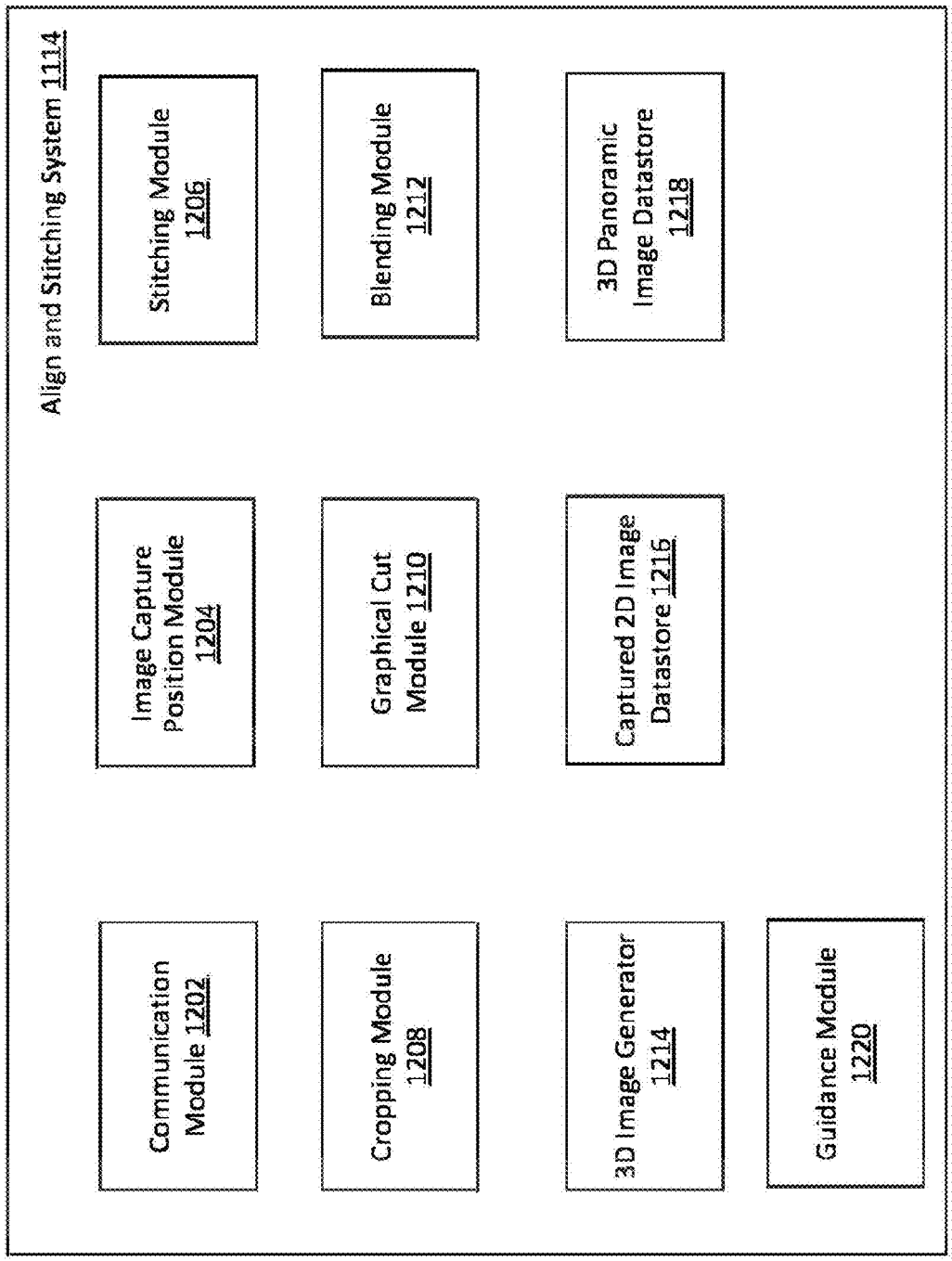
FIG. 12 is a block diagram of an example of the alignment and stitching system according to some embodiments.

FIG. 12 is a block diagram of an example of the alignment and stitching system 1114 according to some embodiments. The align and stitching system 1114 includes a communication module 1202, an image capture position module 1204, a stitching module 1206, a cropping module 1208, a graphical cut module 1210, a blending module 1211, a 3D image generator 1214, a captured 2D image datastore 1216, a 3D panoramic image datastore 1218, and a guidance module 1220. It may be appreciated that there may be any number of modules of the aligning and stitching system 1114 that perform one or more different functions as described herein.

In some embodiments, the aligning and stitching system 1114 includes an image capture module configured to receive images from one or more image capture devices (e.g., cameras). The aligning and stitching system 1114 may also include a depth module configured to receive depth data from a depth device such as a lidar if available.

The communication module 1202 may send and receive requests, images, or data between any of the modules or datastores of the aligning and stitching system 1114 and components of the example environment 1100 of FIG. 11. Similarly, the aligning and stitching system 1114 may send and receive requests, images, or data across the communication network 1104 to any device or system.

In some embodiments, the image capture position module 1204 may determine image capture device position data of an image capture device (e.g., a camera which may be a standalone camera, smartphone, media tablet, laptop, or the like). Image capture device position data may indicate a position and orientation of an image capture device and/or lens. In one example, the image capture position module 1204 may utilize the IMU of the user system 1110, camera, digital device with a camera, or the 3D and panoramic capture and stitching system 1102 to generate position data of the image capture device. The image capture position module 1204 may determine the current direction, angle, or tilt of one or more image capture devices (or lenses). The image capture position module 1204 may also utilize the GPS of the user system 1110 or the 3D and panoramic capture and stitching system 1102.

For example, when a user wants to use the user system 1110 to capture a 360° view of the physical environment, such as a living room, the user may hold the user system 1110 in front of them at eye level to start to capture one of a multiple of images which will eventually become a 3D panoramic image. To reduce the amount of parallax to the image and capture images better suited for stitching and generating 3D panoramic images, it may be preferable if one or more image capture devices rotate at the center of the axis of rotation. The aligning and stitching system 1114 may receive position information (e.g., from the IMU) to determine the position of the image capture device or lens. The aligning and stitching system 1114 may receive and store a field of view of the lens. The guidance module 1220 may provide visual and/or audio information regarding a recommended initial position of the image capture device. The guidance module 1220 may make recommendations for positioning the image capture device for subsequent images. In one example, the guidance module 1220 may provide guidance to the user to rotate and position the image capture device such that the image capture device rotates close to a center of rotation. Further, the guidance module 1220 may provide guidance to the user to rotate and position the image capture device such that subsequent images are substantially aligned based on characteristics of the field of view and/or image capture device.

The guidance module 1220 may provide the user with visual guidance. For example, the guidance module 1220 may place markers or an arrow in a viewer or display on the user system 1110 or the 3D and panoramic capture and stitching system 1102. In some embodiments, the user system 1110 may be a smartphone or tablet computer with a display. When taking one or more pictures, the guidance module 1220 may position one or more markers (e.g., different color markers or the same markers) on an output device and/or in a viewfinder. The user may then use the markers on the output device and/or viewfinder to align the next image.

There are numerous techniques for guiding the user of the user system 1110 or the 3D and panoramic capture and stitching system 1102 to take multiple images for ease of stitching the images into a panorama. When taking a panorama from multiple images, images may be stitched together. To improve time, efficiency, and effectiveness of stitching the images together with reduced need of correcting artifacts or misalignments, the image capture position module 1204 and the guidance module 1220 may assist the user in taking multiple images in positions that improve the quality, time efficiency, and effectiveness of image stitching for the desired panorama.

For example, after taking the first picture, the display of the user system 1110 may include two or more objects, such as circles. Two circles may appear to be stationary relative to the environment and two circles may move with the user system 1110. When the two stationary circles are aligned with the two circles that move with the user system 1110, the image capture device and/or the user system 1110 may be aligned for the next image.

In some embodiments, after an image is taken by an image capture device, the image capture position module 1204 may take a sensor measurement of the position of the image capture device (e.g., including orientation, tilt, and the like). The image capture position module 1204 may determine one or more edges of the image that was taken by calculating the location of the edge of a field of view based on the sensor measurement. Additionally, or alternatively, the image capture position module 1204 may determine one or more edges of the image by scanning the image taken by the image capture device, identifying objects within that image (e.g., using machine learning models discussed herein), determining one or more edges of the image, and positioning objects (e.g., circles or other shapes) at the edge of a display on the user system 1110.

The image capture position module 1204 may display two objects within a display of the user system 1110 that indicates the positioning of the field of view for the next picture. These two objects may indicate positions in the environment that represent where there is an edge of the last image. The image capture position module 1204 may continue to receive sensor measurements of the position of the image capture device and calculate two additional objects in the field of view. The two additional objects may be the same width apart as the previous two objects. While the first two objects may represent an edge of the taken image (e.g., the far right edge of the image), the next two additional objects representing an edge of the field of view may be on the opposite edge (e.g., the far left edge of the field of view). By having the user physically aligning the first two objects on the edge of the image with the additional two objects on the opposite edge of the field of view, the image capture device may be positioned to take another image that can be more effectively stitched together without a tripod. This process can continue for each image until the user determines the desired panorama has been captured.

Although multiple objects are discussed herein, it will be appreciated that the image capture position module 1204 may calculate the position of one or more objects for positioning the image capture device. The objects may be any shape (e.g., circular, oblong, square, emoji, arrows, or the like). In some embodiments, the objects may be of different shapes.

In some embodiments, there may be a distance between the objects that represent the edge of a captured image and the distance between the objects of a field of view. The user may be guided to move forward to move away to enable there to be sufficient distance between the objects. Alternately, the size of the objects in the field of view may change to match a size of the objects that represent an edge of a captured image as the image capture device approaches the correct position (e.g., by coming closer or farther away from a position that will enable the next image to be taken in a position that will improve stitching of images.

In some embodiments, the image capture position module 1204 may utilize objects in an image captured by the image capture device to estimate the position of the image capture device. For example, the image capture position module 1204 may utilize GPS coordinates to determine the geographical location associated with the image. The image capture position module 1204 may use the position to identify landmarks that may be captured by the image capture device.

The image capture position module 1204 may include a 2D machine learning model to convert 2D images into 2D panoramic images. The image capture position module 1204 may include a 3D machine learning model to convert 2D images to 3D representations. In one example, a 3D representation may be utilized to display a three-dimensional walkthrough or visualization of an interior and/or exterior environment.

The 2D machine learning model may be trained to stitch or assist in stitching two or more 2D images together to form a 2D panorama image. The 2D machine learning model may, for example, be a neural network trained with 2D images that include physical objects in the images as well as object identifying information to train the 2D machine learning model to identify objects in subsequent 2D images. The objects in the 2D images may assist in determining position(s) within a 2D image to assist in determining edges of the 2D image, warping in the 2D image, and assist in alignment of the image. Further, the objects in the 2D images may assist in determining artifacts in the 2D image, blending of an artifact or border between two images, positions to cut images, and/or crop the images.

In some embodiments, the 2D machine learning model may, for example, be a neural network trained with 2D images that include depth information (e.g., from a lidar device or structured light device of the user system 1110 or the 3D and panoramic capture and stitching system 1102) of the environment as well as include physical objects in the images to identify the physical objects, position of the physical objects, and/or position of the image capture device/field of view. The 2D machine learning model may identify physical objects as well as their depth relative to other aspects of the 2D images to assist in the alignment and position of two 2D images for stitching (or to stitch the two 2D images).

The 2D machine learning model may include any number of machine learning models (e.g., any number of models generated by neural networks or the like).

The 2D machine learning model may be stored on the 3D and panoramic capture and stitching system 1102, the image stitching and processor system 1106, and/or the user system 1110. In some embodiments, the 2D machine learning model may be trained by the image stitching and processor system 1106.

The image capture position module 1204 may estimate the position of the image capture device (a position of the field of view of the image capture device) based on a seam between two or more 2D images from the stitching module 1206, the image warping from the cropping module 1208, and/or the graphical cut from the graphical cut module 1210.

The stitching module 1206 may combine two or more 2D images to generate a 2D panoramic. Based on the seam between two or more 2D images from the stitching module 1206, the image warping from the cropping module 1208, and/or a graphical cut, which has a field of view that is greater than the field of views of each of the two or more images.

The stitching module 1206 may be configured to align or "stitch together" two different 2D images providing different perspectives of the same environment to generate a panoramic 2D image of the environment. For example, the stitching module 1206 can employ known or derived (e.g., using techniques described herein) information regarding the capture positions and orientations of respective 2D images to assist in stitching two images together.

The stitching module 1206 may receive two 2D images. The first 2D image may have been taken immediately before the second image or within a predetermined period of time. In various embodiments, the stitching module 1206 may receive positioning information of the image capture device associated with the first image and then positioning information associated with the second image. The positioning information may be associated with an image based on, at the time the image was taken, positioning data from the IMU, GPS, and/or information provided by the user.

In some embodiments, the stitching module 1206 may utilize a 2D machine learning module for scanning both images to recognize objects within both images, including objects (or parts of objects) that may be shared by both images. For example, the stitching module 1206 may identify a corner, pattern on a wall, furniture, or the like shared at opposite edges of both images.

The stitching module 1206 may align edges of the two 2D images based on the positioning of the shared objects (or parts of objects), positioning data from the IMU, positioning data from the GPS, and/or information provided by the user and then combine the two edges of the images (i.e., "stitch" them together). In some embodiments, the stitching module 1206 may identify a portion of the two 2D images that overlap each other and stitch the images at the position that is overlapped (e.g., using the positioning data and/or the results of the 2D machine learning model.

In various embodiments, the 2D machine learning model may be trained to use the positioning data from the IMU, positioning data from the GPS, and/or information provided by the user to combine or stitch the two edges of the images. In some embodiments, the 2D machine learning model may be trained to identify common objects in both 2D images to align and position the 2D images and then combine or stitch the two edges of the images. In further embodiments, the 2D machine learning model may be trained to use the positioning data and object recognition to align and position the 2D images and then stitch the two edges of the images together to form all or part of the panoramic 2D image.

The stitching module 1206 may utilize depth information for the respective images (e.g., pixels in the respective images, objects in the respective images, or the like) to facilitate aligning the respective 2D images to one another in association with generating a single 2D panoramic image of the environment.

The cropping module 1208 may resolve issues with two or more 2D images where the image capture device was not held in the same position when 2D images were captured. For example, while capturing an image, the user may position the user system 1110 in a vertical position. However, while capturing another image, the user may position the user system at an angle. The resultant images may not be aligned and may suffer from parallax effects. Parallax effects may occur when foreground and background objects do not line up in the same way in the first image and the second image.

The cropping module 1208 may utilize the 2D machine learning model (by applying positioning information, depth information, and/or object recognition) to detect changes in the position of the image capture device in two or more images and then measure the amount of change in position of the image capture device. The cropping module 1208 may warp one or multiple 2D images so that the images may be able to line up together to form a panoramic image when the images are stitched, and while at the same time preserving certain characteristics of the images such as keeping a straight line straight.

The output of the cropping module 1208 may include the number of pixel columns and rows to offset each pixel of the image to straighten out the image. The amount of offset for each image may be outputted in the form of a matrix representing the number of pixel columns and pixel rows to offset each pixel of the image.

In some embodiments, the cropping module 1208 may determine the amount of image warping to perform on one or more of the multiple 2D images captured by the image capture devices of the user system 1110 based on one or more image capture position from the image capture position module 1204 or seam between two or more 2D images from the stitching module 1206, the graphical cut from the graphical cut module 1210, or blending of colors from the blending module 1211.

The graphical cut module 1210 may determine where to cut or slice one or more of the 2D images captured by the image capture device. For example, the graphical cut module 1210 may utilize the 2D machine learning model to identify objects in both images and determine that they are the same object. The image capture position module 1204, the cropping module 1208, and/or the graphical cut module 1210 may determine that the two images cannot be aligned, even if warped. The graphical cut module 1210 may utilize the information from the 2D machine learning model to identify sections of both images that may be stitched together (e.g., by cutting out a part of one or both images to assist in alignment and positioning). In some embodiments, the two 2D images may overlap at least a portion of the physical world represented in the images. The graphical cut module 1210 may identify an object, such as the same chair, in both images. However, the images of the chair may not line up to generate a panoramic that is not distorted and would not correctly represent the portion of the physical world, even after image capture positioning and image wrapping by the cropping module 1208. The graphical cut module 1210 may select one of the two images of the chair to be the correct representation (e.g., based on misalignment, positioning, and/or artifacts of one image when compared to the other) and cut the chair from the image with misaligning, errors in positioning, and/or artifacts. The stitching module 1206 may subsequently stitch the two images together.

The graphical cut module 1210 may try both combinations, for example, cutting the image of the chair from the first image and stitching the first image, minus the chair to the second image, to determine which graphical cut generates a more accurate panoramic image. The output of the graphical cut module 1210 may be a location to cut one or more of the multiple 2D images which correspond to the graphical cut, which generates a more accurate panoramic image.

The graphical cut module 1210 may determine how to cut or slice one or more of the 2D images captured by the image capture device based on one or more image capture position from the image capture position module 1204, stitching, or seam between two or more 2D images from the stitching module 1206, the image warping from the cropping module 1208, and the graphical cut from the graphical cut module 1210.

The blending module 1211 may colors at the seams (e.g., stitching) between two images so that the seams are invisible. Variation in lighting and shadows may cause the same object or surface to be outputted in slightly different colors or shades. The blending module may determine the amount of color blending required based on one or more image capture position from the image capture position module 1204, stitching, image colors along the seams from both images, the image warping from the cropping module 1208, and/or the graphical cut from the graphical cut module 1210.

In various embodiments, the blending module 1211 may receive a panorama from a combination of two 2D images and then sample colors along the seam of the two 2D images. The blending module 1211 may receive seam location information from the image capture position module 1204 to enable the blending module 1211 to sample colors along the seam and determine differences. If there is a significant difference in color along a seam between the two images (e.g., within a predetermined threshold of color, hue, brightness, saturation, and/or the like), the blending module 1211 may blend a predetermined size of both images along the seam at the position where there is the difference. In some embodiments, the greater the difference in color or image along the seam, the greater the amount of space along the seam of the two images that may be blended.

In some embodiments, after blending, the blending module 1211 may re-scan and sample colors along the seam to determine if there are other differences in image or color that exceed the predetermined threshold of color, hue, brightness, saturation, and/or the like. If so, the blending module 1211 may identify the portions along the seam and continue to blend that portion of the image. The blending module 1211 may continue to resample the images along the seam until there are no further portions of the images to blend (e.g., any differences in color are below the predetermined threshold(s).)

The 3D image generator 1214 may receive 2D panoramic images and generate 3D representations. In various embodiments, the 3D image generator 1214 utilizes a 3D machine learning model to transform the 2D panoramic images into 3D representations. The 3D machine learning model may be trained using 2D panoramic images and depth data (e.g., from a lidar sensor or structured light device) to create 3D representations. The 3D representations may be tested and reviewed for curation and feedback. In some embodiments, the 3D machine learning model may be used with 2D panoramic images and depth data to generate the 3D representations.

In various embodiments, the accuracy, speed of rendering, and quality of the 3D representation generated by the 3D image generator 1214 are greatly improved by utilizing the systems and methods described herein. For example, by rendering a 3D representation from 2D panoramic images that have been aligned, positioned, and stitched using methods described herein (e.g., by alignment and positioning information provided by hardware, by improved positioning caused by the guidance provided to the user during image capture, by cropping and changing warping of images, by cutting images to avoid artifacts and overcome warping, by blending images, and/or any combination), the accuracy, speed of rendering, and quality of the 3D representation are improved. Further, it will be appreciated that by utilizing 2D panoramic images that have been aligned, positioned, and stitched using methods described herein, training of the 3D machine learning model may be greatly improved (e.g., in terms of speed and accuracy). Further, in some embodiments, the 3D machine learning model may be smaller and less complex because of the reduction of processing and learning that would have been used to overcome misalignments, errors in positioning, warping, poor graphic cutting, poor blending, artifacts, and the like to generate reasonably accurate 3D representations.

The trained 3D machine learning model may be stored in the 3D and panoramic capture and stitching system 1102, image stitching and processor system 106, and/or the user system 1110.

In some embodiments, the 3D machine learning model may be trained using multiple 2D images and depth data from the image capture device of the user system 1110 and/or the 3D and panoramic capture and stitching system 1102. In addition, the 3D image generator 1214 may be trained using image capture position information associated with each of the multiple 2D images from the image capture position module 1204, seam locations to align or stitch each of the multiple 2D images from the stitching module 1206, pixel offset(s) for each of the multiple 2D images from the cropping module 1208, and/or the graphical cut from the graphical cut module 1210. In some embodiments, the 3D machine learning model may be used with 2D panoramic images, depth data, image capture position information associated with each of the multiple 2D images from the image capture position module 1204, seam locations to align or stitch each of the multiple 2D images from the stitching module 1206, pixel offset(s) for each of the multiple 2D images from the cropping module 1208, and/or the graphical cut from the graphical cut module 1210 to generate the 3D representations.

The stitching module 1206 may be a part of a 3D model that converts multiple 2D images into 2D panoramic or 3D panoramic images. In some embodiments, the 3D model is a machine learning algorithm, such as a 3D-from-2D prediction neural network model. The cropping module 1208 may be a part of a 3D model that converts multiple 2D images into 2D panoramic or 3D panoramic images. In some embodiments, the 3D model is a machine learning algorithm, such as a 3D-from-2D prediction neural network model. The graphical cut module 1210 may be a part of a 3D model that converts multiple 2D images into 2D panoramic or 3D panoramic images. In some embodiments, the 3D model is a machine learning algorithm, such as a 3D-from-2D prediction neural network model. The blending module 1211 may be a part of a 3D machine learning model that converts multiple 2D images into 2D panoramic or 3D panoramic images. In some embodiments, the 3D model is a machine learning algorithm, such as a 3D-from-2D prediction neural network model.

The 3D image generator 1214 may generate a weighting for each of the image capture position module 1204, the cropping module 1208, the graphical cut module 1210, and the blending module 1211, which may represent the reliability or a "strength" or "weakness" of the module. In some embodiments, the sum of the weightings of the modules equals 1.

In cases where depth data is not available for the multiple 2D images, the 3D image generator 1214 may determine depth data for one or more objects in the multiple 2D images captured by the image capture device of the user system 1110. In some embodiments, the 3D image generator 1214 may derive the depth data based on images captured by stereo-image pairs. The 3D image generator can evaluate stereo image pairs to determine data about the photometric match quality between the images at various depths (a more intermediate result), rather than determining depth data from a passive stereo algorithm.

The 3D image generator 1214 may be a part of a 3D model that converts multiple 2D images into 2D panoramic or 3D panoramic images. In some embodiments, the 3D model is a machine learning algorithm, such as a 3D-from-2D prediction neural network model.

The captured 2D image datastore 1216 may be any structure and/or structures suitable for captured images and/or depth data (e.g., an active database, a relational database, a self-referential database, a table, a matrix, an array, a flat file, a documented-oriented storage system, a non-relational No-SQL system, an FTS-management system such as Lucene/Solar, and/or the like). The captured 2D image datastore 1216 may store images captured by the image capture device of the user system 1110. In various embodiments, the captured 2D image data store 1216 stores depth data captured by one or more depth sensors of the user system 1110. In various embodiments, the captured 2D image datastore 1216 stores image capture device parameters associated with the image capture device, or capture properties associated with each of the multiple image captures, or depth information captures used to determine the 2D panoramic image. In some embodiments, the image datastore 1108 stores panoramic 2D panoramic images. The 2D panoramic images may be determined by the 3D and panoramic capture and stitching system 1102 or the image stitching and processor system 106. Image capture device parameters may include lighting, color, image capture lens focal length, maximum aperture, angle of tilt, and the like. Capture properties may include pixel resolution, lens distortion, lighting, and other image metadata.

Figure 13:
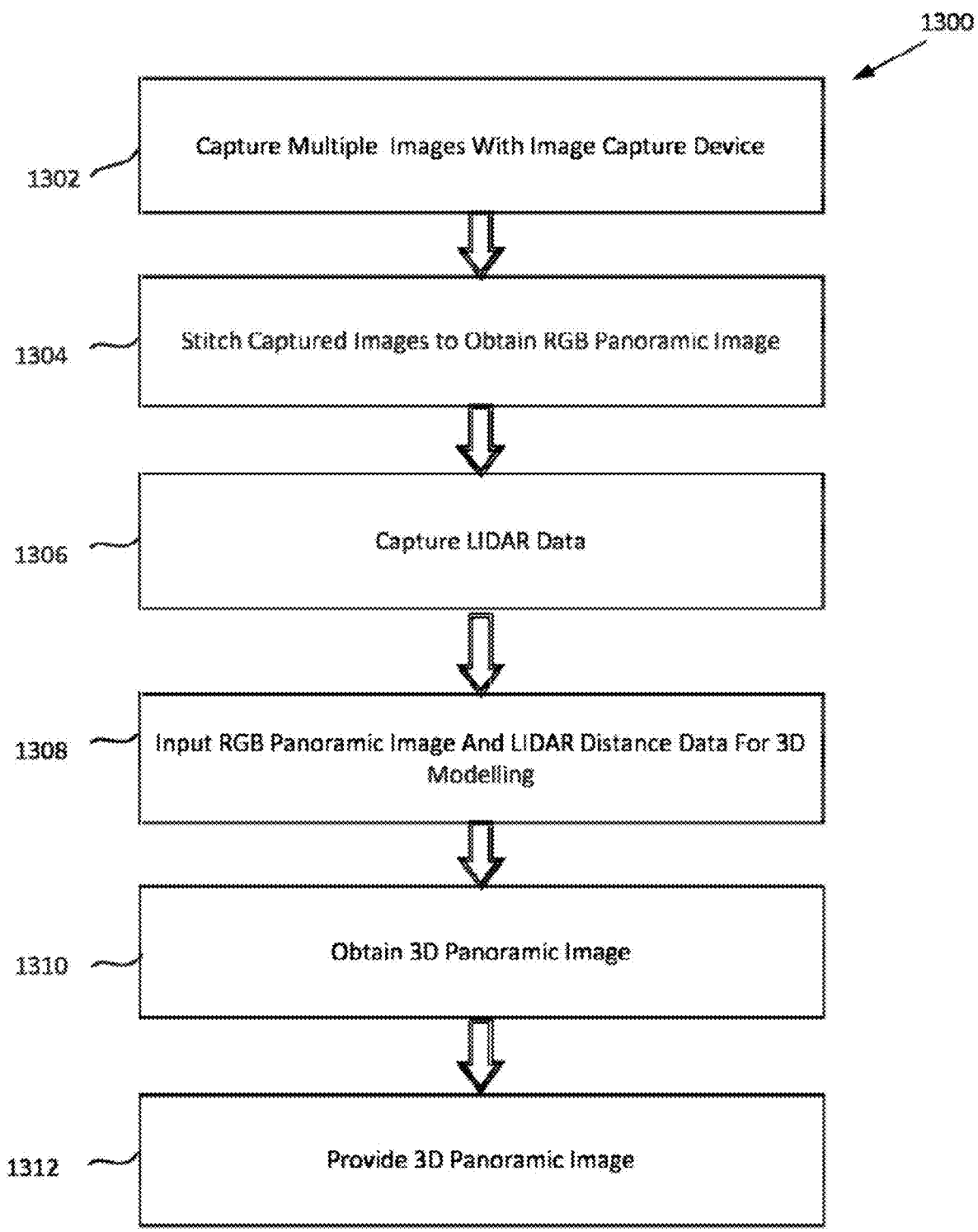
FIG. 13 depicts a flow chart of a 3D panoramic image capture and generation process according to some embodiments.

FIG. 13 depicts a flow chart 1300 of a 3D panoramic image capture and generation process according to some embodiments. In step 1302, the image capture device may capture multiple 2D images using the image sensor 920 and the WFOV lens 918 of FIG. 9A. The wider FOV means that the environmental capture system 400 will require fewer scans to obtain a 360° view. The WFOV lens 918 may also be wider horizontally as well as vertically. In some embodiments, the image sensor 920 captures RGB images. In one embodiment, the image sensor 920 captures black and white images.

In step 1304, the environmental capture system may send the captured 2D images to the image stitching and processor system 1106. The image stitching and processor system 1106 may apply a 3D modeling algorithm to the captured 2D images to generate a panoramic 2D image. In some embodiments, the 3D modeling algorithm is a machine learning algorithm to stitch the captured 2D images into a panoramic 2D image. In some embodiments, step 1304 may be optional.

In step 1306, the lidar 912 and WFOV lens 918 of FIG. 9A may capture lidar data. The wider FOV means that the environmental capture system 400 will require fewer scans to obtain a 360° view.

In step 1308, the lidar data may be sent to the image stitching and processor system 1106. The image stitching and processor system 1106 may input the lidar data and the captured 2D image into the 3D modeling algorithm to generate the 3D panoramic image. The 3D modeling algorithm is a machine learning algorithm.

In step 1310, the image stitching and processor system 1106 generates the 3D panoramic image. The 3D panoramic image may be stored in the image datastore 408. In one embodiment, the 3D panoramic image generated by the 3D modeling algorithm is stored in the image stitching and processor system 1106. In some embodiments, the 3D modeling algorithm may generate a visual representation of the floorplan of the physical environment as the environmental capture system is utilized to capture various parts of the physical environment.

In step 1312, image stitching and processor system 1106 may provide at least a portion of the generated 3D panoramic image to the user system 1110. The image stitching and processor system 1106 may provide the visual representation of the floorplan of the physical environment.

The order of one or more steps of the flow chart 1300 may be changed without affecting the end product of the 3D panoramic image. For example, the environmental capture system may interleave image capture with the image capture device with lidar data or depth information capture with the lidar 912. For example, the image capture device may capture an image of section of the physical environment with the image capture device, and then lidar 912 obtains depth information from section 1605. Once the lidar 912 obtains depth information from section, the image capture device may move on to capture an image of another section, and then lidar 912 obtains depth information from section, thereby interleaving image capture and depth information capture.

In some embodiments, the devices and/or systems discussed herein employ one image capture device to capture 2D input images. In some embodiments, the one or more image capture devices 1116 can represent a single image capture device (or image capture lens). In accordance with some of these embodiments, the user of the mobile device housing the image capture device can be configured to rotate about an axis to generate images at different capture orientations relative to the environment, wherein the collective fields of view of the images span up to 360° horizontally.

In various embodiments, the devices and/or systems discussed herein may employ two or more image capture devices to capture 2D input images. In some embodiments, the two or more image capture devices can be arranged in relative positions to one another on or within the same mobile housing such that their collective fields of view span up to 360°. In some embodiments, pairs of image capture devices can be used capable of generating stereo-image pairs (e.g., with slightly offset yet partially overlapping fields of view). For example, the user system 1110 (e.g., the device comprises the one or more image capture devices used to capture the 2D input images) can comprise two image capture devices with horizontal stereo offset fields of-view capable of capturing stereo image pairs. In another example, the user system 1110 can comprise two image capture devices with vertical stereo offset fields-of-view capable of capturing vertical stereo image pairs. In accordance with either of these examples, each of the cameras can have fields-of-view that span up to 360. In this regard, in one embodiment, the user system 1110 can employ two panoramic cameras with vertical stereo offsets capable of capturing pairs of panoramic images that form stereo pairs (with vertical stereo offsets).

The positioning component 1118 may include any hardware and/or software configured to capture user system position data and/or user system location data. For example, the positioning component 1118 includes an IMU to generate the user system 1110 position data in association with the one or more image capture devices of the user system 1110 used to capture the multiple 2D images. The positioning component 1118 may include a GPS unit to provide GPS coordinate information in association with the multiple 2D images captured by one or more image capture devices. In some embodiments, the positioning component 1118 may correlate position data and location data of the user system with respective images captured using the one or more image capture devices of the user system 1110.

Various embodiments of the apparatus provide users with 3D panoramic images of indoor as well as outdoor environments. In some embodiments, the apparatus may efficiently and quickly provide users with 3D panoramic images of indoor and outdoor environments using a single wide field-of-view (FOV) lens and a single light and detection and ranging sensors (lidar sensor).

The following is an example use case of an example apparatus described herein. The following use case is of one of the embodiments. Different embodiments of the apparatus, as discussed herein, may include one or more similar features and capabilities as that of the use case.

Figure 14:
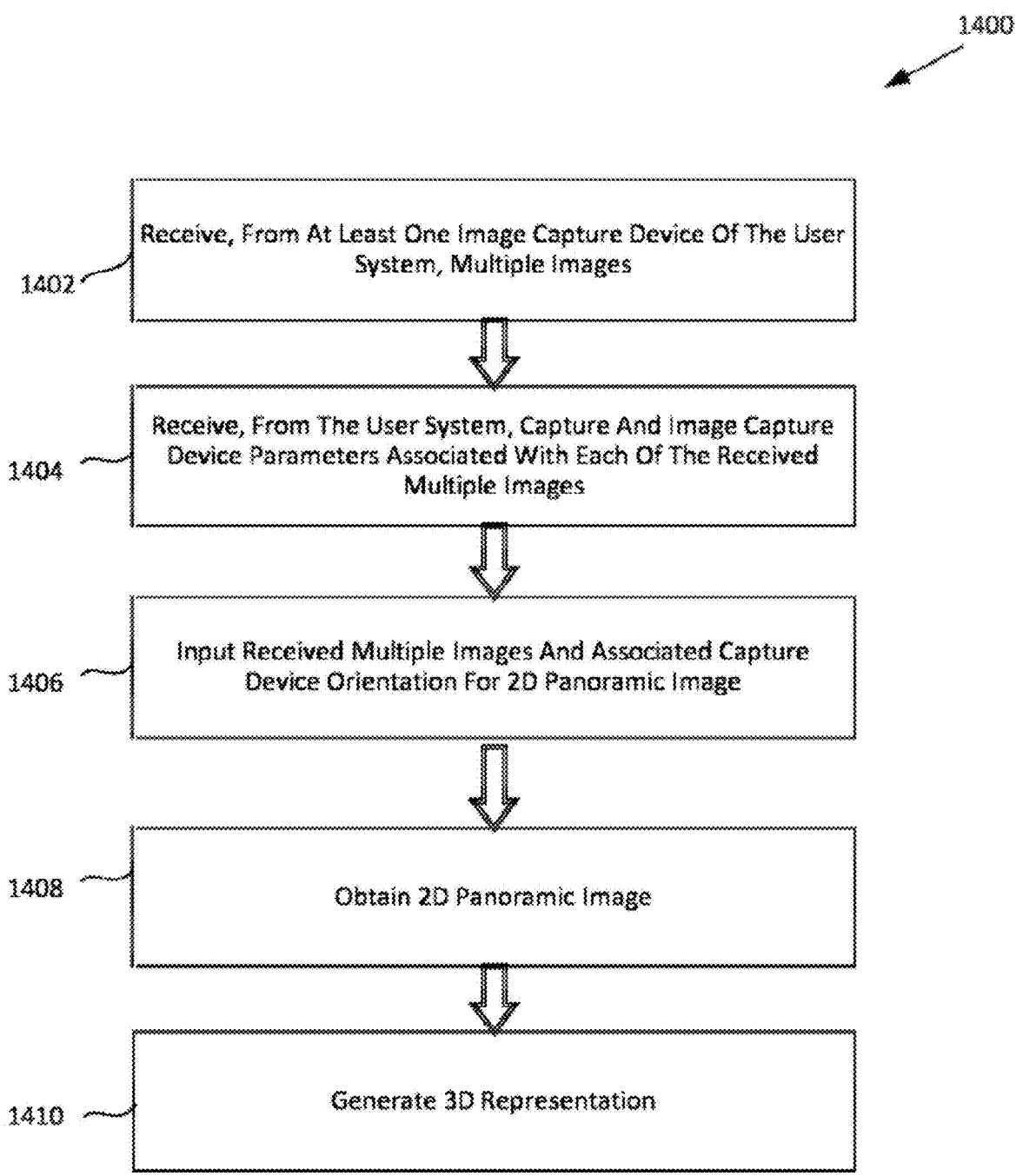
FIG. 14 depicts a flow chart of a 3D and panoramic capture and stitching process according to some embodiments.

FIG. 14 depicts a flow chart of a 3D and panoramic capture and stitching process 1400 according to some embodiments. The flow chart of FIG. 14 refers to the 3D and panoramic capture and stitching system 1102 as including the image capture device, but, in some embodiments, the data capture device may be the user system 1110.

In step 1402, the 3D and panoramic capture and stitching system 1102 may receive multiple 2D images from at least one image capture device. The image capture device of the 3D and panoramic capture and stitching system 1102 may be or include a complementary metal-oxide-semiconductor (CMOS) image sensor. In various embodiments, the image capture device is a charged coupled device (CCD). In one example, the image capture device is a red-green-blue (RGB) sensor. In one embodiment, the image capture device is an IR sensor. Each of the multiple 2D images may have partially overlapping fields of view with at least one other image of the multiple 2D images. In some embodiments, at least some of the multiple 2D images combine to create a 360° view of the physical environment (e.g., indoor, outdoor, or both).

In some embodiments, all of the multiple 2D images are received from the same image capture device. In various embodiments, at least a portion of the multiple 2D images is received from two or more image capture devices of the 3D and panoramic capture and stitching system 1102. In one example, the multiple 2D images include a set of RGB images and a set of IR images, where the IR images provide depth data to the 3D and panoramic capture and stitching system 1102. In some embodiments, each 2D image may be associated with depth data provided from a lidar device. Each of the 2D images may, in some embodiments, be associated with positioning data.

In step 1404, the 3D and panoramic capture and stitching system 1102 may receive capture parameters and image capture device parameters associated with each of the received multiple 2D images. Image capture device parameters may include lighting, color, image capture lens focal length, maximum aperture, a field of view, and the like. Capture properties may include pixel resolution, lens distortion, lighting, and other image metadata. The 3D and panoramic capture and stitching system 1102 may also receive the positioning data and the depth data.

In step 1406, the 3D and panoramic capture and stitching system 1102 may take the received information from steps 1402 and 1404 for stitching the 2D images to form a 2D panoramic image. The process of stitching the 2D images is further discussed with regard to the flowchart of FIG. 15.

In step 1408, the 3D and panoramic capture and stitching system 1102 may apply a 3D machine learning model to generate a 3D representation. The 3D representation may be stored in a 3D panoramic image datastore. In various embodiments, the 3D representation is generated by the image stitching and processor system 1106 In some embodiments, the 3D machine learning model may generate a visual representation of the floorplan of the physical environment as the environmental capture system is utilized to capture various parts of the physical environment.

In step 1410, the 3D and panoramic capture and stitching system 1102 may provide at least a portion of the generated 3D representation or model to the user system 1110. The user system 1110 may provide the visual representation of the floorplan of the physical environment. In some embodiments, the user system 1110 may send the multiple 2D images, capture parameters, and image capture parameters to the image stitching and processor system 1106. In various embodiments, the 3D and panoramic capture and stitching system 1102 may send the multiple 2D images, capture parameters, and image capture parameters to the image stitching and processor system 1106.

The image stitching and processor system 1106 may process the multiple 2D images captured by the image capture device of the user system 1110 and stitch them into a 2D panoramic image. The 2D panoramic image processed by the image stitching and processor system 1106 may have a higher pixel resolution than the 2D panoramic image obtained by the 3D and panoramic capture and stitching system 1102.

In some embodiments, the image stitching and processor system 106 may receive the 3D representation and output a 3D panoramic image with pixel resolution that is higher than that of the received 3D panoramic image. The higher pixel resolution panoramic images may be provided to an output device with a higher screen resolution than the user system 1110, such as a computer screen, projector screen, and the like. In some embodiments, the higher pixel resolution panoramic images may provide to the output device a panoramic image in greater detail and may be magnified.

Figure 15:
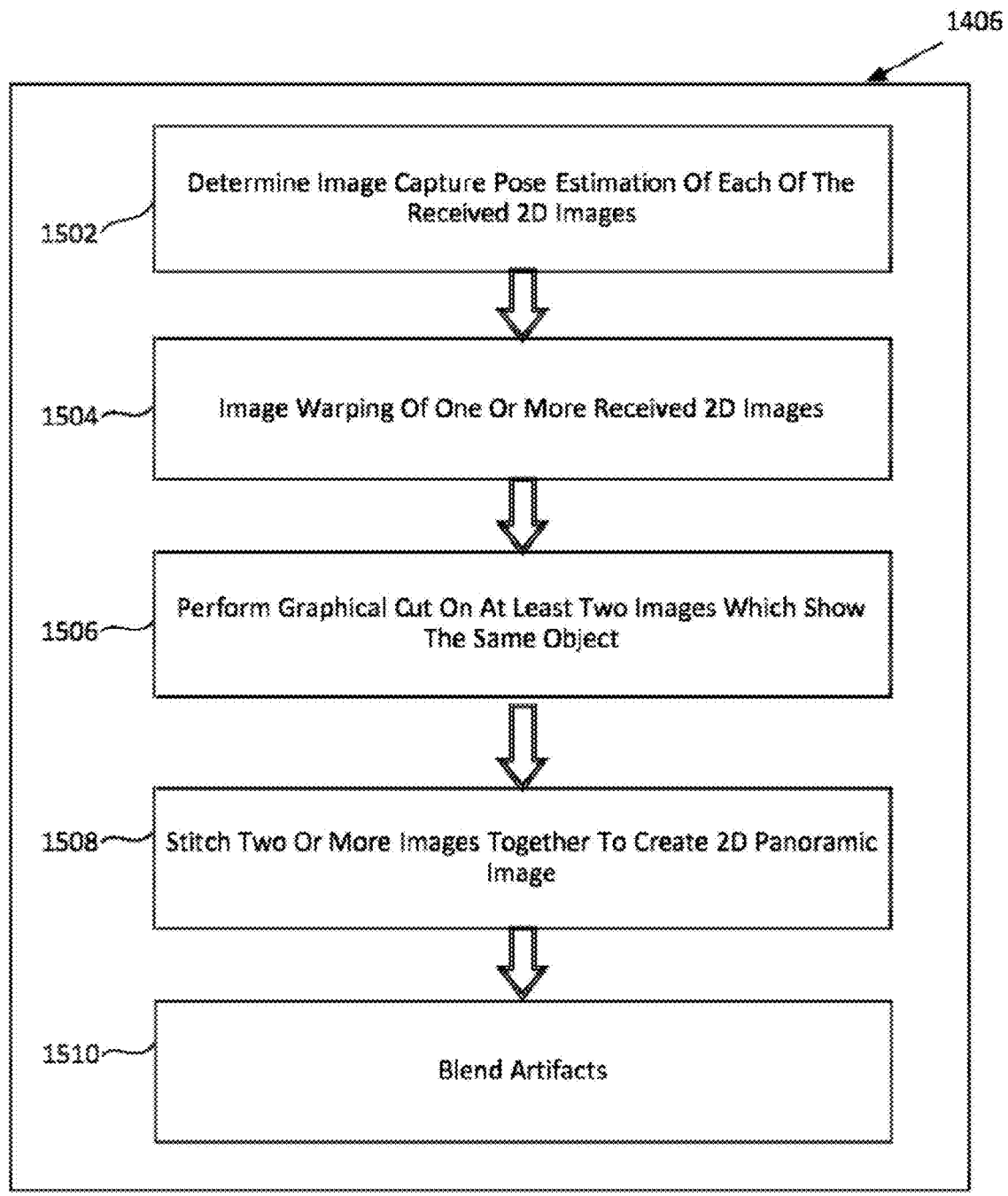
FIG. 15 depicts a flow chart showing further detail of one step of the 3D and panoramic capture and stitching process of FIG. 14.

FIG. 15 depicts a flow chart showing further detail of one step 1406 of the 3D and panoramic capture and stitching process of FIG. 14. In step 1502, the image capture position module 1204 may determine image capture device position data associated with each image captured by the image capture device. The image capture position module 1204 may utilize the IMU of the user system 1110 to determine the position data of the image capture device (or the field of view of the lens of the image capture device). The position data may include the direction, angle, or tilt of one or more image capture devices when taking one or more 2D images. One or more of the cropping module 1208, the graphical cut module 1210, or the blending module 1212 may utilize the direction, angle, or tilt associated with each of the multiple 2D images to determine how to warp, cut, and/or blend the images.

In step 1504, the cropping module 1208 may warp one or more of the multiple 2D images so that two images may be able to line up together to form a panoramic image and while at the same time preserving specific characteristics of the images such as keeping a straight line straight. The output of the cropping module 1208 may include the number of pixel columns and rows to offset each pixel of the image to straighten out the image. The amount of offset for each image may be outputted in the form of a matrix representing the number of pixel columns and pixel rows to offset each pixel of the image. In this embodiment, the cropping module 1208 may determine the amount of warping each of the multiple 2D images requires based on the image capture pose estimation of each of the multiple 2D images.

In step 1506, the graphical cut module 1210 determines where to cut or slice one or more of the multiple 2D images. In this embodiment, the graphical cut module 1210 may determine where to cut or slice each of the multiple 2D images based on the image capture pose estimation and the image warping of each of the multiple 2D images.

In step 1508, the stitching module 1206 may stitch two or more images together using the edges of the images and/or the cuts of the images. The stitching module 1206 may align and/or position images based on objects detected within the images, warping, cutting of the image, and/or the like.

In step 1510, the blending module 1212 may adjust the color at the seams (e.g., stitching of two images) or the location on one image that touches or connects to another image. The blending module 1212 may determine the amount of color blending required based on one or more image capture positions from the image capture position module 1204, the image warping from the cropping module 1208, and the graphical cut from the graphical cut module 1210.

The order of one or more steps of the 3D and panoramic capture and stitching process 1400 may be changed without affecting the end product of the 3D panoramic image. For example, the environmental capture system may interleave image capture with the image capture device with lidar data or depth information capture. For example, the image capture device 1616 may capture an image of a section or portion of the physical environment, and then the lidar obtains depth information from the section or portion, or other sections or portions. Once the lidar obtains depth information from the section or portion, or other sections or portions, the image capture device may then capture an image of another section, and then the lidar obtains depth information from the section, or other sections, thereby interleaving image capture and depth information capture.

Additional example embodiments that overcome the stated limitations of the prior art, and that may share the following common set of elements, are now described.

Figure 17B:
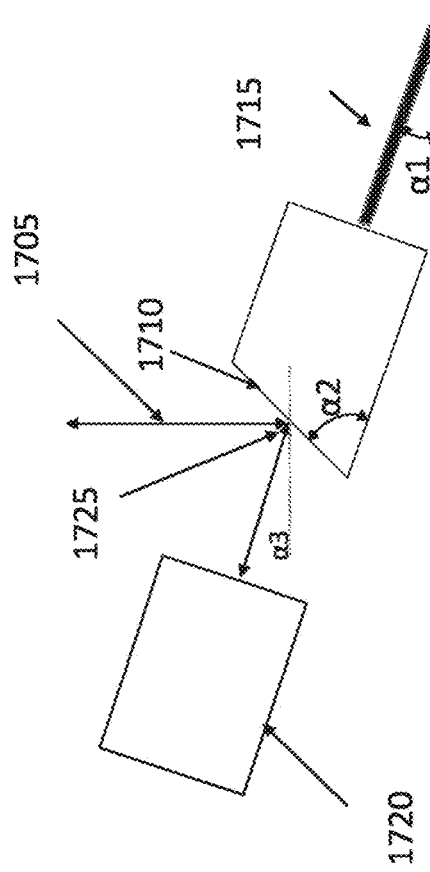
FIGS. 17A and 17B are functional block diagrams of a lidar system in accordance with embodiments of the invention.
Figure 17A:
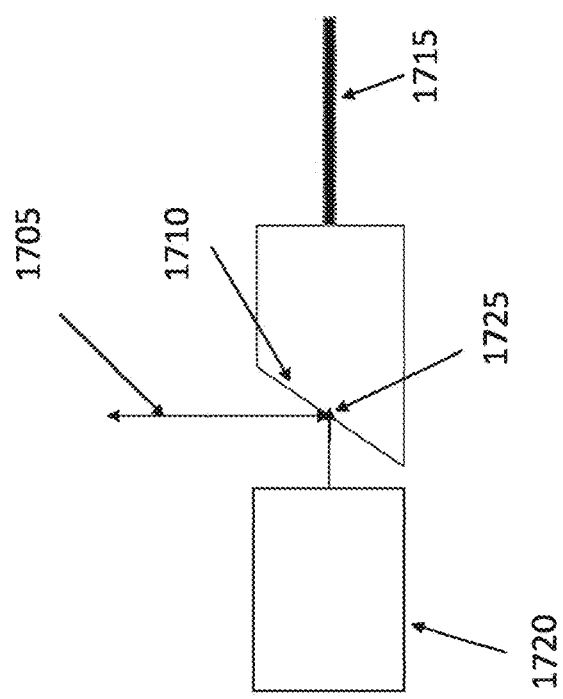

Lidar system(s). A lidar system is described below with reference to FIGS. 17a and 17b, as one example of a depth information capture device that may be used according to embodiments of the invention. The salient elements include a lidar transceiver 1720 which sources laser pulses and detects reflected laser pulses, and a rotating mirror 1710 that directs the pulses into a plane 1705 shown in FIG. 17A. FIG. 17A shows an embodiment that aligns that plane to be perpendicular to the horizontal plane using a second axis of rotation 1715 that is in the horizontal plane. However, FIG. 17B shows there is a continuum of combinations of mirror angle, laser angle, and second axis of rotation 1715 angles that can achieve a lidar scanning plane that is substantially vertical. The origin of the lidar system 1725 is specified as the intersection of the laser transmit beam with the mirror.

Imaging capture system(s). Also referred to as a camera system or imaging system in some embodiments, the salient parts of this system are the lens and the sensor array (e.g., Charge Couple Device image sensor, or CMOS image sensor). In example embodiments, a wide-angle lens or a fish-eye lens can be used to obtain larger horizontal field of view (HFOV) and/or vertical field of views (VFOV).

Frame. A common mechanical frame to which the camera system and the lidar system are attached. The frame establishes the geometric relationship between the imaging system's frame of reference and the lidar system's frame of reference.

A means of rotating the image capture system.

A means of rotating the depth information capture devices (e.g., lidar, structured light projection, etc.).

Figure 18:
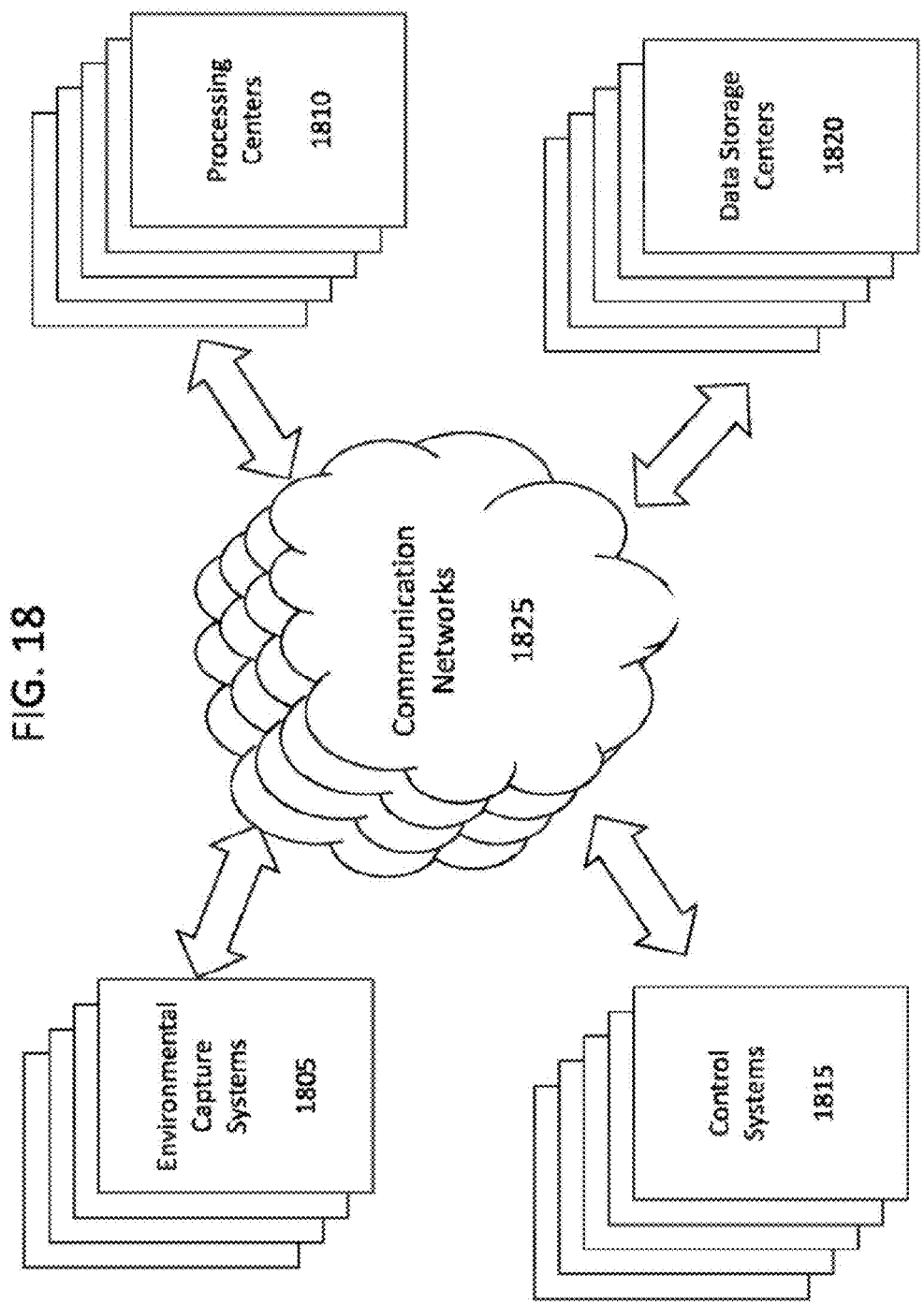
FIG. 18 is a functional block diagram of the ECS Ecosystem.

Processors to control the elements of the system and to process the image and lidar data that is acquired data to create panoramic 3D models. This processing may also be completed within the Environmental Capture System (ECS) or it may be shared with other processors, in part or whole, in the associated ecosystem. The associated ecosystem of the ECS includes additional systems that may interface with the ECS via communication networks 1825 as shown as shown in FIG. 18. ECS 1805 can communicate with other systems in the network (e.g. control systems 1815, data storage centers 1820, and processing centers 1810) via the communication networks 1825.

Sensors for ascertaining the state of operation of the machine such as IMU, accelerometers, level sensors, GPS, etc.

Communication system. Communicates the data acquired to external processing system(s), external data storage system(s), and external control systems.

Other support systems, e.g., storage, control and power.

The ECS apparatus and the associated methods of operation and methods of data processing system disclosed herein have several differentiators over the prior art:

The horizontal rotation of the ECS is about a substantially vertical axis that, in some embodiments, passes through the NPP (no parallax point) of the image capture system. This facilitates the blending of images with overlapping fields of view.

The sequence of operations disclosed herein with respect to some embodiments interleaves image captures with lidar data capture as the ECS is rotated 360 degrees or less. This is different from the existing ECS systems which capture the lidar data in its entirety separately from capture the image data in its entirety, which requires extra revolutions of the ECS and is therefore slower than the embodiments.

At each position of the ECS where images are captured, a number of different exposures may be taken. Blending these images together results in a higher quality of images over a wide dynamic range of lighting conditions.

Figure 19:
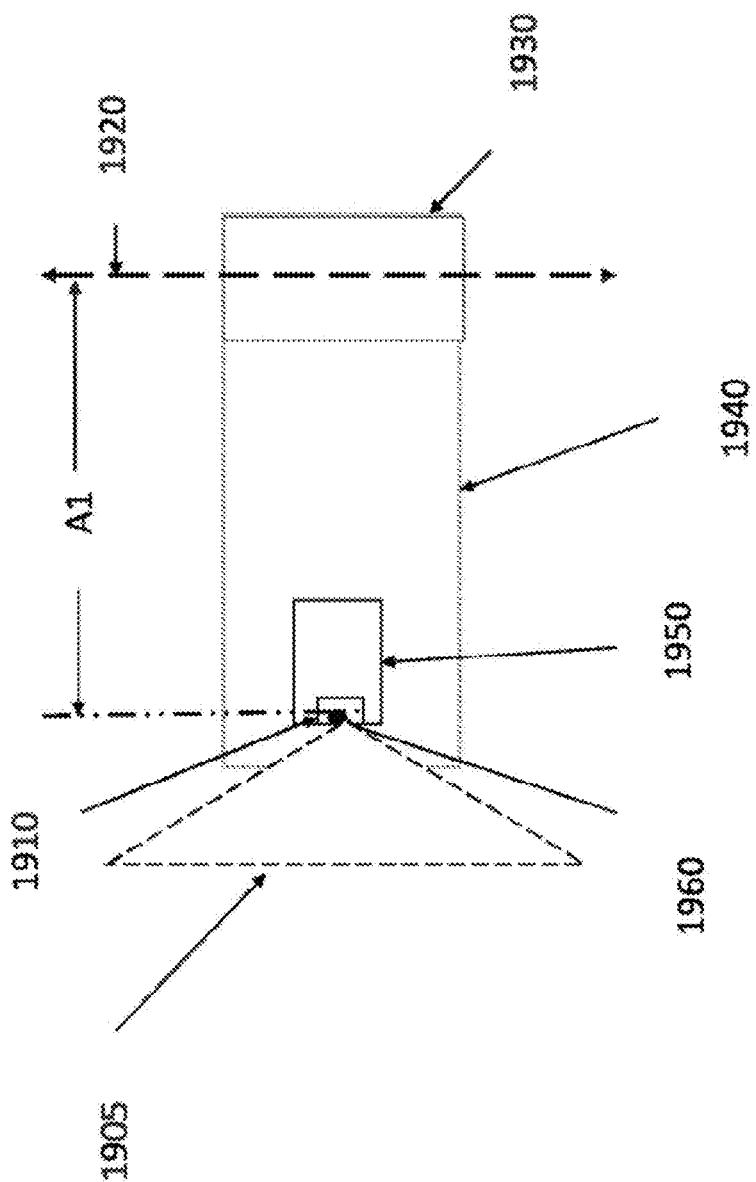
FIG. 19 is a function block diagram of an embodiment of an ECS in accordance with embodiments of the invention.

An embodiment, shown in FIG. 19, minimizes the stitching artifacts by placing the axis of rotation of the ECS (first axis of rotation) 1960 through the No Parallax Point (NPP) 1910 of the image capture system. The NPP is the center of the lens of the image capture system. FIG. 19 further shows both the image capture system and the lidar system attached to the common frame of the ECS 1940. Therefore, a rotation of the mechanical frame causes both the image capture system 1950 and lidar system 1930 to rotate by the same amount. The motor for driving the rotation of the ECS around the first axis may be on board the ECS or it may be part of an external support device such as a tripod. The image capture system has a HFOV (horizontal field of view) 1905 about its central axis. In the embodiment shown the lidar system has a vertical scanning plane 1920 that is perpendicular to the central axis of the camera. Note the NPP 1910 is a distance A1 from the lidar scanning plane 1920. In this example the lidar scanning plane is vertical.

A side view of the lidar scanning plane is shown in FIG. 20. This figure shows the distribution of the laser beam reflecting off the rotating mirror at various angles 8 2005 in the vertical plane with respect to the horizontal plane. Note that the origin for the lidar data 2010 is defined as the intersection of the laser beam from the lidar transmitter (in the lidar transceiver) with the surface of the rotating mirror. Further note that the lidar transmitted scanning beams are blocked if the beams are emitted in the direction that of the frame 2020 of the ECS. With the exception of this case, the lidar system is able to calculate the distance a surface is from the ECS lidar system origin in the direction the beam was launched by recording the roundtrip time from the time of launch of a laser pulse to the return of some portion of the reflected beam energy of that pulse from the targeted surface.

In order to acquire the two-dimensional (2D) images necessary to construct a 2D panoramic picture, the horizontal directions in which the camera is pointed are determined to provide sufficient overlap in the field of views to facilitate stitching. FIGS. 21A, 21B, 21C and 21D are top views of the field of view of the ECS image capture system showing overlapping field of views in four horizontal rotation positions, or directions, Ø=0 degrees, Ø=90 degrees, Ø=180 degrees, and Ø=270 degrees, where images are captured, and where Ø is the horizontal direction of the camera around the first axis of rotation. In this embodiment the HFOV is approximately 145 degrees, therefore the overlap between a first FOV 2110 and a second FOV 2120 is 55 degrees, between the second FOV 2120 and a third FOV 2130 is 55 degrees, and between the third FOV 2130 and a fourth FOV 2140 is 55 degrees. In general, between adjacent FOVs, the overlap is 55 degrees, in this embodiment. In other embodiments the degree of overlap may be less or more than 55 degrees.

Lidar scanning for the apparatus shown in FIG. 19 involves the lidar system being rotated off axis since the first axis of rotation 1960 for the ECS does not go through the origin of the lidar system, rather it goes through the NPP 1910 of the image capture system. FIG. 22A is a top view of successive lidar scans (2205, 2210, 2215, 2220, 2225) that shows as the first axis of rotation transitions from 0 degrees to 90 degrees. Each of the lidar scans contains data from one completed revolution of the second axis of rotation. FIG. 22B is a top view of successive lidar scans (2225, 2230, 2235, 2240, 2245) as the first axis of rotation moves from 90 degrees to 180 degrees. FIG. 22C illustrates the combination of scans depicted in FIGS. 22A and 22B. FIG. 22C reveals a gap 2260 in lidar scan coverage between the lidar scan 2205 at 0 degrees and the lidar scan 2245 at 180 degrees.

Figure 23:
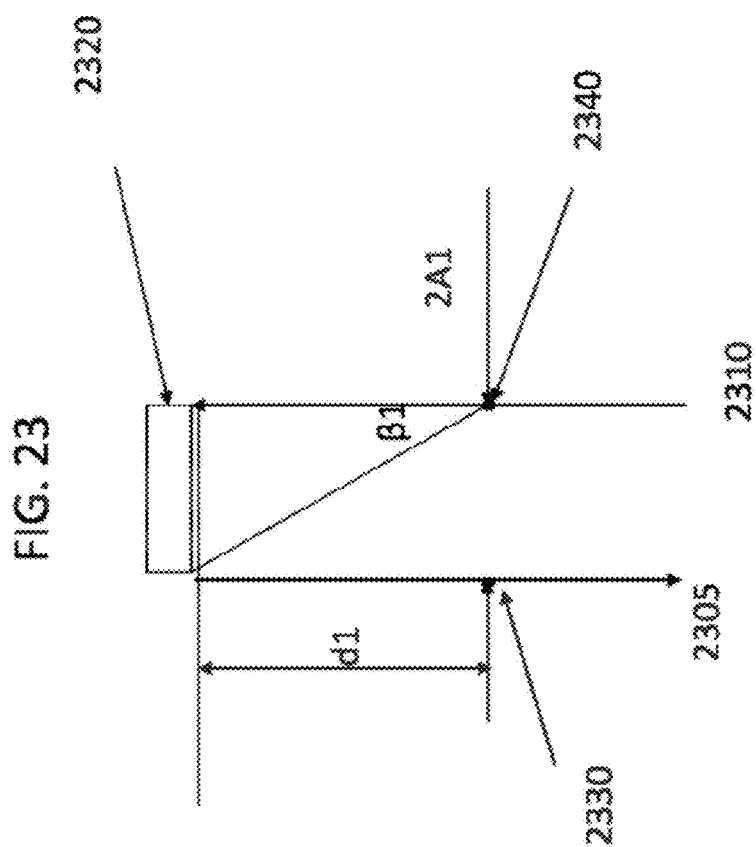
FIG. 23 is a diagram of dimensional relationship of lidar acquisition plane at Ø=0° and Ø=180° in accordance with embodiments of the invention.
Figure 24:
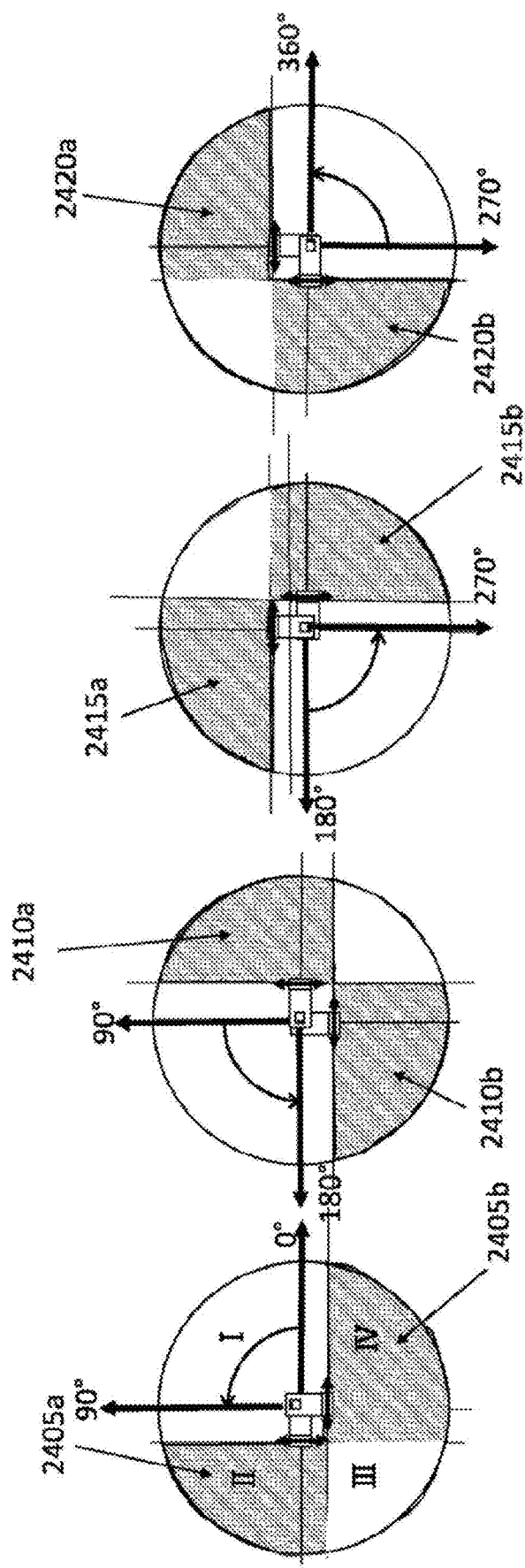
FIGS. 24A, 24B, 24C, and 24D are operating state diagrams of the lidar capture system in accordance with embodiments of the invention.

FIG. 23 shows more specifically the geometry of the gap 2260 and β1, the additional amount of rotation that is required to close the gap. Tan (β1)=2A1/d1. A1 is the distance between NPP 1910 and the origin 2330 of the lidar system. 2A1 is the distance between the lidar scanning plane for the case where the image capture angle Ø is 0° 2305 and the lidar scanning plane when the image capture angle Ø is 180° 2310. d1 is the distance from the origin 2330 of the lidar system and the closest object 2320 in the view of the lidar system when the ECS system is oriented at 0°, or equivalently d1 is the distance from the origin 2340 and the closest object 2320 in the view of the lidar system when the ECS is oriented at 180°. A few typical cases are 1) A1 (inches)=6, d1 (inches)=24, and β1=26.6 degrees; 2) A1 (inches)=6, d1 (inches)=36, and β1=18.4 degrees; and 3) A1 (inches)=6, d1 (inches)=48, and β1=14.0 degrees.

Together FIG. 24A, FIG. 24B, FIG. 24C and FIG. 24D represent two complete series of 360-degree lidar scans in increments of 90 degrees from 0 degrees to 360 degrees. The crosshatched areas represent the lidar coverage for each of the incremental scans. 2405a and 2405b depict the lidar scan segments as the ECS rotates from 0° to 90°. 2410a and 2410b depict the lidar scan segments as the ECS rotates from 90° to 180°. 2415a and 2415b depict the lidar scan segments as the ECS rotates from 180° to 270°. 2420a and 2420b depict the lidar scan segments as the ECS rotates from 270° to 360°. By twice scanning the full 360 degrees, additional, or duplicative, depth information is provided that can be used for various purposes. This additional information is supplied in the form of additional points in the cloud of points which can provide finer resolution to the contours and texture of the surfaces of environmental captured by the ECS. Consider that each scan gives almost two quadrants of information, according to one embodiment. This implies that the information provided by two 360 degree scans is approximately eight quadrants of information of scanning information, i.e., two times a 360-degree single scan. The scans are covering the same surface areas but at slightly different angles and at different times. This information may be used to identify movement of an object or person in motion and furthermore with complete spatial information of the path of that object or person as it or they move through the aggregate view of the lidar system. The additional information can also be used as cross check for the integrity of a given scan. If the information for a specific scan is not consistent with other scan information, then a flag can be raised, which if corroborated with other flags can result in a request for a rescan. The processing of this information can be accomplished such that the rescan can be performed before the ECS is moved to another location. This may potentially save the time of the operator tasked with acquiring a known good set of data before moving to another location.

Embodiments for Data Acquisition

The following embodiments apply to the apparatus described herein, where the ECS vertical axis of rotation passes thru the NPP of an image capture system and the lidar scans are off the first axis of rotation, as discussed above with reference to FIG. 19. The embodiments reduce the time of acquisition of the image and depth information by interleaving the image capture processes with the depth information capture process, with one objective of acquiring data that can be used to generate an image of a 360-degree scene in a single rotation (or less) of the ECS.

Figure 21D:
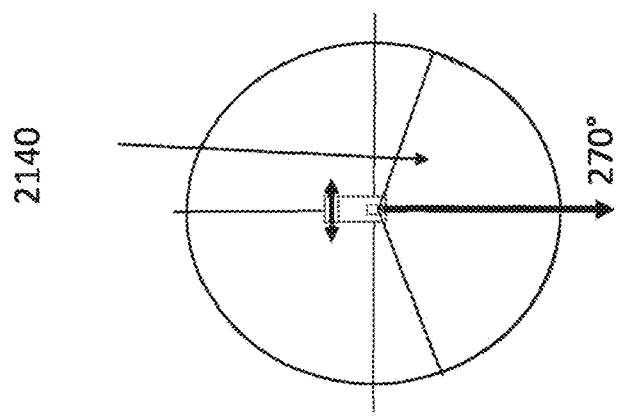
Figure 21C:
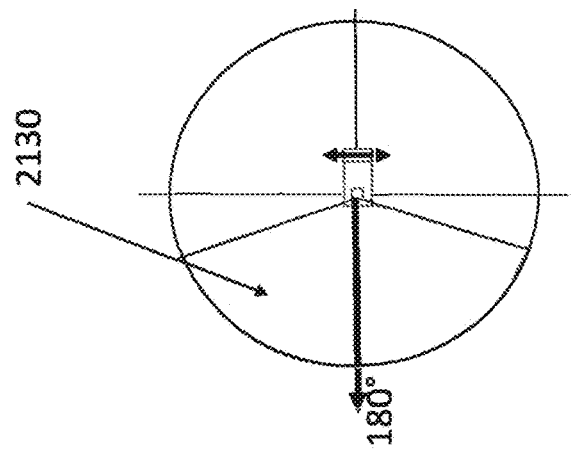
Figure 21B:
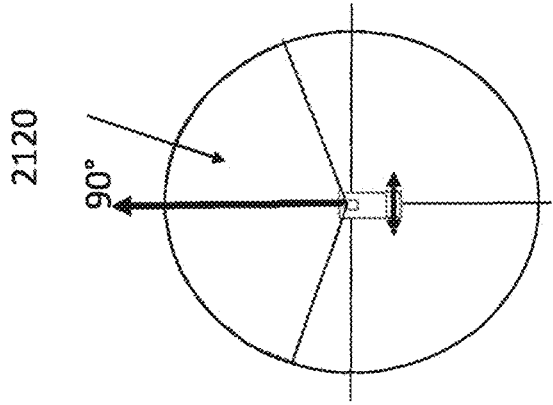
Figure 21A:
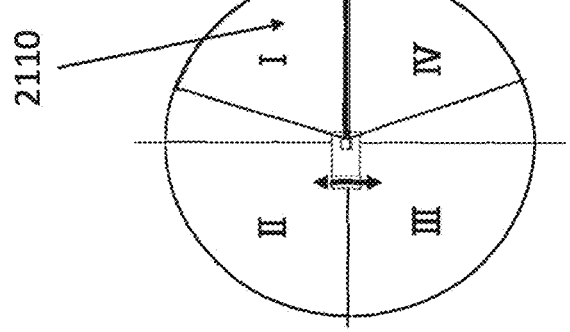

The relative positions where image capture occur may be determined in part by the horizontal field of view (HFOV) of the imaging system and the amount of overlap between adjacent HFOVs that is desired. FIGS. 21A-C are an example of a top view of the ECS oriented at 4 sequential positions of rotation around the first axis of rotation, i.e., at 0 degrees, 90 degrees, 180 degrees and 270 degrees about a substantially vertical axis and their associated fields of view 2110, 2120, 2130 and 2140. In this example embodiment the fields of view are large enough to insure overlap between successive images taken at the 4 sequential positions. Mathematically this equates to restricting the angle of rotation of the image capture system to be less than the horizontal field of view of the image capture system. For sufficiently large horizontal field of views the number of horizontal angular positions may be three. In practice the overlap should be enough to facilitate the task of stitching the images together to create a 360-degree panoramic view of the environment.

Figure 25:
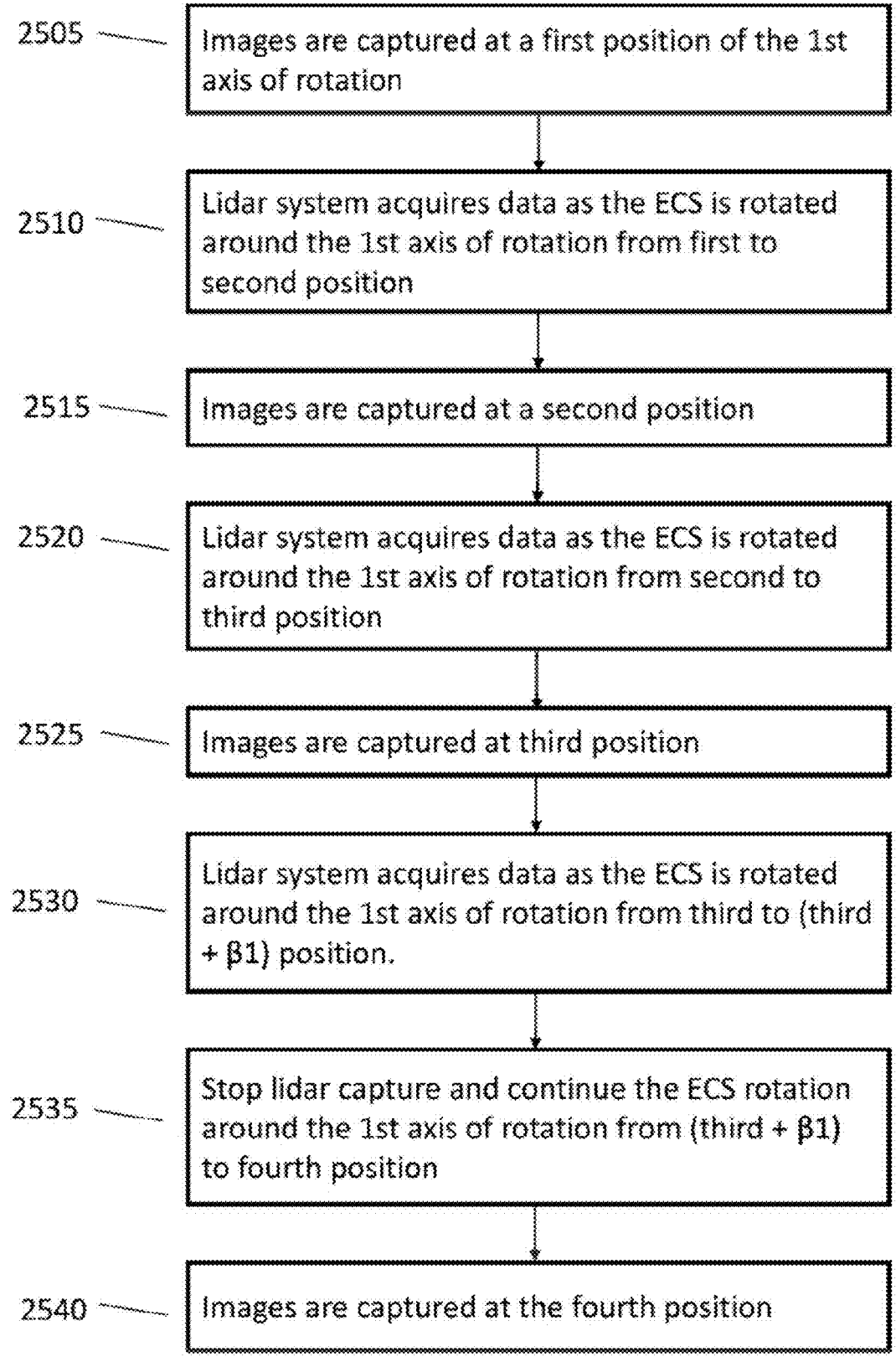
FIG. 25 is a flow chart of a method of operation for data acquisition in accordance with embodiments of the invention.

FIG. 25 illustrates an example embodiment in which the image acquisition positions are those shown in FIGS. 21A, 21B, 21C, and 21D.

The process for this example embodiment is a time sequence of steps, where t indicates time:

Step one 2505, from t=0 to t=t1, images are captured at a first angle position of the first axis of rotation, for example, at 0 degrees, for the field of view 2110.

Step two 2510, from t=t1 to t=t2, the lidar system acquires depth data, as the ECS is rotated around the first axis of rotation from the first position to a second angle position, for example, from 0 degrees to 90 degrees, for quadrants 2405a and 2405b.

Step three 2515, from t=t2 to t=t3, images are captured at the second angle position of the first axis of rotation, for example, at 90 degrees, for the field of view 2120.

Step four 2520, from t=t3 to t=t4, the lidar system acquires depth data, as the ECS is rotated around the first axis of rotation from the second angle position to a third angle position, for example, from 90 degrees to 180 degrees, for quadrants 2410a and 2410b.

Step Five 2525, from t=t4 to t=t5, images are captured at the third angle position of the first axis of rotation, for example, at 180 degrees, for the field of view 2130.

Step Six 2530, from t=t5 to t=t6, the lidar system acquires depth data, as the ECS is rotated around the first axis of rotation from third position to a fourth angle position that is the third angle position plus the angle β1, for example, from 180 degrees to 180 degrees+β1 (gap closure angle). Because the lidar system is positioned off the first axis of rotation the ECS is rotated an additional angle, β1, to cover a gap in lidar scan coverage, as discussed earlier.

Step Seven 2535, from t=t6 to t=t7, continue the ECS rotation around the 1st axis of rotation from the fourth position to a fifth position, for example, from 180 degrees+β1 to 270 degrees.

Step Eight 2540, from t=t7 to t=t8, images are captured at the fifth angle position of the first axis of rotation, for example, at 270 degrees, for the field of view 2140.

Thus, at blocks 2505, 2515, 2525 and 2540, images are captured. At each of these steps multiple images may be captured, each at different exposures. Furthermore, image processing may also be included in these steps to blend and then stitch the images together or to validate the completeness and quality of the images. This may result in repeating the capture of certain images at specific exposures. The purpose of doing so at this point to avoid doing so at a later time, which may result in the operator revisiting the location.

Figure 26:
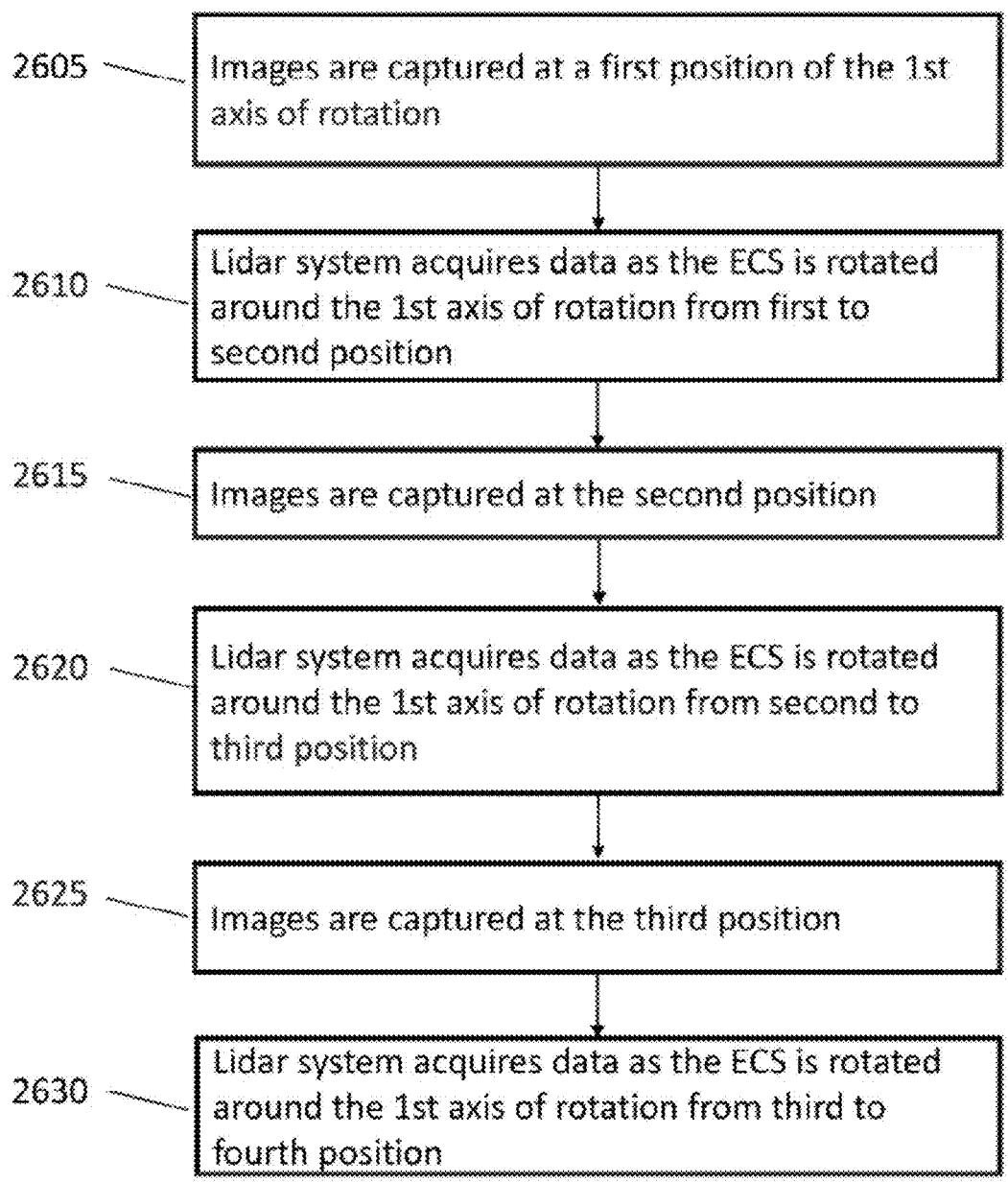
FIG. 26 is a flow chart of a method of operation for data acquisition in accordance with embodiments of the invention.

FIG. 26 illustrates another example embodiment in which the image acquisition positions are at 0 degrees, 120 degrees and 240 degrees and in which the image capture system has a sufficiently large horizontal field of view, e.g., 155 degrees.

The algorithm for this method is a time sequence of steps (similar to the above described embodiment), where t indicates time:

Step one 2605, from t=0 to t=t1, images are captured at a first angle position of a first axis of rotation, for example, at 0 degrees, for a first field of view.

Step two 2610, from t=t1 to t=t2, the lidar system acquires depth data, as the ECS is rotated around the first axis of rotation from the first angle position to the second angle position, for example, from 0 degrees to 120 degrees, to obtain depth data for first and second portions of a 360-degree scene.

Step three 2615, from t=t2 to t=t3, images are captured at the second angle position of the first axis of rotation, for example, at 120 degrees, for a second field of view.

Step four 2620, from t=t3 to t=t4, the lidar system acquires depth data, as the ECS is rotated around the first axis of rotation from the second angle position to a third angle position, for example, from 120 degrees to 240 degrees, to obtain depth data for third and fourth portions of the 360-degree scene.

Step Five 2625, from t=t4 to t=t5, images are captured at the third angle position of the first axis of rotation, for example, at 240 degrees, for a third field of view.

Step Six 2630, from t=t5 to t=t6, the lidar system acquires depth data, as the ECS is rotated around the first axis of rotation from the third angle position to a fourth angle position, for example, from 240 degrees to 360 degrees, to obtain depth data again for the first and second portions of the 360-degree scene.

Thus, at blocks 2605, 2615 and 2625, images are captured. These steps may also include images captured at different exposures. Furthermore, image processing may also be included in these steps to blend and or stitch the images together or to validate the completeness and quality of the images.

The panoramic 3D model of the environment surrounding the ECS combines both the image capture data and the depth information captured data. To facilitate this process, it is helpful to convert the coordinate system representing the lidar cloud of points into a common reference frame that is consistent with either the reference frame used for the image capture or the reference frame used for the depth information capture. The coordinate system used to describe this common reference is a Cartesian coordinate system (x, y, z). Note that other coordinate systems could be used (i.e., a spherical coordinate system, or a cylindrical coordinate system). The origin 2705 for the (x, y, z) is defined as the NPP 1910. The Z-axis is the first axis of rotation. The dotted line 2715 represents the lidar vertical plane as seen from the top view. The choice for the orientation of the XV plane is consistent with, for example, the image capture system, with the X-axis set to the Ø=0 direction, as shown in FIG. 21A.

Figure 27:
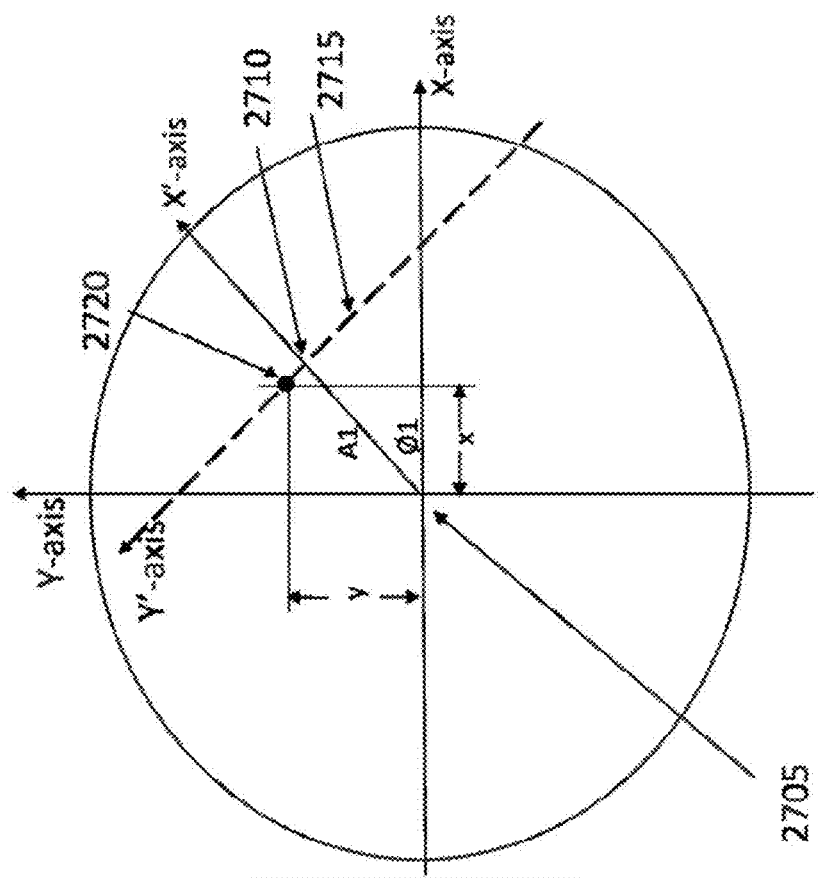
FIG. 27 is a diagram of a common reference frame for lidar cloud of points.

FIG. 27 shows the conversion equations for converting the coordinates of location of a point 2720 in the lidar cloud points at (Ø, Θ, $D_{tof}$) to its equivalent coordinates (x, y, z) using the common cartesian frame of reference.

$$x = D_{tof} \cos \Theta \sin Ø - A1 \cos Ø$$

$$y = -(D_{tof} \cos \Theta \cos Ø + A1 \sin Ø)$$

$$z = D_{tof} \sin \Theta$$

The salient parameters for this conversion are:

$D_{tof}$ is the distance as measured from the lidar origin 2710 (intersection of the transmit laser beam with the lidar mirror surface) to the point on the surface of the environment. It is half of the round-trip time of flight (TOF) divided by the speed of light, where the round trip time is defined as the time it takes the laser pulse to travel from its reflection point on the lidar mirror to the contact point on the surface of the environment and back again to the lidar mirror.

Ø is the angle around the first axis of rotation.

Θ is the angle around the second axis of rotation as shown in FIG. 20.

A1 is the distance from the lidar origin 2710 to the NPP (no parallax point) 2705. Note it has been assumed for the purpose of simplicity that the lidar origin is colinear with the line that passes through the NPP and is perpendicular to the image sensor plane.

Figure 16:
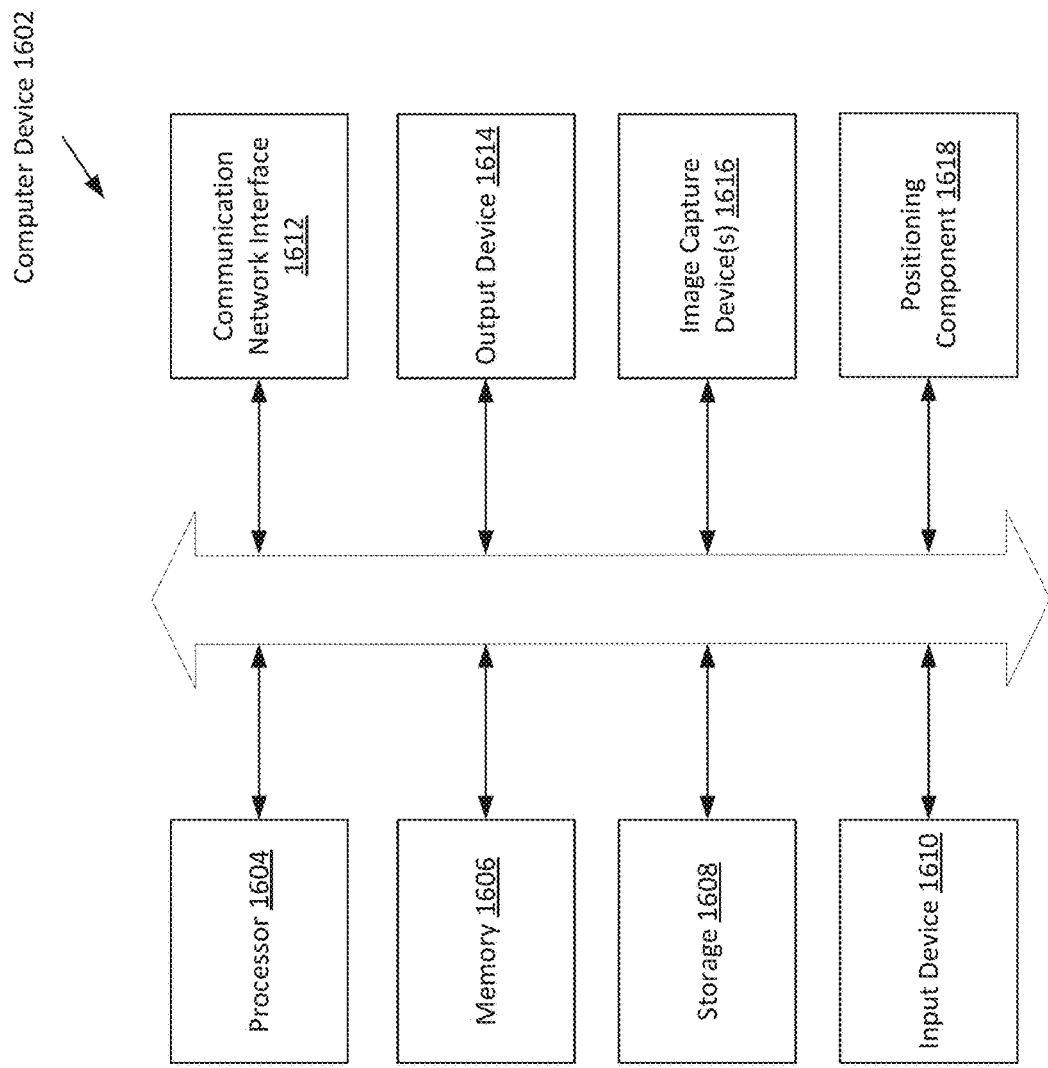
FIG. 16 depicts a block diagram of an example digital device according to some embodiments.

FIG. 16 depicts a block diagram of an example digital device 1602 according to some embodiments. Any of the user system 1110, the 3D panoramic capture and stitching system 1102, and the image stitching and processor system may comprise an instance of the digital device 1602. Digital device 1602 comprises a processor 1604, a memory 1606, a storage 1608, an input device 1610, a communication network interface 1612, an output device 1614, an image capture device 1616, and a positioning component 1618. Processor 1604 is configured to execute executable instructions (e.g., programs). In some embodiments, the processor 1604 comprises circuitry or any processor capable of processing the executable instructions.

Memory 1606 stores data. Some examples of memory 1606 include storage devices, such as RAM, ROM, RAM cache, virtual memory, etc. In various embodiments, working data is stored within memory 1606. The data within memory 1606 may be cleared or ultimately transferred to storage 1608.

Storage 1608 includes any storage configured to retrieve and store data. Some examples of storage 1608 include flash drives, hard drives, optical drives, and/or magnetic tape. Each of memory 1606 and storage 1608 comprises a computer-readable medium, which stores instructions or programs executable by processor 1604.

The input device 1610 is any device that inputs data (e.g., touch keyboard, stylus). Output device 1614 outputs data (e.g., speaker, display, virtual reality headset). It will be appreciated that storage 1608, input device 1610, and an output device 1614. In some embodiments, the output device 1614 is optional. For example, routers/switchers may comprise processor 1604 and memory 1606 as well as a device to receive and output data (e.g., a communication network interface 1612 and/or output device 1614).

The communication network interface 1612 may be coupled to a network (e.g., communication network 104) via communication network interface 1612. Communication network interface 1612 may support communication over an Ethernet connection, a serial connection, a parallel connection, and/or an ATA connection. Communication network interface 1612 may also support wireless communication (e.g., 802.16 a/b/g/n, WiMAX, LTE, Wi-Fi). It will be apparent that the communication network interface 1612 may support many wired and wireless standards.

A component may be hardware or software. In some embodiments, the component may configure one or more processors to perform functions associated with the component. Although different components are discussed herein, it will be appreciated that the server system may include any number of components performing any or all functionality discussed herein.

The digital device 1602 may include one or more image capture devices 1616. The one or more image capture devices 1616 can include, for example, RGB cameras, HDR cameras, video cameras, and the like. The one or more image capture devices 1616 can also include a video camera capable of capturing video in accordance with some embodiments. In some embodiments, one or more image capture devices 1616 can include an image capture device that provides a relatively standard field-of-view (e.g., around 75°). In other embodiments, the one or more image capture devices 1616 can include cameras that provide a relatively wide field-of-view (e.g., from around 120° up to 360°), such as a fisheye camera, and the like (e.g., the digital device 1602 may include or be included in the environmental capture system 400).

A component may be hardware or software. In some embodiments, the component may configure one or more processors to perform functions associated with the component. Although different components are discussed herein, it will be appreciated that the server system may include any number of components performing any or all functionality discussed herein.

The invention claimed is:

1. A method for an apparatus comprising a motor, a depth information capture device, and an image capture device, the method comprising:
    capturing, by the image capture device while pointed in a first direction, a plurality of images at different exposures in a first field of view (FOV) of an environment, the image capture device including a lens positioned substantially at a first axis;
    rotating the depth information capture device and the image capture device about the first axis from the first direction to a second direction;
    capturing, by the depth information capture device while being rotated from the first direction to the second direction about the first axis, depth information for a first portion of the environment;
    capturing, by the image capture device while pointed in the second direction, a plurality of images at different exposures in a second FOV that overlaps the first FOV of the environment;
    rotating the depth information capture device and the image capture device about the first axis from the second direction to a third direction;
    capturing, by the depth information capture device while being rotated from the second direction to the third direction about the first axis, depth information for a second portion of the environment;
    capturing, by the image capture device while pointed in the third direction, a plurality of images at different exposures in a third FOV that overlaps the second FOV of the environment; and
    associating, based on a distance between the first axis and the depth information capture device, the depth information for the first portion and the second portion of the environment with numerical coordinates that identify a location of the depth information.

2. The method of claim 1, further comprising:
    rotating the depth information capture device and the image capture device about the first axis from the third direction to a fourth direction; and
    capturing, by the image capture device while pointed in the fourth direction, a plurality of images at different exposures in a fourth FOV that overlaps the first FOV and the third FOV of the environment.

3. The method of claim 2, further comprising capturing, by the depth information capture device while being rotated from the third direction to the fourth direction about the first axis, depth information for a third portion of the environment.

4. The method of claim 3, wherein capturing, by the depth information capture device, depth information for the first portion, the second portion, and the third portion of the environment comprises capturing, by the depth information capture device, depth information for first, second, and third pluralities of segments of the environment.

5. The method of claim 3, further comprising:
    stitching together one or more of the plurality of images captured in the first FOV, the second FOV, and the third FOV into a panoramic image of the environment; and
    combining the depth information for the first portion, the second portion, and the third portion of the environment with the panoramic image of the environment to create a 3D panoramic image of the environment.

6. The method of claim 5, further comprising:
    blending two or more of the plurality of images captured in the first FOV, the second FOV, and the third FOV into first, second, and third blended images of the first FOV, the second FOV, and the third FOV,
wherein stitching together one or more of the plurality of images captured in the first FOV, the second FOV, and the third FOV into the panoramic image of the environment comprises stitching together the first, second, and third blended images into the panoramic image of the environment.

7. The method of claim 6, wherein blending two or more of the plurality of images captured in the first FOV, the second FOV, and the third FOV into the first, second, and third blended images of the first FOV, the second FOV, and the third FOV comprises blending two or more of the plurality of images of the first FOV, the second FOV, and the third FOV into first, second, and third HDR (high dynamic range) images of the first FOV, the second FOV, and the third FOV,
wherein stitching together one or more of the plurality of images captured in the first FOV, the second FOV, and the third FOV into the panoramic image of the environment comprises stitching together the first, second, and third HDR images of the first FOV, the second FOV, and the third FOV into the panoramic image of the environment.

8. The method of claim 6, wherein rotating the depth information capture device and the image capture device about the first axis from the first direction to the second direction comprises rotating the depth information capture device and the image capture device using a first motor, the apparatus further comprising a second motor, the depth information capture device comprising a Light Detection and Ranging (LiDAR) device and a mirror, and the method further comprises:
rotating, by the second motor, the mirror about a second axis;
emitting, by the LiDAR device, a plurality of laser pulses to the mirror;
emitting, by the mirror, the plurality of laser pulses in one or more revolutions about the second axis;
receiving, by the mirror, a corresponding plurality of reflected laser pulses;
receiving, by the LiDAR device, the corresponding plurality of reflected laser pulses; and
generating, by the LiDAR device, the depth information based on the corresponding plurality of reflected laser pulses,
wherein the first, second, and third blended images of the first FOV, the second FOV, and the third FOV each comprise a plurality of pixels,
wherein each of the plurality of pixels is associated with numerical coordinates that identify a location of the pixel in the environment,
wherein each of the corresponding plurality of reflected laser pulses is associated with corresponding numerical coordinates that identify a location of the depth information, and
wherein combining the depth information for the environment with the panoramic image of the environment to create the 3D panoramic image of the environment comprises combining the depth information at a location in the environment with the pixel at the location in the environment to create the 3D panoramic image of the environment.

9. The method of claim 8, wherein the first motor rotates the image capture device about the first axis to the first direction, the second direction, and the third direction to capture while pointed in those directions the plurality of images at different exposures in the first FOV, the second FOV, and the third FOV, a parallax effect between the plurality of images captured in the first FOV, the second FOV, and the third FOV is reduced or eliminated.

10. The method of claim 1, wherein rotating the depth information capture device and the image capture device about the first axis from the first direction to the second direction comprises rotating the depth information capture device and the image capture device using a first motor, the apparatus further comprising a second motor, the depth information capture device comprising a Light Detection and Ranging (LiDAR) device and a mirror, and the method further comprises:
rotating, by the second motor, the mirror about a second axis;
emitting, by the LiDAR device, a plurality of laser pulses to the mirror;
emitting, by the mirror, the plurality of laser pulses in one or more revolutions about the second axis;
receiving, by the mirror, a corresponding plurality of reflected laser pulses;
receiving, by the LiDAR device, the corresponding plurality of reflected laser pulses; and
generating, by the LiDAR device, the depth information based on the corresponding plurality of reflected laser pulses, so that as the image capture device and the LiDAR device are rotated by the first motor about the first axis and the mirror is rotated by the second motor about the second axis, the LiDAR device capturing the depth information in three dimensions for the environment.

11. The method of claim 1, wherein associating, based on the distance between the first axis and the depth information capture device, the depth information for the first portion and the second portion of the environment with the numerical coordinates that identify the location of the depth information includes associating, based on the distance between the first axis and a receiving sensor of the depth information capture device, the depth information for the first portion and the second portion of the environment with the numerical coordinates that identify the location of the depth information.

12. The method of claim 1, wherein associating, based on a distance between the first axis and the depth information capture device, the depth information for the first portion and the second portion of the environment with numerical coordinates that identify a location of the depth information includes associating, based on a distance between the first axis and a mirror of the depth information capture device, the depth information for the first portion and the second portion of the environment with numerical coordinates that identify a location of the depth information.

13. An apparatus comprising:
an image capture device, the image capture device configured to capture, while pointed in a first direction, a plurality of images at different exposures in a first field of view (FOV) of an environment, the image capture device including a lens positioned substantially at a first axis; and
a depth information capture device, the depth information capture device and the image capture device configured to be rotated about the first axis from the first direction to a second direction, the depth information capture device configured to, while being rotated from the first direction to the second direction, capture depth information for a first portion of the environment, wherein the image capture device is further configured to, while pointed in the second direction, capture a plurality of images at different exposures in a second FOV that overlaps the first FOV of the environment, wherein the depth information capture device and the image capture device are further configured to be rotated about the first axis from the second direction to a third direction, the depth information capture device further configured to, while being rotated from the second direction to the third direction, capture depth information for a second portion of the environment, wherein the image capture device is further configured to, while pointed in the third direction, capture a plurality of images at different exposures in a third FOV that overlaps the second FOV of the environment, and wherein the depth information capture device is further configured to associate, based on a distance between the first axis and the depth information capture device, depth information for the first portion and the second portion of the environment with numerical coordinates that identify a location of the depth information.

14. The apparatus of claim 13, wherein:

the depth information capture device and the image capture device are further configured to be rotated about the first axis from the third direction to a fourth direction, and the image capture device is further configured to, while pointed in the fourth direction, capture a plurality of images at different exposures in a fourth FOV that overlaps the first FOV and the third FOV of the environment.

15. The apparatus of claim 14, wherein the depth information capture device is further configured to, while being rotated about the first axis from the third direction to a fourth direction, capture depth information for a third portion of the environment.

16. The apparatus of claim 15, wherein the depth information capture device is further configured to, while being rotated from the first direction, the second direction, and the third direction, capture depth information for first, second, and third pluralities of segments of the environment.

17. The apparatus of claim 15, further comprising:

an image stitching module configured to stitch together one or more of the plurality of images captured in the first FOV, the second FOV, and the third FOV into a panoramic image of the environment; and a 3D image generation module configured to combine the depth information for the first portion, the second portion and the third portion of the environment with the panoramic image of the environment to create a 3D panoramic image of the environment.

18. The apparatus of claim 17, further comprising a blending module configured to blend two or more of the plurality of images of the first FOV, the second FOV, and the third FOV into first, second, and third blended images of the first FOV, the second FOV, and the third FOV, wherein the image stitching module is further configured to stitch together the first, second, and third blended images into the panoramic image of the environment.

19. The apparatus of claim 18, wherein the blending module is further configured to blend two or more of the plurality of images of the first FOV, the second FOV, and the third FOV into first, second, and third high dynamic range (HDR) images of the first FOV, the second FOV, and the third FOV, and wherein the image stitching module is further configured to together the first, second, and third HDR images of the first FOV, the second FOV, and the third FOV into the panoramic image of the environment.

20. The apparatus of claim 18 further comprising:

a first motor configured to rotate the image capture device and the depth information capture device about the first axis; and a second motor, wherein the depth information capture device comprises a Light Detection and Ranging (LiDAR) device and a mirror, wherein the second motor is configured to rotate the mirror about a second axis, wherein the LiDAR device is configured to emit a plurality of laser pulses to the mirror, wherein the mirror is further configured to emit the plurality of laser pulses in one or more revolutions about the second axis and to receive a corresponding plurality of reflected laser pulses, wherein the LiDAR device is further configured to receive the corresponding plurality of reflected laser pulses and to generate the depth information based on the corresponding plurality of reflected laser pulses, wherein the first, second, and third blended images of the first FOV, the second FOV, and the third FOV each comprise a plurality of pixels, wherein each of the plurality of pixels is associated with numerical coordinates that identify a location of the pixel in the environment, wherein each of the corresponding plurality of reflected laser pulses is associated with corresponding numerical coordinates that identify a location of the depth information, and wherein to combine, by the 3D image generation module, the depth information for the environment with the panoramic image of the environment to create the 3D panoramic image of the environment comprises to combine the depth information at a location in the environment with the pixel at the location in the environment to create the 3D panoramic image of the environment.

21. The apparatus of claim 13, wherein as the image capture device is rotated about the first axis to the first direction, the second direction, and the third direction to capture while pointed in those directions the plurality of images at different exposures in the first FOV, the second FOV, and the third FOV, a parallax effect between the plurality of images captured in the first FOV, the second FOV, and the third FOV is reduced or eliminated.

22. The apparatus of claim 18 further comprising:

a first motor configured to rotate the image capture device and the depth information capture device about the first axis; and a second motor, wherein the depth information capture device comprises a Light Detection and Ranging (LiDAR) device and a mirror, wherein the second motor is configured to rotate the mirror about a second axis, wherein the LiDAR device is configured to emit a plurality of laser pulses to the mirror, wherein the mirror is further configured to emit the plurality of laser pulses in one or more revolutions about the second axis and to receive a corresponding plurality of reflected laser pulses, wherein the LiDAR device is further configured to receive the corresponding plurality of reflected laser pulses and to generate the depth information based on the corresponding plurality of reflected laser pulses, so that as the image capture device and the LiDAR device are rotated by the first motor about the first axis and the mirror is rotated by the second motor about the second axis, the LiDAR device is further configured to capture the depth information in three dimensions for the environment.

23. One or more non-transitory computer-readable storage media comprising executable instructions that when executed by one or more processors, including at least one processor of an apparatus comprising an image capture device and a depth information capture device, cause the one or more processors, including the at least one processor of the apparatus, to perform a method, the method comprising:
    capturing, by the image capture device while pointed in a first direction, a plurality of images at different exposures in a first field of view (FOV) of an environment, the image capture device including a lens positioned substantially at a first axis;
    rotating the depth information capture device and the image capture device about the first axis from the first direction to a second direction;
    capturing, by the depth information capture device while being rotated from the first direction to the second direction, depth information for a first portion of the environment;
    capturing, by the image capture device while pointed in the second direction, a plurality of images at different exposures in a second FOV that overlaps the first FOV of the environment;
    rotating the depth information capture device and the image capture device about the first axis from the second direction to a third direction;
    capturing, by the depth information capture device while being rotated from the second direction to the third direction, depth information for a second portion of the environment;
    capturing, by the image capture device while pointed in the third direction, a plurality of images at different exposures in a third FOV that overlaps the second FOV of the environment; and
    associating, based on a distance between the first axis and the depth information capture device, the depth information for the first portion and the second portion of the environment with numerical coordinates that identify a location of the depth information.

24. The one or more non-transitory computer-readable storage media of claim 23, the method further comprising:
    rotating the depth information capture device and the image capture device about the first axis from the third direction to a fourth direction; and
    capturing, by the image capture device while pointed in the fourth direction, a plurality of images at different exposures in a fourth FOV that overlaps the first FOV and the third FOV of the environment.

25. The one or more non-transitory computer-readable storage media of claim 24, the method further comprising capturing, by the depth information capture device while being rotated from the third direction to the fourth direction, depth information for a third portion of the environment.

* * * * *